US012667977B2

(12) United States Patent
Cheuvront et al.

(10) Patent No.: US 12,667,977 B2
(45) Date of Patent: Jun. 30, 2026

(54) SYSTEMS AND METHODS TO CONTROL AN AUTONOMOUS MOBILE ROBOT

(71) Applicant: iRobot Corporation, Bedford, MA (US)

(72) Inventors: Jacob C. Cheuvront, Waltham, MA (US); Christopher V. Jones, Woburn, MA (US); Michael J. Dooley, Los Gatos, CA (US)

(73) Assignee: iRobot Corporation, Bedford, MA (US)

( * ) Notice: Subject to any disclaimer, the term of this patent is extended or adjusted under 35 U.S.C. 154(b) by 825 days.

(21) Appl. No.: 17/317,200

(22) Filed: May 11, 2021

(65) Prior Publication Data

US 2021/0260773 A1 Aug. 26, 2021

Related U.S. Application Data

(63) Continuation of application No. 15/614,844, filed on Jun. 6, 2017, now Pat. No. 11,020,860.

(Continued)

(51) Int. Cl.
B25J 9/00 (2006.01)
A47L 7/00 (2006.01)
(Continued)

(52) U.S. Cl.
CPC ......... B25J 11/0085 (2013.01); A47L 7/0085 (2013.01); A47L 9/0477 (2013.01);
(Continued)

(58) Field of Classification Search
CPC .. B25J 11/0085; B25J 9/0003; B25J 11/0005; A47L 7/0085; A47L 9/0477;
(Continued)

(56) References Cited

U.S. PATENT DOCUMENTS

| 4,864,205 A | 9/1989 | Fisher et al. |
| 6,389,329 B1 | 5/2002 | Colens |

(Continued)

FOREIGN PATENT DOCUMENTS

| CN | 101084817 | 12/2007 |
| CN | 101301186 | 11/2008 |

(Continued)

OTHER PUBLICATIONS

Design of an Intelligent Home Assistant (Year: 2016).*

(Continued)

*Primary Examiner* — Ramon A. Mercado
*Assistant Examiner* — Shaheda Hoque
(74) *Attorney, Agent, or Firm* — Maschoff Brennan

(57) ABSTRACT

A method for controlling one or more operations of an autonomous mobile robot maneuverable within a home includes establishing wireless communication between an autonomous mobile robot and a remote computing system and, in response to receiving a wireless command signal from the remote computing system, initiating one or more operations of the autonomous mobile robot. The autonomous mobile robot is remote from an audio media device stationed within the home. The audio media device is capable of receiving and emitting audio. The remote computing system is configured to associate identification data of the autonomous mobile robot with identification data of the audio media device. The wireless command signal corresponds to an audible user command received by the audio media device.

30 Claims, 14 Drawing Sheets

Related U.S. Application Data

(60) Provisional application No. 62/350,382, filed on Jun. 15, 2016.

(51) Int. Cl.

| | |
|---|---|
| *A47L 9/04* | (2006.01) |
| *A47L 9/28* | (2006.01) |
| *A47L 11/24* | (2006.01) |
| *A47L 11/40* | (2006.01) |
| *B25J 11/00* | (2006.01) |
| *G05D 1/00* | (2006.01) |
| *G06F 3/01* | (2006.01) |
| *G06F 3/16* | (2006.01) |
| *G06F 16/00* | (2019.01) |
| *G07C 5/08* | (2006.01) |

(52) U.S. Cl.
CPC ........... *A47L 9/2805* (2013.01); *A47L 9/2857* (2013.01); *A47L 11/24* (2013.01); *A47L 11/4011* (2013.01); *A47L 11/4025* (2013.01); *A47L 11/4091* (2013.01); *B25J 9/0003* (2013.01); *G05D 1/0282* (2013.01); *G06F 3/01* (2013.01); *G06F 3/16* (2013.01); *G06F 3/167* (2013.01); *G06F 16/00* (2019.01); *G07C 5/0808* (2013.01); *A47L 2201/04* (2013.01)

(58) Field of Classification Search
CPC ...... A47L 9/2805; A47L 9/2857; A47L 11/24; A47L 11/4011; A47L 11/4025; A47L 11/4091; A47L 2201/04; A47L 11/40; A47L 11/4002; A47L 11/4061; A47L 2201/022; A47L 2201/024; G05D 1/0282; G05D 2201/0203; G06F 3/01; G06F 3/16; G06F 3/167; G06F 16/00; G07C 5/0808; G05B 19/04; G08C 17/02; G10L 15/22; G10L 2015/223
See application file for complete search history.

(56) References Cited

U.S. PATENT DOCUMENTS

| | | | |
|---|---|---|---|
| 6,415,203 B1 * | 7/2002 | Inoue ..................... B25J 19/005 | |
| | | | 701/79 |
| 6,532,404 B2 | 3/2003 | Colens | |
| 6,584,376 B1 * | 6/2003 | Van Kommer ...... G05D 1/0022 | |
| | | | 379/90.01 |
| 6,594,844 B2 | 7/2003 | Jones | |
| 6,654,720 B1 | 11/2003 | Glen et al. | |
| 6,690,134 B1 | 2/2004 | Jones et al. | |
| 6,708,081 B2 | 3/2004 | Yoshida | |
| 6,778,073 B2 | 8/2004 | Lutter et al. | |
| 6,781,338 B2 | 8/2004 | Jones et al. | |
| 6,809,490 B2 | 10/2004 | Jones et al. | |
| 6,965,209 B2 | 11/2005 | Jones et al. | |
| 7,155,308 B2 | 12/2006 | Jones | |
| 7,173,391 B2 | 2/2007 | Jones et al. | |
| 7,196,487 B2 | 3/2007 | Jones et al. | |
| 7,388,343 B2 | 6/2008 | Jones et al. | |
| 7,389,156 B2 | 6/2008 | Ziegler et al. | |
| 7,448,113 B2 | 11/2008 | Jones et al. | |
| 7,571,511 B2 | 8/2009 | Jones et al. | |
| 7,636,982 B2 | 12/2009 | Jones et al. | |
| 7,761,954 B2 | 7/2010 | Ziegler | |
| 8,634,956 B1 | 1/2014 | Chiappetta et al. | |
| 9,008,835 B2 | 4/2015 | Dubrovsky et al. | |
| 9,037,296 B2 | 5/2015 | Choe et al. | |
| 9,220,386 B2 | 12/2015 | Gilbert, Jr. et al. | |
| 9,320,409 B1 | 4/2016 | Lu et al. | |
| 9,612,722 B2 | 4/2017 | Miller et al. | |
| 10,071,891 B2 * | 9/2018 | High ....................... G10L 17/22 | |

| | | | |
|---|---|---|---|
| 10,170,123 B2 | 1/2019 | Orr et al. | |
| 10,276,170 B2 | 4/2019 | Gruber et al. | |
| 11,020,860 B2 | 6/2021 | Cheuvront et al. | |
| 2002/0016649 A1 | 2/2002 | Jones | |
| 2002/0067257 A1 | 6/2002 | Thomas et al. | |
| 2002/0081937 A1 * | 6/2002 | Yamada ................. A63H 11/00 | |
| | | | 446/175 |
| 2002/0120364 A1 | 8/2002 | Colens | |
| 2003/0004727 A1 | 1/2003 | Keiller et al. | |
| 2003/0025472 A1 | 2/2003 | Jones et al. | |
| 2004/0020000 A1 | 2/2004 | Jones | |
| 2004/0049877 A1 | 3/2004 | Jones et al. | |
| 2004/0187457 A1 | 9/2004 | Colens | |
| 2004/0207355 A1 | 10/2004 | Jones et al. | |
| 2005/0067994 A1 | 3/2005 | Jones et al. | |
| 2005/0204717 A1 | 9/2005 | Colens | |
| 2005/0287038 A1 * | 12/2005 | Dubrovsky .......... G05D 1/0225 | |
| | | | 422/63 |
| 2006/0031155 A1 | 2/2006 | Motoama et al. | |
| 2006/0235570 A1 * | 10/2006 | Jung .................... G05D 1/0022 | |
| | | | 701/23 |
| 2007/0192910 A1 * | 8/2007 | Vu .......................... H04N 7/142 | |
| | | | 901/1 |
| 2007/0234492 A1 | 10/2007 | Svendsen et al. | |
| 2007/0266508 A1 | 11/2007 | Jones et al. | |
| 2008/0134458 A1 * | 6/2008 | Ziegler ............... F04D 29/4233 | |
| | | | 15/340.1 |
| 2008/0140255 A1 | 6/2008 | Ziegler et al. | |
| 2008/0155768 A1 | 7/2008 | Ziegler et al. | |
| 2008/0307590 A1 | 12/2008 | Jones et al. | |
| 2010/0049365 A1 | 2/2010 | Jones et al. | |
| 2010/0076600 A1 | 3/2010 | Cross et al. | |
| 2010/0114371 A1 * | 5/2010 | Tsusaka ................. B25J 9/0084 | |
| | | | 700/250 |
| 2010/0121156 A1 | 5/2010 | Yoo | |
| 2010/0257690 A1 | 10/2010 | Jones et al. | |
| 2010/0257691 A1 | 10/2010 | Jones et al. | |
| 2010/0263158 A1 | 10/2010 | Jones et al. | |
| 2011/0010033 A1 | 1/2011 | Asahara et al. | |
| 2011/0137457 A1 | 6/2011 | Zinni et al. | |
| 2012/0239224 A1 | 9/2012 | McCabe et al. | |
| 2012/0323365 A1 | 12/2012 | Taylor et al. | |
| 2013/0098402 A1 | 4/2013 | Yoon et al. | |
| 2013/0110520 A1 | 5/2013 | Cheyer et al. | |
| 2013/0253701 A1 | 9/2013 | Halloran et al. | |
| 2013/0268119 A1 * | 10/2013 | Weinberg ............. B25J 11/0005 | |
| | | | 700/264 |
| 2013/0290234 A1 * | 10/2013 | Harris .................... G06Q 30/00 | |
| | | | 901/50 |
| 2014/0116469 A1 * | 5/2014 | Kim .................... A47L 11/4061 | |
| | | | 15/319 |
| 2014/0167931 A1 * | 6/2014 | Lee ..................... H04L 12/2818 | |
| | | | 340/12.5 |
| 2014/0181683 A1 * | 6/2014 | Lim ..................... H04L 63/108 | |
| | | | 715/740 |
| 2014/0207280 A1 | 7/2014 | Duffley et al. | |
| 2014/0207282 A1 | 7/2014 | Angle et al. | |
| 2014/0365018 A1 * | 12/2014 | Kusukame .......... H04L 12/2825 | |
| | | | 700/276 |
| 2014/0376747 A1 | 12/2014 | Mullet et al. | |
| 2015/0032260 A1 | 1/2015 | Yoon et al. | |
| 2015/0052443 A1 * | 2/2015 | Funase .................. G06F 3/0484 | |
| | | | 715/736 |
| 2015/0197007 A1 | 7/2015 | Pack et al. | |
| 2015/0298315 A1 | 10/2015 | Shick et al. | |
| 2015/0312774 A1 | 10/2015 | Lau | |
| 2015/0324753 A1 | 11/2015 | Dantuluri et al. | |
| 2015/0375395 A1 * | 12/2015 | Kwon ................... A47L 9/2873 | |
| | | | 901/30 |
| 2016/0023357 A1 | 1/2016 | Dubrovsky et al. | |
| 2016/0034253 A1 * | 2/2016 | Bang ................... G06F 3/04883 | |
| | | | 715/728 |
| 2016/0075015 A1 * | 3/2016 | Izhikevich ............... B25J 9/163 | |
| | | | 901/5 |
| 2016/0109884 A1 | 4/2016 | Chiappetta | |
| 2016/0123759 A1 * | 5/2016 | Miller ................. G06F 16/9537 | |
| | | | 701/400 |

(56) References Cited

U.S. PATENT DOCUMENTS

| | | | | |
|---|---|---|---|---|
| 2016/0154996 A1* | 6/2016 | Shin | G06F 3/167 | |
| | | | 901/1 | |
| 2016/0173318 A1* | 6/2016 | Ha | H04W 4/02 | |
| | | | 709/223 | |
| 2016/0180848 A1* | 6/2016 | Mengibar | G06Q 30/0275 | |
| | | | 704/251 | |
| 2016/0259308 A1* | 9/2016 | Fadell | G05B 15/02 | |
| 2016/0260135 A1* | 9/2016 | Zomet | H04L 67/535 | |
| 2016/0274579 A1* | 9/2016 | So | G05D 1/2235 | |
| 2016/0274580 A1* | 9/2016 | Jung | A47L 11/4013 | |
| 2016/0315996 A1* | 10/2016 | Ha | H04L 12/2821 | |
| 2016/0373588 A1 | 12/2016 | Raleigh | | |
| 2017/0000307 A1* | 1/2017 | Choi | A47L 11/4011 | |
| 2017/0068935 A1 | 3/2017 | Cohen | | |
| 2017/0090864 A1* | 3/2017 | Jorgovanovic | H04M 11/007 | |
| 2017/0157766 A1* | 6/2017 | Kamhi | B25J 9/161 | |
| 2017/0212210 A1* | 7/2017 | Chen | G01S 5/06 | |
| 2017/0236512 A1* | 8/2017 | Williams | G10L 13/02 | |
| | | | 381/79 | |
| 2018/0165978 A1 | 6/2018 | Wood | | |
| 2018/0176030 A1* | 6/2018 | Bui Tran | G09B 5/067 | |
| 2018/0285065 A1 | 10/2018 | Jeong et al. | | |

FOREIGN PATENT DOCUMENTS

| | | | | | | |
|---|---|---|---|---|---|---|
| CN | 104423797 | | 3/2015 | | | |
| CN | 104470685 | | 3/2015 | | | |
| CN | 104605794 | | 5/2015 | | | |
| CN | 204600372 | | 5/2015 | | | |
| CN | 204576270 | | 8/2015 | | | |
| CN | 104887155 | | 9/2015 | | | |
| CN | 105138015 | A | * | 12/2015 | | |
| CN | 105259898 | A | * | 1/2016 | | |
| CN | 105310604 | | 2/2016 | | | |
| CN | 105380575 | A | * | 3/2016 | | A47L 11/24 |
| CN | 105446332 | A | * | 3/2016 | | |
| CN | 105492984 | | 4/2016 | | | |
| CN | 103784079 | | 5/2016 | | | |
| CN | 205272042 | U | * | 6/2016 | | |
| CN | 105281998 | | 12/2016 | | | |
| CN | 106302562 | A | * | 1/2017 | | |
| CN | 106302562 | B | * | 12/2019 | | |
| DE | 102015220840 | B4 | * | 11/2018 | | A47L 9/2852 |
| EP | 2725443 | | 4/2014 | | | |
| EP | 2938022 | | 10/2015 | | | |
| EP | 2980694 | A2 | * | 2/2016 | | G06F 3/048 |
| EP | 3557406 | A2 | * | 4/2019 | | G06F 9/451 |
| ES | 2706729 | T3 | * | 4/2019 | | A47L 11/24 |
| FR | 2938022 | | 5/2010 | | | |
| JP | 2004097264 | | 4/2004 | | | |
| JP | 2006277121 | | 10/2006 | | | |
| JP | 2007094743 | | 4/2007 | | | |
| JP | 2007181652 | | 7/2007 | | | |
| JP | 2009251397 | | 10/2009 | | | |
| JP | 5207975 | B2 | * | 6/2013 | | A47L 11/24 |
| JP | 2014221150 | | 11/2014 | | | |
| JP | 2015011463 | A | * | 1/2015 | | |
| JP | 2015535373 | | 12/2015 | | | |
| JP | 2016087106 | A | | 5/2016 | | |
| JP | 2016090655 | | 5/2016 | | | |
| JP | 2016513981 | | 5/2016 | | | |
| JP | 2015169759 | | 2/2017 | | | |
| JP | 2017047519 | A | * | 3/2017 | | |
| KR | 20120126772 | A | * | 11/2012 | | G05D 1/0297 |
| TW | 201415182 | A | * | 4/2021 | | |
| WO | WO 2013/108552 | | 7/2013 | | | |
| WO | WO 2015/183005 | | 12/2015 | | | |
| WO | WO 2015/183401 | | 12/2015 | | | |
| WO | WO-2016165793 | A1 | * | 10/2016 | | A61L 2/10 |

OTHER PUBLICATIONS

JP5207975B2_RobotSystem_AutomousCleaning.pdf (Year: 2013).*
JP5207975B2_RobotSystem_AutonomousCleaning (Year: 2013).*
"Facts on the Trilobite," Electrolux, accessed online <http://trilobite. electrolux.se/presskit_en/node1335.asp?print=yes&pressID=> Dec. 12, 2003, 2 pages.
"Welcome to the Electrolux Trilobite," Electrolux, accessed online <http://electroluxusa.com/node57.asp?currentURL=node142.asp%3F> Mar. 18, 2005, 2 pages.
Doty, K. L., and Harrison, R. R., Sweep Strategies for a Sensory-Driven, Behavior-Based Vacuum Cleaning Agent, AAAI 1993 Fall Symposium Series, Instantiating Real-World Agents, Research Triangle Park, Raleigh, NC, Oct. 22-24, 1993, pp. 1-6.
EP Extended European Partial Search Report in EP Appln. No. 17813796.4, Mar. 17, 2020, 13 pages.
Everett, H.R. (1995). Sensors for Mobile Robots. AK Peters, Ltd., Wellesley, MA.
Hitachi: News release: The home cleaning robot of the autonomous movement type (experimental machine) is developed. May 29, 2003. Accessed online Mar. 18, 2005 <http://www.i4u.com/japanreleases/hitachirobot.htm> 5 pages.
Honda Motor Co., Ltd., English Translation of JP11212642, Aug. 9, 1999, 31 pages.
International Search Report and Written Opinion in International Application PCT/US2017/036085, dated Sep. 22, 2017, 41 pages.
Jones, J., Roth, D. (Jan. 2, 2004). Robot Programming: A Practical Guide to Behavior-Based Robotics. McGraw-Hill Education TAB; 288 pages.
Karcher RC 3000 Robotic Cleaner, Product page, accessed online <http://www.karcher-usa.com/showproducts.php?op-view_prod ¶m1=143&param2=&param3=> Mar. 18, 2005, 3 pages.
Karcher RoboCleaner RC 3000, Dec. 12, 2003, 4 pages.
Karcher, Product Manual Download, 2003, 16 pages.
Prassler, et al., English Translation of DE19849978, Feb. 8, 2001, 16 pages.
Sharp Global, "Robotic Vacuum Cleaner, COCOROBO Engine," Sharp.com, accessed on May 5, 2016, retrieved from < URL: http://www.sharp.com.my/cocorobo/products/robotic_appliance/tech/voice-operation/index.html, > 2 pages.
EP Extended European Search Report in EP Appln. No. 17813796. 4, dated Jun. 25, 2020, 11 pages.
International Preliminary Report on Patentability in International Application No. PCT/US2017/036085, dated Dec. 18, 2018, 23 pages.

* cited by examiner

SYSTEMS AND METHODS TO CONTROL AN AUTONOMOUS MOBILE ROBOT

CROSS-REFERENCE TO RELATED APPLICATIONS

This application is a continuation application of, and claims priority to, U.S. patent application Ser. No. 15/614,844, filed on Jun. 6, 2017, which application claims priority to U.S. Provisional Application Ser. No. 62/350,382, filed on Jun. 15, 2016. The disclosure of each of the foregoing applications is incorporated herein by reference.

TECHNICAL FIELD

This specification relates to systems and methods for controlling autonomous mobile robots, in particular, for controlling autonomous mobile robots using audio media devices.

BACKGROUND

Many home environments include mobile robots that autonomously navigate through the home while performing certain operations to complete tasks that would otherwise require the attention of occupants in the home. For example, some mobile robots are cleaning robots that can autonomously perform cleaning operations within defined areas using programs stored in memories coupled to controllers. A cleaning robot can clean a home without the need for the user to manually move the cleaning robot about the home. The cleaning robot can include a manual input device, e.g., a button that the user presses to initiate the autonomous cleaning operation within the home.

These same home environments often include computing devices, such as desktops, tablets, entertainment systems, and portable communication devices. To enable users to control computing devices, the computing devices can include manual input devices (e.g., touchscreens, keyboards, pointing devices) that provide the user with manual control over operations of the computing devices. Some of these computing devices allow a user to control a mobile robot using an application program stored on the computing devices.

SUMMARY

In one aspect, a method for controlling one or more operations of an autonomous mobile robot maneuverable within a home includes establishing wireless communication between an autonomous mobile robot and a remote computing system and, in response to receiving a wireless command signal from the remote computing system, initiating one or more operations of the autonomous mobile robot. The autonomous mobile robot is remote from an audio media device stationed within the home. The audio media device is capable of receiving and emitting audio. The remote computing system is configured to associate identification data of the autonomous mobile robot with identification data of the audio media device. The wireless command signal corresponds to an audible user command received by the audio media device.

In another aspect, a method for controlling one or more operations of an autonomous mobile robot maneuverable within a home includes associating identification data of the autonomous mobile robot with identification data of an audio media device and establishing wireless communication with each of the autonomous mobile robot and the audio media device. The method further includes transmitting, upon receiving a wireless instruction signal from the audio media device, a wireless command signal to the autonomous mobile robot to initiate one or more operations of the autonomous mobile robot. The audio media device is capable of receiving and emitting audio. The audio media device is stationed within the home at a location remote from the autonomous mobile robot. The wireless instruction signal corresponds to an audible user command received by the audio media device.

In another aspect, a method of providing status of an autonomous mobile robot maneuverable within a home includes establishing wireless communication between an audio media device and a remote computing system and emitting an audible signal that represents an operating status of the autonomous mobile robot in response to receiving a wireless notification signal from the remote computing system. The audio media device is capable of receiving and emitting audio and is stationed within a home at a location remote from the autonomous mobile robot. The remote computing system is configured to associate identification data of the autonomous mobile robot with identification data of the audio media device. The wireless notification signal corresponds to status data received by the remote computing system as the autonomous mobile robot autonomously navigates about the home relative to the audio media device.

In another aspect, a method of providing status of an autonomous mobile robot positioned within a home includes associating identification data of the autonomous mobile robot with identification data of an audio media device and establishing wireless communication with each of the autonomous mobile robot and the audio media device. The method further includes, upon receiving data indicative of an operating status of the autonomous mobile robot, transmitting a wireless notification signal to cause the audio media device to emit an audible signal that represents the operating status of the autonomous mobile robot. The audio media device is capable of receiving and emitting audio. The audio media device is stationed within the home at a location remote from the autonomous mobile robot.

In another aspect, a method for controlling one or more operations of an autonomous mobile robot maneuverable within a home includes establishing wireless communication between an audio media device and a remote computing system and, in response to receiving an audible user command, transmitting a wireless instruction signal to the remote computing system to initiate one or more operations of the autonomous mobile robot. The audio media device is capable of receiving and emitting audio and is stationed within a home at a location remote from the autonomous mobile robot. The remote computing system is configured to associate identification data of the autonomous mobile robot with identification data of the audio media device.

In another aspect, a method of providing status of an autonomous mobile robot maneuverable within a home includes establishing wireless communication between an autonomous mobile robot and a remote computing system and, while autonomously navigating about the home relative to an audio media device, transmitting, from the autonomous mobile robot to the remote computing system, status data indicative of an operating status of the autonomous mobile robot to cause the audio media device to emit an audible signal that represents the operating status of the autonomous mobile robot. The autonomous mobile robot is remote from the audio media device. The audio media device is stationed within the home. The audio media device is capable of receiving and emitting audio. The remote computing system is configured to associate identification data of the autonomous mobile robot with identification data of the audio media device.

In another aspect, an autonomous mobile robot includes a chassis, a sensing system to generate signals for generating a map of a home, locomotive members to support the chassis on a floor surface within the home, and a controller operable with a wireless communication system. The locomotive members are drivable to autonomously navigate the autonomous mobile robot about the floor surface while the sensing system generates the signals for generating the map of the home. The controller is configured to initiate, in response to receiving a wireless command signal from a remote computing system, one or more operations of the autonomous mobile robot. The wireless command signal corresponds to an audible user command received by an audio media device capable of receiving and emitting audio.

In another aspect, an autonomous mobile robot includes at least one drive wheel operable to move the mobile robot across a floor surface, a sensor system including a navigation sensor, a controller in communication with the sensor system, and a wireless communication system in communication with the controller. The controller is configured to control movement of the mobile robot based on sensor signals generated by the navigation sensor. The controller is configured to initiate, in response to receiving a wireless command signal from a remote computing system, one or more operations of the mobile robot. The wireless command signal is indicative of a user requested action and is based on an audible user command received by an audio media device capable of receiving and emitting audio.

Certain aspects can include one or more implementations described below and herein elsewhere. In some examples, the controller performs one or more of the foregoing methods.

In some examples, the one or more operations include autonomously navigating about the home relative to the audio media device. The autonomous mobile robot can include an autonomous cleaning robot. The one or more operations can include autonomously navigating to a docking station for the autonomous mobile robot. The one or more operations can include autonomously navigating toward the audio media device. One or more of the methods can further include receiving a position signal from the remote computing system and autonomously navigating about the home relative to the audio media device while localizing to the location of the audio media device. The position signal can be indicative of the location of the audio media device within the home. One or more of the methods can include, while autonomously navigating about the home, generating a map of the home including positions of devices in wireless communication with the remote computing system.

In some examples, the one or more operations include pausing a cleaning operation of the autonomous mobile robot.

In some examples, initiating the one or more operations includes initiating a cleaning operation of the autonomous mobile robot.

In some examples, one or more of the methods further includes autonomously navigating about the home while performing a cleaning operation. One or more of the methods can further include, in response to receiving the wireless command signal from the remote computing system, initiating a localized cleaning operation within a portion of the home by navigating the autonomous mobile robot in a predefined pattern within the portion of the home and increasing an amount of power delivered to a cleaning apparatus of the autonomous mobile robot.

In some examples, the one or more operations include emitting an audible signal.

In some examples, the one or more operations include storing a user-defined schedule to perform a subsequent operation at a future time. The one or more operations can include performing the subsequent operation at the future time.

In some examples, the audible user command includes an audible identifier indicative of the identification data of the autonomous mobile robot and a voice command corresponding to the one or more operations of the autonomous mobile robot. One or more of the methods can further include generating the wireless command signal based on the voice command and selecting a destination for the wireless command signal based on the audible identifier.

In some examples, one or more of the methods further includes determining, upon receiving an initial user command including an audible identifier indicative of a robot type, that the identification data of the autonomous mobile robot includes the robot type and other identification data of other robots associated with the identification data of the audio media device include the robot type. One or more of the methods can include transmitting a wireless notification signal to cause the audio media device to emit an audible request for an audible identifier indicative of a unique identity of the autonomous mobile robot. The audible user command can correspond to a user response to the audible request. Transmitting the wireless notification signal can occur after determining that the identification data of the autonomous mobile robot includes the robot type and the other identification data.

In some examples, one or more of the methods further includes receiving an initial audible user command including an audible identifier indicative of an identification of another autonomous mobile robot that is not associated with the audio media device. One or more of the methods can further include transmitting a wireless notification signal to cause the audio media device to emit an audible notification indicating that the other autonomous mobile robot is not associated with the audio media device.

In some examples, one or more of the methods further includes receiving an initial audible user command that does not include any one of a plurality of available voice commands corresponding to the one or more operations of the autonomous mobile robot. One or more of the methods can further include transmitting a wireless notification signal to cause the audio media device to emit an audible notification indicating that the initial audible user command does not include a voice command corresponding to any one of the available voice commands.

In some examples, one or more of the methods further includes estimating a position of the user based on an acoustic characteristic of the audible user command. Transmitting the wireless command signal can include transmitting the wireless command signal to cause the autonomous mobile robot to navigate toward the estimated position of the user.

In some examples, one or more of the methods further includes associating identification data of another autonomous mobile robot with the identification data of the audio media device. The identification data of the autonomous mobile robot can correspond to a first audible identifier, and the identification data of the other autonomous mobile robot can correspond to a second audible identifier distinct from the first audible identifier.

In some examples, the audible user command includes an audible location identifier corresponding to a predefined location within the home. One or more of the methods can further include associating identification data of another autonomous mobile robot with the identification data of the audio media device. Transmitting the wireless command signal to the autonomous mobile robot can include transmitting the wireless command signal to the autonomous mobile robot upon determining that a distance of the autonomous mobile robot to the predefined location is less than a distance of the other autonomous mobile robot to the predefined location.

In some examples, the audible user command includes an audible location identifier corresponding to one predefined location of a plurality of predefined locations within the home. Transmitting the wireless command signal to the autonomous mobile robot can include transmitting the wireless command signal to the autonomous mobile robot to cause the autonomous mobile robot to navigate to the one predefined location.

In some examples, one or more of the methods further includes receiving an initial audible user command including an audible scheduling parameter corresponding to a future time for transmitting the wireless command signal to the autonomous robot to perform the one or more operations. One or more of the methods can further include transmitting, upon determining that the future time conflicts with an event in a user event calendar, a wireless notification signal to cause the audio media device to emit an audible notification indicating the future time conflicts with the event.

In some examples, one or more of the methods further includes receiving an initial audible user command to schedule an event in a user event calendar. One or more of the methods can further include transmitting, upon determining that the event corresponds to a predetermined event type, a wireless notification signal to cause the audio media device to emit an audible request. The audible user command can include confirmation of the audible request. Transmitting the wireless command signal can include transmitting the wireless command signal to the autonomous mobile robot to initiate one or more operations of the autonomous mobile robot within a predefined period before the event.

In some examples, emitting the audible signal includes emitting the audible signal after determining that a user has entered the home.

In some examples, the operating status of the autonomous mobile robot includes a schedule of previous operations. Emitting the audible signal can include emitting an audible request to modify the stored schedule of operations based on the schedule of previous operations.

In some examples, the operating status corresponds to a stasis condition of the autonomous mobile robot within the home. Emitting the audible signal can include emitting the audible signal to indicate that the autonomous mobile robot is in the stasis condition. The audible signal can indicate a location of the autonomous mobile robot within the home.

In some examples, emitting the audible signal includes emitting the audible signal to indicate a frequency of previous operations of the autonomous mobile robot.

In some examples, emitting the audible signal includes emitting the audible signal to indicate a total duration of previous operations of the autonomous mobile robot within a predefined period.

In some examples, emitting the audible signal includes emitting the audible signal to indicate an estimated remaining service life of a component of the autonomous mobile robot. The component of the autonomous mobile robot can be a cleaning brush, a cleaning pad, a roller, a battery, debris bin, or a wheel module.

In some examples, emitting the audible signal includes emitting the audible signal to identify an obstacle detected by the autonomous mobile robot while the autonomous mobile robot navigates within the home.

In some examples, emitting the audible signal includes emitting the audible signal to identify a connected device located within the home. The connected device can be wirelessly connected to the remote computing system and being associated with the audio media device.

In some examples, emitting the audible signal includes emitting audible instructions to guide a user to address a basis of an error associated with the autonomous mobile robot in response to detection of the error.

In some examples, emitting the audible signal includes emitting the audible signal after the autonomous mobile robot autonomously navigates about the home. The audible signal can identify an area of the home that the autonomous mobile robot did not traverse while autonomously navigating.

In some examples, emitting the audible signal includes emitting the audible signal upon receiving an audible user request for the operation status of the autonomous mobile robot.

In some examples, transmitting the wireless notification signal includes, upon determining that an estimating remaining service life of a replaceable component of the autonomous mobile robot is less than a predefined threshold, transmitting the wireless notification signal to cause the audio media device to emit the audible signal. The audible signal can include an offer to purchase a replacement component for the component of the autonomous mobile robot. One or more of the methods can further include placing an order for the replacement component upon receiving an audible user command including a confirmation to purchase the replacement component.

In some examples, associating the identification data of the autonomous mobile robot with the identification data of the audio media device includes transmitting a wireless command signal based on emission and receipt of an audible association request and associating the identification data of the autonomous mobile robot with the identification data of the audio media device upon receiving confirmation of the receipt of the audible associated request. One of the autonomous mobile robot and the audio media device can emit the audible association request, and the other of the autonomous mobile robot and the audio media device can receive the audible association request.

In some examples, one or more of the methods further includes determining a location of the autonomous mobile robot within the home based on an audible status signal emitted by the autonomous mobile robot and received by the audio media device, wherein emitting the audible signal comprises emitting the audible signal to indicate the location of the autonomous mobile robot.

In some examples, the mobile robot is remote from the audio media device, and the audio media device is stationed within the home. The controller can be further configured to establish wireless communication with the remote computing system when the remote computing system associates identification data of the mobile robot with identification data of the audio media device.

In some examples, the autonomous mobile robot further includes the audio media device. The audio media device can be mounted to the chassis of the autonomous mobile robot.

In some examples, the autonomous mobile robot further includes a variable height member on the chassis and a camera supported by the variable height member. The variable height member can be configured to move vertically relative to the chassis to multiple camera height positions. The sensing system can include the camera. The camera can be configured to capture images of the home for generating the map of the home. The one or more operations can include autonomously navigating the autonomous mobile robot to a selected location within the home and moving the variable height member to a selected camera height position to observe, using the camera, an object within the home. The object can be identified in the audible user command received by the audio media device.

In some examples, the audio media device is in wireless communication with the remote computing system and stationed within an environment at a location remote from the autonomous mobile robot.

In some examples, the audio media device is in wireless communication with the remote computing system and stationed within an environment at a location remote from the autonomous mobile robot.

In some examples, the controller is configured to generate a map of an environment based on the sensor signals. In some cases, the navigation sensor includes a camera configured for visual identification of features and landmarks used in calculating a robot pose on the generated map.

In some examples, the mobile robot is configured to perform multiple missions, and transmit a wireless signal indicative of cumulative data measured by the sensor system for each of the multiple missions to cause the audio media device to emit a cumulative summary based on the cumulative data.

In some examples, the sensor system is configured to provide data indicative of a robot status to the controller. The mobile robot can be configured to transmit a wireless signal indicative of the robot status to cause the audio media device to emit an audible status update.

In some cases, the data is indicative of a total duration that the mobile robot has been operating across multiple missions, a number of missions that the mobile robot has performed, a total cumulative distance of traversed floor surface, or a distance that the mobile robot has travelled.

In some cases, the mobile robot is a vacuum cleaning robot. The sensor system can be configured to provide data indicative of a total amount of debris collected by the mobile robot across multiple missions.

In some cases, the mobile robot is a vacuum cleaning robot operable with a docking station that evacuates debris from the vacuum cleaning robot. The mobile robot can be configured to send, to the remote computing system via the wireless communication system, data to enable the remote computing system to calculate an average number of evacuation operations per week, a number of evacuation operations performed during a certain period of time, or a number of evacuation operations performed over an area covered by the mobile robot during a certain period of time.

In some examples, the mobile robot further includes a serviceable component, and one or more sensors configured to generate signals indicative of an estimated service life of the serviceable component. In some cases, the serviceable component includes a cleaning brush, a cleaning pad, a roller, a blade, a battery, a bin, a wheel, a bin filter, or a bin lid. In some cases, the controller is configured to transmit a wireless signal indicative of an estimated remaining service life of the serviceable component in response to an audible user command received by the audio media device.

In some examples, the mobile robot further includes a stall sensor unit configured to detect a stalled state of the mobile robot. The controller can be configured to transmit a wireless signal indicative of the detected stalled state of the mobile robot to cause the audio media device to emit a status update indicating the mobile robot is in the stalled state. In some cases, the stall sensor unit includes an optical stasis sensor, a motor stall sensor, a mouse sensor, a gyroscope, an accelerometer, or stereo cameras.

In some examples, the controller is configured to transmit, in response to the sensor system detecting an error, a wireless signal indicative of the error to cause the audio media device to emit an initial audible instruction to address the error.

In some examples, the mobile robot is a vacuum cleaning robot. The controller can be configured to control movement of the vacuum cleaning robot to a user-specified room in an environment in response to receiving the wireless command signal, wherein the audible user command and the wireless command signal are indicative of the user-specified room.

In some examples, the mobile robot is a vacuum cleaning robot. The controller can be configured to adjust a vacuum strength in response to the wireless command signal.

In some examples, the controller is configured to adjust a stored schedule of operations in response to the wireless command signal.

In some examples, the mobile robot is configured to transmit, in response to the wireless command signal, a wireless signal to cause the audio media device to emit an audible signal indicative of a current location of the mobile robot.

In some examples, the mobile robot is a vacuum cleaning robot including a debris bin, rotatable rollers configured to agitate debris from the floor surface, and an air mover configured to move the debris from the floor surface toward the debris bin. In some cases, the mobile robot further includes a debris bin level sensor configured to detect an amount of debris ingested into the debris bin. In some cases, the mobile robot further includes one or more debris sensors configured to detect a rate of debris ingestion. In some cases, the mobile robot further includes a debris filter and a filter sensor to detect whether the debris filter requires cleaning.

Advantages of the foregoing may include, but are not limited to, those described below and herein elsewhere. The systems and methods described herein reduce the need for the user to manually interact with the mobile robot to initiate or control robot operations within the home. In particular, the user may issue voice commands to the audio media device to control the mobile robot, thus enabling the user to control the mobile robot even if the user does not have hands available to operate manual input devices operable with the mobile robot. The user also may receive notifications regarding the status of the mobile robot without having to be physically proximate the mobile robot. The audio media device can be positioned to provide audible notifications to the user and can provide these notifications to the user as the mobile robot autonomously navigates about the home, in some cases, away from the vicinity of the user. Because the audio media device emits notifications that are audible, the user may be informed of the status of the mobile robot without having to divert the user's visual attention.

The systems and methods described herein may further provide the mobile robot and the audio media device with additional data regarding conditions of the home that can improve operations of the mobile robot and the audio media device. In some examples, data collected by sensors of the audio media device can be used in conjunction with data uploaded to the audio media device or collected by sensors of the mobile robot to improve accuracy or precision of maps of the home that the mobile robot constructs during autonomous navigation within the home. The mobile robot also can use the data uploaded to the audio media device or collected by the audio media device to improve localization of the mobile robot within the home, thereby reducing errors in navigational behavior for the mobile robot.

The systems and methods described herein also can reduce inefficiencies associated with user interactions with or related to the mobile robot. For example, the systems and methods describe predicting recommended actions that, if performed, may prevent errors in operations of the mobile robot from occurring. The audio media device can notify the user of the recommended actions before the user typically would notice that such actions would be beneficial. In some cases, the remote computing system can perform the recommended actions, thereby reducing time spent by the user to address errors or potential errors associated with the mobile robot.

The details of one or more implementations of the subject matter described in this specification are set forth in the accompanying drawings and the description below. Other potential features, aspects, and advantages will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
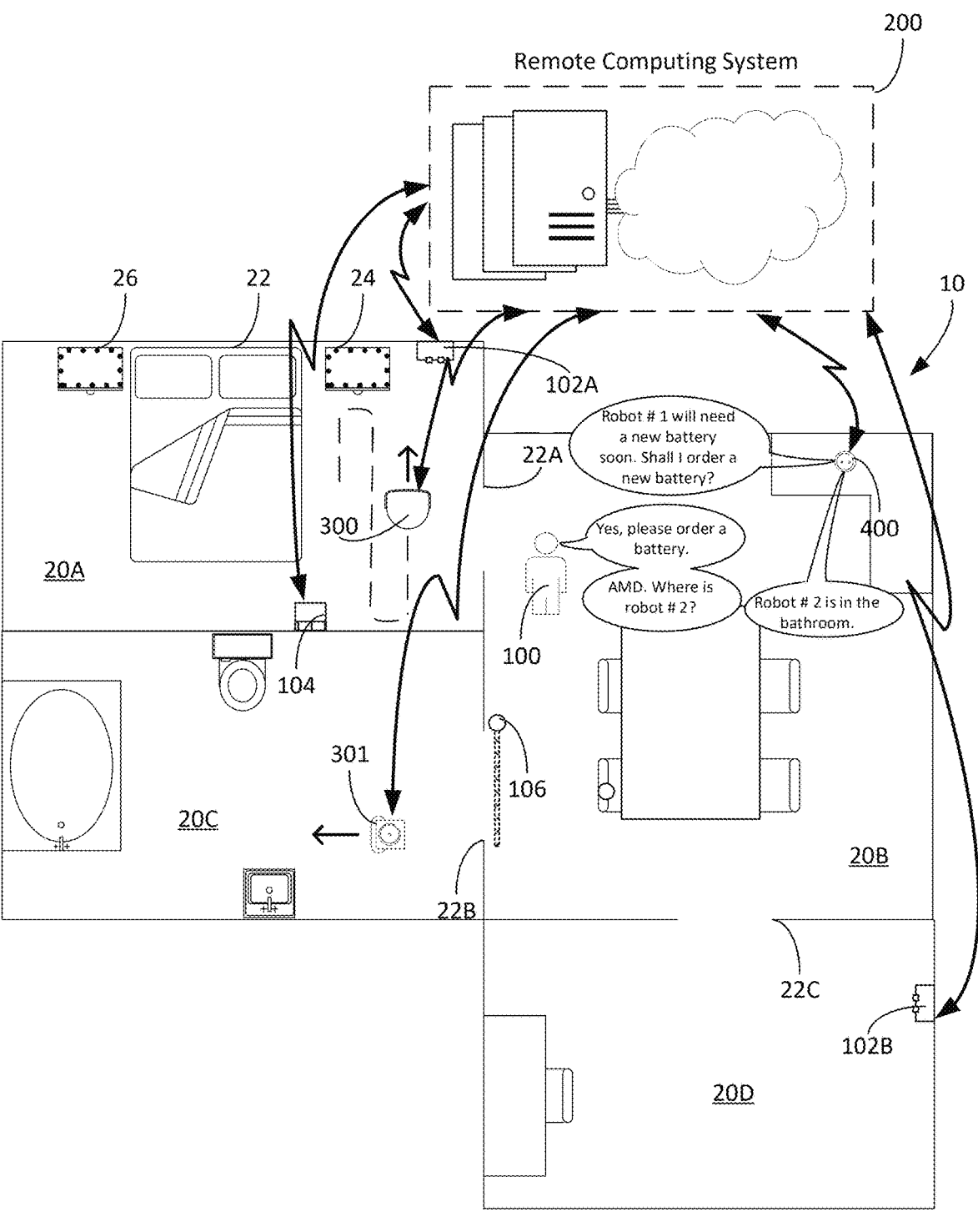
FIG. 1 is a schematic top view of a mobile robot navigating about a home environment.

Referring to FIG. 1, a remote computing system 200 can control a mobile robot 300 according to voice commands that a user 100 directs toward an audio media device 400.

Figure 2:
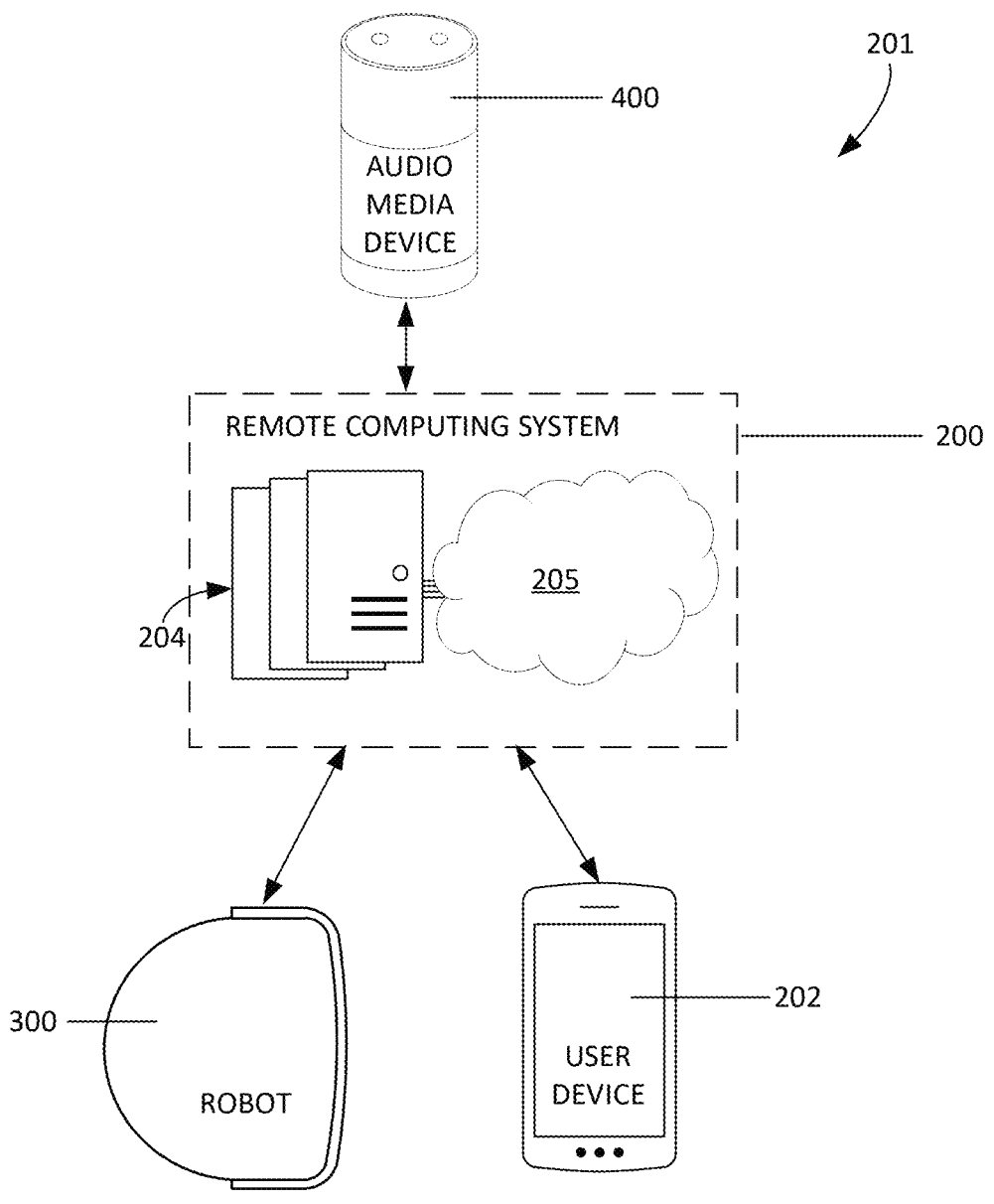
FIG. 2 is a block diagram of a control system.

Similarly, the remote computing system 200 can cause the audio media device 400 to emit audible signals indicative of operations of the mobile robot 300. Referring to FIG. 2, which depicts a diagram of an example communication network 201, the mobile robot 300 and the audio media device 400 are both wirelessly linked to the remote computing system 200 (graphically represented as a server included in the computing system) to enable communication between the remote computing system 200 and the mobile robot 300 and communication between the remote computing system 200 and the audio media device 400.

The communication network 201 enables the user's voice commands directed to the audio media device 400 to be used as a basis for command signals to control operations of the mobile robot 300. The user 100 operates the audio media device 400 to command the mobile robot 300 by uttering an audible command, which the audio media device 400 receives. The remote computing system 200, being communicatively linked to the audio media device 400, can receive a signal from the audio media device 400 corresponding to the audible command and then transmit another signal (or multiple signals) to the mobile robot 300 to cause the mobile robot 300 to perform an operation according to the user's audible command.

In certain examples, the audio media device 400 emits an audible signal including an audible notification informing the user 100 of a status of operations of the mobile robot 300. The remote computing system 200 generates a command signal to be transmitted to audio media device 400 by analyzing input signals from one or more of the mobile robot 300, a mobile computing device 202 (e.g., a smart phone shown in FIG. 2) or other appropriate sources that can provide information regarding status of operations of the mobile robot 300. The remote computing system 200 then transmits the command signal to the audio media device 400 to cause the audio media device 400 to emit the audible signal, thereby providing the user 100 with information regarding the operations of the mobile robot.

In some cases, the information provided to the user 100 by the audible signal includes a request to perform a recommended action addressing a present need or a predicted need for the mobile robot 300. The remote computing system 200 may predict that the recommended action may improve the efficiency or efficacy of operations of the mobile robot 300. The audio media device 400 emits an audible request, for example, to adjust operations of the mobile robot 300 or to perform an action in support of the operations of the mobile robot 300. If the user 100 verbally responds to the audio media device 400 assenting to the audible request, the remote computing system 200 causes the action to be performed to address the need for the mobile robot 300. For instance, in one example, if the recommended action is an adjustment to a user-defined schedule for the mobile robot 300, the remote computing system 200 transmits an adjusted schedule to the mobile robot 300 and causes the mobile robot 300 to store the adjusted schedule, e.g., on a memory associated with the mobile robot 300 or with the remote computing system 200. If the recommended action is to purchase a replacement component for the mobile robot 300, the remote computing system 200 transmits a signal to an online marketplace to place an order for the replacement component to be delivered to the user 100.

In certain implementations, the mobile robot 300 and audio media device 400 communicate acoustic signals directly with each other. For example, the audio media device 400 directly communicates acoustic signals to the mobile robot 300, and the mobile robot 300 directly communicates acoustic signals to the audio media device 400. The acoustic signals include, for example, direct commands and responses in which the mobile robot 300 emits an acoustic signal identifying a status of the mobile robot 300 and the audio media device 400 directly receives the acoustic signal. The audio media device alternatively or additionally emits an acoustic command that the mobile robot 300 directly receives, the acoustic command causing the mobile robot 300 to perform an operation.

In some cases in which the mobile robot 300 and the audio media device 400 directly communicate acoustic signals to one another, one of the mobile robot 300 and the audio media device 400 does not include a wireless communication system connecting the device to the wireless communication network 201, while the other of the mobile robot 300 and the audio media device 400 includes a wireless communication system to connect the device to the wireless communication network 201. For example, if the audio media device 400 includes a wireless communication system, the user 100 provides audible commands to the audio media device 400 or remotely accesses the audio media device 400 to provide commands. The audio media device 400 then emits the acoustic commands to the mobile robot 300 to initiate an operation, e.g., a cleaning operation or observation operation, upon receiving an audible user command to initiate the operation. Similarly, if the mobile robot 300 includes the wireless communication system, the mobile robot 300 communicates acoustic commands to the audio media device 400, for example, that cause the audio media device 400 to order more reusable pads in a manner similar to how the user 100 would provide such an audible user command. Acoustic commands include, for example, voice commands or simple audible signals, e.g. tones associated with a particular command.

In some examples, the audio sensing capability of the audio media device 400 improves the localization of the mobile robot 300. For example, the audio media device 400 has the ability to measure the loudness and/or direction of an acoustic output from the mobile robot 300, and that information can be used to determine a position of the mobile robot 300. In some examples, the mobile robot 300 localizes relative to the audio media device 400 within the environment and/or localize relative to the location of other devices emitting acoustic signals. In certain implementations, the mobile robot 300 measures loudness and direction of an acoustic signal and localize that signal coming from the audio media device 400 and/or other devices.

In some examples, this type of audio sensing is usable to adjust operations of audio input devices, e.g., microphones, and audio output devices, e.g., speakers, of the audio media device 400 for the home environment. By communicating acoustic signals with the audio media device 400 at various locations within a room 200 and/or outside of a room 20, the mobile robot 300 enables the audio media device 400 to adjust sensing levels of its audio input devices or adjust output levels, e.g., loudness, of its audio output devices.
Exemplary Environments for Mobile Robots The mobile robot 300 and the audio media device 400 can operate within one or more enclosure spaces or within an environment including one or more enclosure spaces. The environment include, for example, a home environment, a living space, a work environment, or other environments. The enclosure spaces correspond to, for example, rooms within the environment. In the exemplary environment shown in FIG. 1, the environment includes a home 10 where the user 100, the mobile robot 300, and the audio media device 400 are located. The mobile robot 300 is located within a room 20A. The audio media device 400 is stationed within a room 20B where the user 100 is also located. The room 20A is adjacent to and connected to the room 20B by a doorway 22A. The room 20A is a bedroom including a bed 22 and end tables 24, 26.

In the example shown in FIG. 1, the mobile robot 300 autonomously navigates through the room 20A to complete a mission. If the mobile robot 300 is a cleaning robot, the mission can correspond to a cleaning mission to clean a floor surface of the room 20A. In some examples, the mission can correspond to a patrol in which the mobile robot 300 autonomously navigates to predetermined positions within the home 10. The mobile robot 300 navigates around obstacles (e.g., the bed 22 and end tables 24, 26) positioned in the room 20A while completing its mission. As the mobile robot 300 moves about the home 10 during the mission, the mobile robot 300 uses its sensors to generate a map of the home 10 and localize the mobile robot 300 within the map. The mobile robot 300 includes other sensors that generate signals indicative of a status of the mobile robot, such as a status of the components of the mobile robot 300 or a status of the mission or operations being performed by the mobile robot 300.

In some implementations, in addition to the mobile robot 300 and the audio media device 400, the home 10 includes other devices that are in communication with the remote computing system 200. In some implementations, the mobile computing device 202 shown in FIG. 2 is linked to the remote computing system 200 and enables the user 100 to provide inputs on the mobile computing device 202. The mobile computing device 202 can include user input elements such as, for example, one or more of a touchscreen display, buttons, a microphone, a mouse, a keyboard, or other devices that respond to inputs provided by the user 100. The mobile computing device 202 alternatively or additionally includes immersive media (e.g., virtual reality) with which the user 100 interacts to provide a user input. The mobile computing device 202, in these cases, is, for example, a virtual reality headset or a head-mounted display. The user can provide inputs corresponding to commands for the mobile robot 300. In such cases, the mobile computing device 202 transmits a signal to the remote computing system 200 to cause the remote computing system 200 to transmit a command signal to the mobile robot 300.

While the communication network 201 of FIG. 2 depicts the mobile computing device 202 as being wirelessly linked to the remote computing system 200, in some implementations, the communication network 201 of FIG. 2 includes a wireless link between the mobile computing device 202 and the mobile robot 300 to enable the mobile computing device 202 to directly transmit a wireless command signal to the mobile robot 300. The user 100 provides the user input indicative of the command signal to the mobile computing device 202, and then the mobile computing device 202 transmits the command signal corresponding to the user input. Various type of wireless networks (e.g., Bluetooth, radio frequency, optical based, etc.) and network architectures (e.g., mesh networks) may be employed by the communication network 201.

Other devices also can be wirelessly linked to the remote computing system 200. In the example of FIG. 1, the home 10 includes linked devices 102A, 102B. In some implementations, each of the linked devices 102A, 102B includes sensors suitable for monitoring the home 10, monitoring occupants of the home 10, monitoring operations of the mobile robot 300, monitoring operations of the audio media device 400, etc. These sensors can include, for example, imaging sensors, occupancy sensors, environmental sensors, and the like.

The imaging sensors for the linked devices 102A, 102B can include visible light, infrared cameras, sensors employing other portions of the electromagnetic spectrum, etc. The linked devices 102A, 102B transmit images generated by these imaging sensors to the remote computing system 200. Occupancy sensors for the linked devices 102A, 102B include one or more of, for example, a passive or active transmissive or reflective infrared sensor, a time-of-flight or triangulating range sensor using light, sonar, or radio frequency, a microphone to recognize sounds or sound pressure characteristic of occupancy, an airflow sensor, a camera, a radio receiver or transceiver to monitor frequencies and/or WiFi frequencies for sufficiently strong receive signal strength, a light sensor capable of detecting ambient light including natural lighting, artificial lighting, and light emitted from a mobile computing device (e.g., the mobile computing device 202), and/or other appropriate sensors to detect the presence of the user 100 or other occupants within the home 10. The occupancy sensors alternatively or additionally detect motion of the user 100 or motion of the autonomous mobile robot 300. If the occupancy sensors are sufficiently sensitive to the motion of the autonomous mobile robot 300, the occupancy sensors of the linked devices 102A, 102B generate signals indicative of the motion of the mobile robot 300. Environmental sensors for the linked devices 102A, 102B can include an electronic thermometer, a barometer, a humidity or moisture sensor, a gas detector, airborne particulate counter, etc. The linked devices 102A, 102B transmit sensor signals from the combination of imaging sensors, the occupancy sensors, the environmental sensors, and other sensors present in the linked devices 102A, 102B to the remote computing system 200. These signals serve as input data for the remote computing system 200 to perform the processes described herein to control or monitor operations of the mobile robot 300 and the audio media device 400.

In some examples, the remote computing system 200 is connected to multiple robotic devices, including the mobile robot 300 and a second mobile robot 301, thus enabling the user 100 to interact with the audio media device 400 to control and monitor multiple robotic devices 300, 301. As shown in FIG. 1, the second mobile robot 301 is located within a room 20C connected to the room 20B by a doorway 22B. The second mobile robot 301, similar to the mobile robot 300, performs a mission, e.g., a cleaning mission, within the room 20C.

The controllers for each of the audio media device 400, the mobile robot 300, the linked devices 102A, 102B, the second mobile robot 301, and other devices may initiate and maintain wireless links for communication with the remote computing system 200. The controllers may also initiate and maintain wireless links directly with one another, for example, to initiate and maintain a wireless link between the mobile robot 300 and the audio media device 400, between the audio media device 400 and one of the linked devices 102A, 102B. Wireless links also may be formed with other remote electronic devices, such as a mobile phone, a tablet, a laptop, another mobile computing device, one or more environmental control devices, other types of electronic devices, etc. In certain implementations, the wireless links permit communication with one or more devices including, but not limited to smart light bulbs, thermostats, garage door openers, door locks, remote controls, televisions, security systems, security cameras, smoke detectors, video game consoles, other robotic systems, or other communication enabled sensing and/or actuation devices or appliances.

In the communication network 201 depicted in FIG. 2 and in other implementations of the communication network 201, the wireless links may utilize various communication schemes and protocols, such as, for example, Bluetooth classes, Wi-Fi, Bluetooth-low-energy, also known as BLE (BLE and BT classic are completely different protocols that just share the branding), 802.15.4, Worldwide Interoperability for Microwave Access (WiMAX), an infrared channel or satellite band. In some cases, the wireless links include any cellular network standards used to communicate among mobile devices, including, but not limited to, standards that qualify as 1G, 2G, 3G, or 4G. The network standards, if utilized, qualify as, for example, one or more generations of mobile telecommunication standards by fulfilling a specification or standards such as the specifications maintained by International Telecommunication Union. The 3G standards, if utilized, correspond to, for example, the International Mobile Telecommunications-2000 (IMT-2000) specification, and the 4G standards may correspond to the International Mobile Telecommunications Advanced (IMT-Advanced) specification. Examples of cellular network standards include AMPS, GSM, GPRS, UMTS, LTE, LTE Advanced, Mobile WiMAX, and WiMAX-Advanced. Cellular network standards may use various channel access methods, e.g., FDMA, TDMA, CDMA, or SDMA.

The communication network 201 enables the user 100 to interact with the audio media device 400 using natural, spoken language to control or monitor the mobile robot 300. In one example depicted in FIG. 1, the remote computing system 200 determines that a battery for the mobile robot 300 ("Robot #1") has sufficiently low charge capacity that it would be beneficial to order a replacement battery before the charge capacity is insufficient for the mobile robot 300 to perform operations. The remote computing system 200 causes the audio media device 400 to emit an audible request: "Robot #1 will need a battery soon. Shall I order a new battery?" The user 100, upon hearing the audible request, responds, "Yes, please order a battery." The audio media device 400 transmits to the remote computing system 200 a signal indicative of the user's assent to the audible request. The remote computing system 200 then transmits a signal to an online marketplace to place an order for the replacement battery to be delivered to the home 10 of the user 100.

In some implementations, the mobile robot 300 and second mobile robot 301 are both linked to the remote computing system 200. Information regarding the operations of both the mobile robots 300, 301 can be transmitted to the remote computing system 200 for use in notifying the user 100 of their operations. In some cases, in addition to causing the audio media device 400 to emit the audible request, the remote computing system 200 generates a command signal to cause the audio media device to emit an audible notification indicative of operations of the mobile robots 300, 301. In another example depicted in FIG. 1, the user 100 utters an audible request for information regarding the second mobile robot 301 ("Robot #2") to be emitted by the audio media device 400 ("AMD"): "AMD. Where is robot #2?" The audio media device 400 receives the audible request and transmits a wireless signal indicative of the audible request to the remote computing system 200. The remote computing system 200 generates a command signal based on the location of the second mobile robot 301. The remote computing system 200 transmits the command signal to the audio media device 400, which emits the audible notification indicating the location of the second mobile robot 301: "Robot #2 is in the bathroom."

Using the audio media device 400, the user 100 may track operations of the mobile robot 300 and request commands to be transmitted to the mobile robot 300. If the second mobile robot 301 is also connected to the remote computing system 200, the audio media device 400 serves as a fleet management tool enabling the user 100 to selectively control each of the mobile robots 300, 301 or selectively request information regarding operations of each of the mobile robots 300, 301. The example processes described above and herein elsewhere beneficially enable the user 100 to manage the mobile robot 300 in a convenient and efficient manner. The example processes also provide a hands free way for the user 100 to manage the mobile robot 300 such that the user 100 need not manually provide inputs to command the mobile robot 300. The user 100 stays informed of operations of the mobile robot 300 without having to manually manipulate an input device. As the mobile robot 300 moves around the home 10, the user 100 easily tracks the mobile robot 300 without having to know the location of mobile robot 300 or without having to move proximate to the location of the mobile robot 300.

Figure 3A:
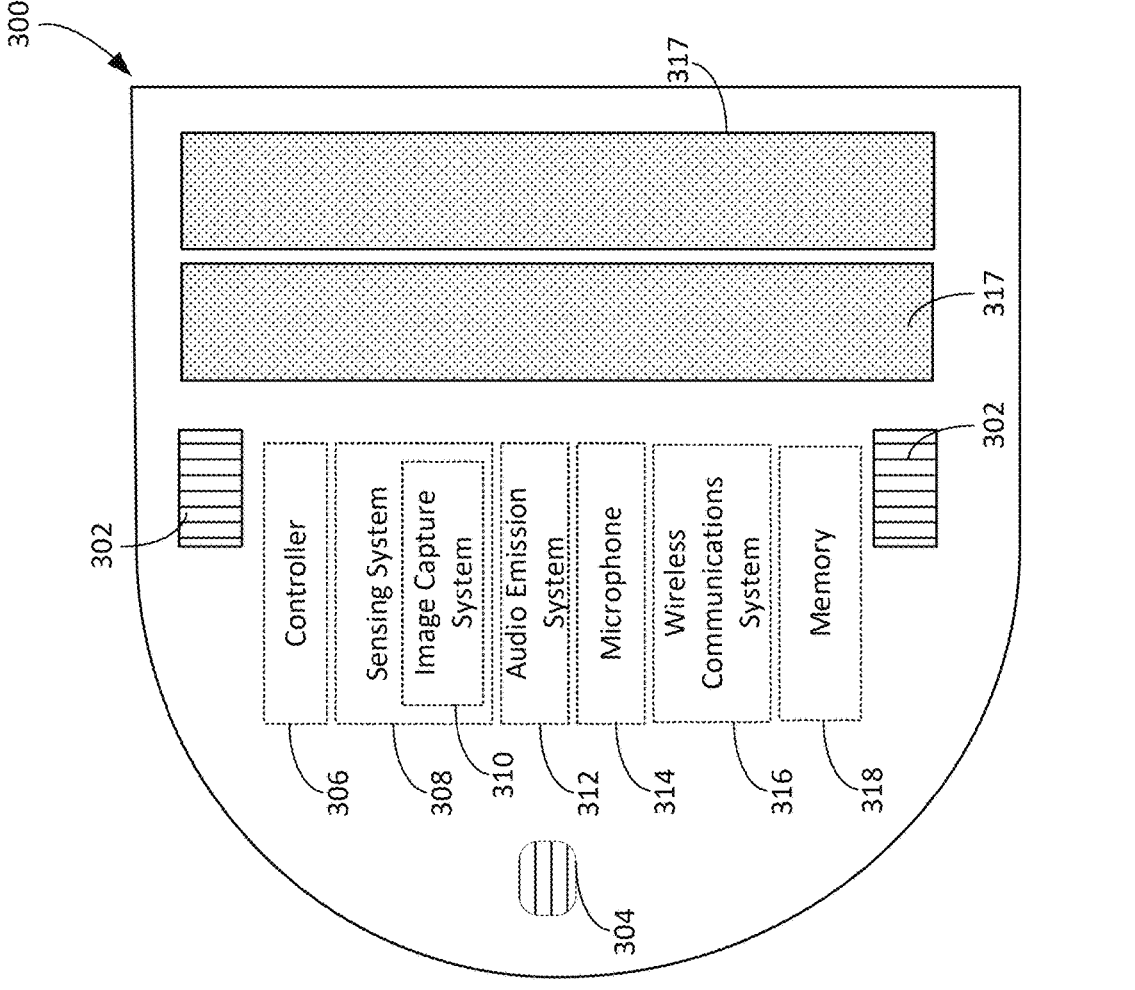
FIG. 3A is a schematic bottom view of an example of a mobile robot.

Furthermore, in cases when the user 100 cannot focus visual attention to notifications for the mobile robot 300, the user 100 continues to monitor the operations of the mobile robot 300 by listening to audible signals emitted by the audio media device 400. For example, when the user 100 is performing a task requiring the user's visual attention, the user 100 is able to use spoken communications to command the mobile robot 300. The audio media device 400 also allows the user 100 to use natural spoken communication to control the mobile robot 300 without the need to interpret visual indicators or icons, thus improving the ease at which, for example, the elderly, kids, visually impaired individuals, and others can control operations of the mobile robot 300.
Examples of Mobile Robots The mobile robots 300, 301 autonomously navigate about the environment, e.g., the home 10, using a drive system and a suite of sensors. FIG. 3A shows a schematic bottom view of an example of the mobile robot 300 of FIG. 1. While FIG. 3A is described with respect to the mobile robot 300, the mobile robot of FIG. 3A additionally or alternatively corresponds to the second mobile robot 301. The mobile robot 300 includes a drive system including drive wheels 302. In some cases, a caster wheel 304 supports the mobile robot 300 above the floor surface. The mobile robot 300 further includes a controller 306 operable with one or more motors connected to the drive wheels 302. The controller 306 of the mobile robot 300 selectively activates the motors to drive the drive wheels 302 and navigate the mobile robot 300 across a floor surface.

The controller 306 is also operable with a sensing system 308. The sensing system 308 includes sensors usable by the controller 306 to navigate about the home 10. The sensing system 308, for example, has sensors to generate signals for detecting obstacles within the home 10 and for generating the map of the home 10. The sensing system 308 can include obstacle detection sensors, such as a time-of-flight sensor to detect distances to obstacles, cliff detection sensors to detect a drop-off (e.g., a staircase), bump sensors associated with a bumper mounted on the mobile robot 300, and contact sensors. The controller 306 operates the drive system for the mobile robot 300 to move about obstacles when the obstacle detection sensors detect the obstacles.

The controller 306 uses signals from its sensors system to generate a map of the home 10 by tracking and updating positions and orientations of the mobile robot 300 over time. These mapping sensors include, for example, simultaneous localization and mapping (SLAM) sensors, dead reckoning sensors, and obstacle detection and avoidance (ODOA) sensors. The controller 306 constructs a two-dimensional map of the floor surface of the home 10, determines the robot pose on the map and determines positions of portions of the home 10 that the mobile robot 300 can traverse (e.g., unoccupied, traversable floor). Using signals from the dead reckoning sensors and the contact and non-contact obstacle detection sensors, the controller 306 indicates floor that the mobile robot 300 cannot traverse because of obstacles on the floor surface or above the floor surface. In one example, the controller 306 constructs a map of walls and obstacles as it transits, creating an occupancy grid of traversable and occupied space. In certain implementations, the map uses a Cartesian coordinate system or a polar coordinate system. In some cases, the map is a topological map, a representational map, or a probabilistic map.

In some examples, using simultaneous localization and mapping (SLAM) techniques, the controller 306 determines a pose of the mobile robot 300 within a two-dimensional map of the home 10. The SLAM sensors include for example, one or more cameras for visual identification of features and landmarks used in calculating robot pose on a map. The mobile robot 300 includes additional sensors that generate signals to enable the controller 306 to estimate the position and/or orientation of the mobile robot 300 as the mobile robot 300 moves about the home 10. These sensors, alone or in combination with the SLAM sensors, determine the pose of the mobile robot 300 on the robot map built by the transiting mobile robot 300. In some implementations, the controller 306 uses signals from the additional sensors to validate or adjust pose determined by the SLAM sensors. In some implementations, the additional sensors include odometers, accelerometers, gyroscopes, inertial measurement units, and/or other sensors that generate signals indicative of a distance travelled, an amount of rotation, a velocity, or an acceleration of the mobile robot 300. For example, the mobile robot 300 includes a directional sensor, such as a gyroscope, that generates signals indicative of an amount that the mobile robot 300 has rotated from a heading. In some implementations, the sensing system 308 includes a dead reckoning sensor, such as an IR wheel encoder, to generate signals indicative of the rotation of the drive wheels 302 and the controller 306 uses the detected rotation to estimate distance travelled by the mobile robot 300. In some implementations, the sensing system 308 includes, for example, a laser scanner or a time-of-flight sensor that generates sensor readings for determining distance to the observed obstacles and objects within the environment. Alternatively or additionally, the sensing system 308 includes an optical mouse sensor facing the floor surface to determine a distance the mobile robot 300 has drifted laterally across the floor surface relative to a heading.

In some implementations the mobile robot 300 employs visual simultaneous localization and mapping (VSLAM) to build its map and determine a current pose on the map. The sensing system 308 includes one or more localization sensors, e.g., a camera 310, that generate signals for the controller 306 to determine the mobile robot's location and orientation relative to features detected in the environment. In some implementations, the mobile robot 300 includes a visible light camera 310 under the top surface of the robot body and angled in an upward direction, e.g., angled between 30 degrees and 80 degrees from the floor surface about which the mobile robot 300 navigates. The camera 310 is aimed at locations on the wall and ceiling having a high concentration of static elements, such as window frames, pictures frames, doorway frames and other objects with visible, detectable features like lines, corners and edges. For example, when the camera 310 is angled upward, a center of a viewing cone of the camera 310 is angled upward such that the center of the viewing cone is aimed at the locations on the wall and ceiling. Using the images captured by the camera 310, the controller 306 determines the robot pose on a map the mobile robot 300 builds as it navigates about rooms or enclosure spaces, e.g., a series of adjoined rooms 20A, 20B, 20C, 20D (collectively referred to as enclosure spaces or rooms 20).

The localization sensors, in some cases, include sensors on the mobile robot 300 capable of generating signals in response to detection of walls and objects in the environment that occupy non-traversable floor space. In addition to VSLAM cameras, these localization sensors include for example, contact sensors such as bump sensors, and non-contact time of flight sensors, such as lasers, volumetric point cloud sensors, point line sensors (e.g. a time of flight line sensor such as those made by PIXART), IR proximity sensors, LIDAR, and acoustic sensors. The localization sensors generate signals from which unique signatures, patterns, or features are extracted, particularly distinguishing non-traversable floor from traversable floor, or traversable floor space added to the expanding robot map as it is traversed by the mobile robot 300. When the controller 306 determines that these features have been detected, the controller 306 determines the pose of the mobile robot 300 on the map of the home 10 using the location and orientation of the mobile robot 300 relative to these detected features. The controller 306 localizes the mobile robot 300 within the home 10, in particular by determining a current pose of the mobile robot 300 with reference to the features corresponding to objects within the home 10. The extracted features indicate the room where the mobile robot 300 is located. Referring back to FIG. 1, the extracted features form unique identifiers for each of the rooms 20A, 20B, 20C. In some implementations the mobile robot 300 uses the extracted features to determine which of the rooms 20A, 20B, 20C it currently is located in response to detecting a specific feature or features associated with a room identifier. In some implementations, the mobile robot 300 recognizes pre-identified rooms through object recognition. The mobile robot 300, for example, uses its camera 310 to capture images of objects associated with each room 20 (e.g., a stove, dishwasher and refrigerator). A user 100 communicates to the mobile robot 300 a particular room identifier (e.g., kitchen) associated with those recognizable objects. During a mission, when the mobile robot 300 recognizes these objects, it communicates its location to the user by causing emission of an audible alert, e.g., by requesting that the AMD 400 or the mobile computing device 202 produce an audible alert, or causing a visual alert to issue, e.g., by displaying a text notification on the mobile computing device 202 indicating the associated stored room identifier.

In some implementations, the map is persistent and stored in the remote computing system 200 for access by one or more mobile robots 300, 301 and/or the AMD 400. In each subsequent run, the mobile robot 300 updates the persistent map according to changing conditions within the home 10, such as moved furniture or a new location of the AMD 400. In some examples, the mobile robot 300, discovers connected devices in the home 10 through standard protocols and localizes them on the map. This includes positions of connected lights and speakers, vents, door and window sensors, and other connected devices in the home 10. The mobile robot 300 roams the home 10 and uses RF signatures, visual recognition, received signal strength and other methods to recognize connected devices in the home 10 and automatically place them on the robot map of the home 10. For example, the mobile robot 300 explores the home 10 and recognizes a NEST thermostat on the wall in the living room, a connected SAMSUNG fridge in the kitchen, and HUE BLOOM lights in both the family room and the bedroom. The mobile robot 300 puts the recognized connected devices on the map and enables the user 100 and the AMD 400 to take advantage of this spatial knowledge of the connected devices. For example, a user 100 is able to turn on the lights in the bedroom by speaking the words, "turn the light on in the bedroom." The interactions of the AMD 400 and mobile robot 300 described herein enable this simple speech control over devices detected by the mobile robot 300 as the mobile robot 300 navigates through the home 10.

The sensing system 308 also generates signals indicative of operations of the mobile robot 300. In some examples, the sensing system 308 includes a stall sensor unit integrated with the drive system that generates signals indicative of a stall condition of the mobile robot 300 in which the mobile robot 300 is unable to move along the floor surface within the home 10. The stall sensor unit generates a signal to indicate a change in current delivered to a motor of the drive system. The change in current can be indicative of a stasis condition for the mobile robot 300, in which the mobile robot 300 is unable to move substantially from its current pose. The stall sensor unit alternatively or additionally includes optical sensors that generate signals indicative of whether a wheel, e.g., the caster wheel 304 or one of the drive wheels 302, is moving when power is being delivered to motors of the drive wheels 302. The stall sensor unit, in some cases, is a mouse sensor for tracking and detection motion, or lack thereof, by comparing successive images for change, and in other implementations, the mobile robot 300 relies on an accelerometer to generate a signal indicative of an acceleration of the mobile robot 300. The controller 306, upon detection of the absence of movement of the wheel, determines that the mobile robot 300 is in a stall condition.

Figure 3B:
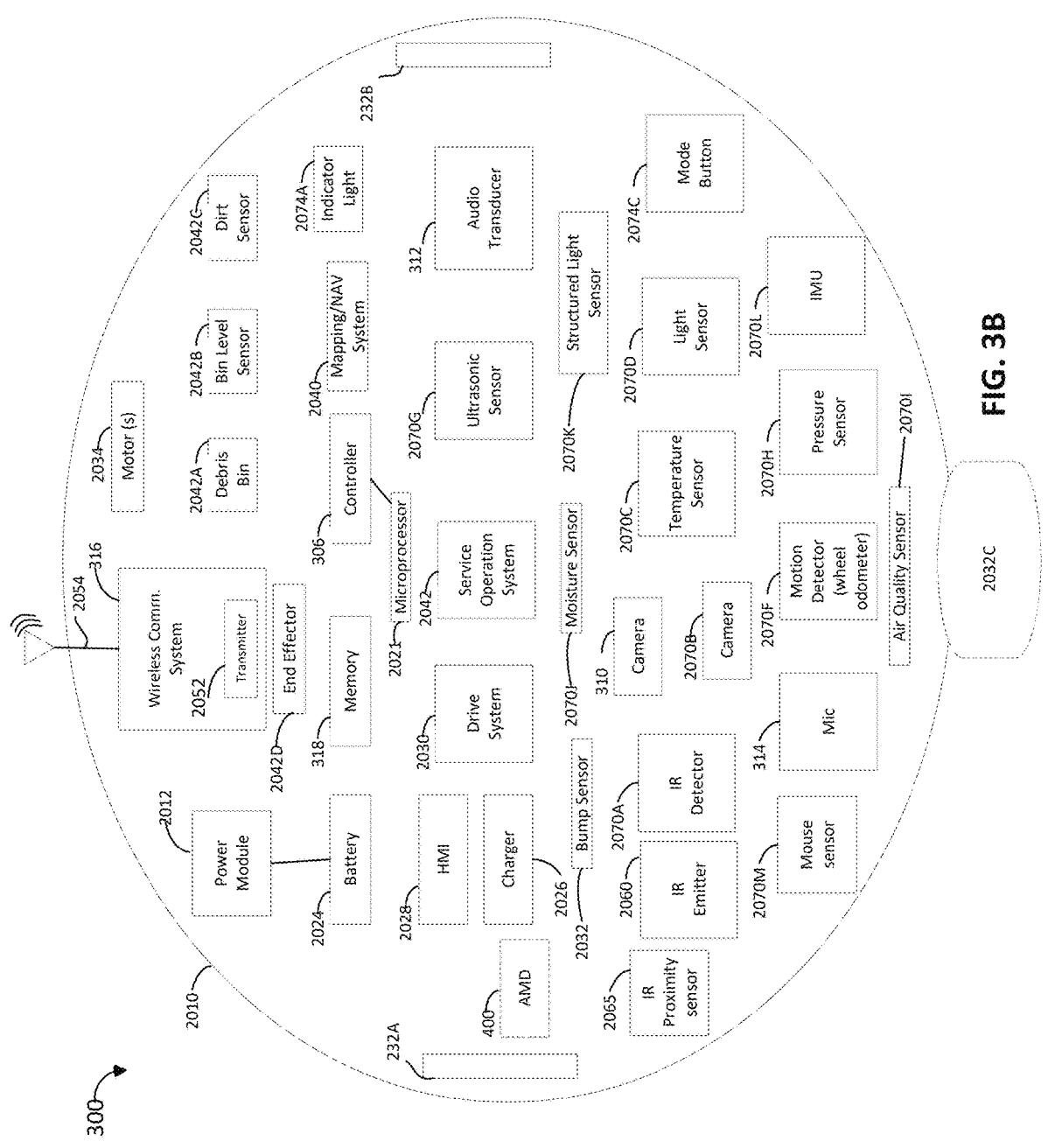
FIG. 3B is a schematic view of examples of sensors mounted on a mobile robot.

In some implementations, the mobile robot 300 includes other sensors, as depicted in the schematic of FIG. 3B. The sensing system 308, in some examples, includes a microphone 314 that receives audible signals from the environment of the mobile robot 300. In some cases, the sensing system 308 includes environmental sensors, for example a temperature sensor 2070C, ambient light sensor 2070D, air moisture content sensor 2070J, gas composition, air quality sensor 2070I, or other characteristics of the environment. The sensing system 308 also includes condition sensors indicative of conditions of the mobile robot 300 or of components of the mobile robot 300. These sensors include, for instance, battery charge state sensors to detect an amount of charge or a capacity for charge on a power source of the mobile robot 300, component life sensors such as wheel tread sensors to detect a serviceability of a component or an amount of remaining life of a component, etc.

The mobile robot 300 further includes an audio emission system 312 that allows the mobile robot 300 to emit audible signals. The controller 306 causes emission of the audible signals, for example, to notify the user 100 of a status of the mobile robot 300, e.g., a status of components of the mobile robot 300, a status of operations of the mobile robot 300, or a status of a mission performed by the mobile robot 300. As described in greater detail herein, the controller 306 can operate the audio emission system 312 to communicate an audible signal to be received by a microphone unit 402 of the audio media device 400. In some cases, the audio media device 400 uses a speaker unit to communicate an audible signal to be received by the microphone 314 of the mobile robot 300.

The mobile robot 300 further includes a wireless communication system 316 that allows the mobile robot 300 to communicate with the remote computing system 200, as shown in the communication network 201 of FIG. 2. Using the wireless communication system 316, the controller 306 transmits data to the remote computing system 200. In some examples, the data includes the signals generated by the sensors of the sensing system 308. In some implementations of the mobile robot 300 including the image capture system 310, the captured images can be transmitted directly to the remote computing system 200. In some examples, the mobile robot 300 collects information and constructs a map of the home 10 and the controller 306 transmits the map to the remote computing system 200. If the controller 306 includes any condition sensors, the controller 306 also transmits information indicative of the condition of the mobile robot 300 to the remote computing system 200.

As described with respect to FIG. 1, during its navigation about the home 10, the mobile robot 300 performs operations and completes missions within the home 10. The performed operations depend on the type of the mobile robot 300. In some cases, when the user 100 directs a voice command to the audio media device 400 to command the mobile robot 300 to perform an operation, the operations available to be performed by the mobile robot 300 depend on the type of the mobile robot 300. In addition to depicting basic components that may be present in many types of mobile robots for the implementations described herein, FIG. 3A depicts components specific to a vacuum cleaning robot, which corresponds to one of many types of mobile robots that may benefit from the processes described herein. Other mobile robots 300 may include floor washing robots, home monitoring robots, robotic lawnmowers, mopping robots, companion robots, sweeping robots, combinations thereof, and other appropriate robots. As described in greater detail herein, these robots may each benefit from the processes and systems described herein.

In some examples, the mobile robot 300 is a vacuum cleaning robot including a cleaning system to ingest debris on a floor surface. The cleaning system includes, for example, rotatable rollers or brushes 317 that agitate debris from the floor surface into a debris bin (not shown) mounted on the mobile robot 300. The cleaning system includes an air mover that, upon activation, moves air, and thereby debris on the floor surface, toward the debris bin. As the mobile robot 300 navigates about its environment during a cleaning mission, the mobile robot 300 activates its cleaning system to ingest debris, thereby cleaning the floor surface.

In some cases, if the mobile robot 300 is a vacuum cleaning robot, the sensing system 308 includes a debris bin level sensor that detects an amount of debris ingested into a removable debris bin for the vacuum cleaning robot. The sensing system 308 includes one or more debris sensors that detects when the vacuum cleaning robot ingests debris, or detects a rate of debris ingestion. In certain examples, the mobile robot 300 includes a filter for debris, the sensing system 308 also includes a filter sensor to detect whether the filter requires cleaning.

The controller 306 accesses a memory that stores information collected by sensors and routines executable by the controller 306 to cause the mobile robot 300 to perform operations within the home 10. As shown in FIG. 3A, in some examples, the mobile robot 300 includes a memory 318. Routines include navigational routines, for example, to navigate the mobile robot 300 about the home 10. The controller 306 initiates operations of the mobile robot 300 in response to signals from, for example, the sensing system 308 or wireless command signals transmitted to the controller 306 through the wireless communication system 316. If the mobile robot 300 includes user input devices, such as manually operable buttons, the input devices can be operated by the user 100 to cause the controller 306 to initiate one or more operations of the mobile robot 300. The manually operable buttons, for example, correspond to push buttons or button icons on a touchscreen display. In some cases, the memory 318 also stores deterministic patterns of movement that the controller 306 implements to navigate the mobile robot 300 through the home 10. The patterns include, for example, a straight motion pattern, a vine pattern, a cornrow pattern, a spiral pattern, a zigzag pattern, or other patterns including combinations of patterns. The memory 318 also stores the data collected by the sensors of the sensing system 308, including any of the dead reckoning sensors, the localization sensors, the condition sensors, or other sensors of the sensing system 308. If the controller 306 constructs the map of the home 10, the controller 306 optionally stores the map in the memory 318 for reuse on a subsequent cleaning mission.

The operations available to the mobile robot 300 depend on the type of the mobile robot 300. For example, if the mobile robot 300 is a vacuum cleaning robot as described herein, the memory 318 includes routines for performing floor cleaning operations. When the vacuum cleaning robot receives a command to begin a cleaning mission, the vacuum cleaning robot performs floor cleaning operations by autonomously navigating about its environment and ingesting debris from the floor surface. The floor cleaning operations include a room cleaning operation in which the controller 306 navigates the vacuum cleaning robot in a pattern, e.g., a cornrow pattern, a spiral pattern, or other appropriate movement pattern, to cover the floor surface of a room or multiple rooms.

In some cases, the floor cleaning operations include a spot cleaning operation in which the vacuum cleaning robot, upon receiving a command to perform the spot cleaning operation, restricts its cleaning operation to a localized area. The localized area may include a greater amount of detected debris, as detected by the debris sensors. As part of the spot cleaning operation, the controller 306 additionally or alternatively increases power delivered to the air mover of the vacuum cleaning robot to cause debris to be more easily ingested by the vacuum cleaning robot. To perform the spot cleaning operation, the controller 306 controls the drive system such that the vacuum cleaning robot moves in a predefined pattern, e.g., a spiral pattern, within the localized area. The initiation of any of the floor cleaning operations may occur in response to sensor signals. If the vacuum cleaning robot includes a debris sensor, the controller 306 can control the vacuum cleaning robot to perform the spot cleaning operation in response to detection of the debris by the debris sensor. A wireless command signal from the remote computing system 200 also may initiate the spot cleaning operation, the room cleaning operation, or other operations of the vacuum cleaning robot.

In some implementations, the mobile robot 300 communicates or otherwise interacts with other devices in its environment. The mobile robot 300, for example, includes a rechargeable battery that can be recharged at a station electrically connectable with the battery. In some cases, the battery is removable battery that is inserted in the station, while in other cases, the mobile robot 300 docks at the station, thereby enabling the station to recharge the battery. As depicted in FIG. 1, a docking station 104 is located in the room 20A. The docking station 104 includes a charger operative to charge the battery of the mobile robot 300 when the mobile robot 300 is docked at the docking station 104, e.g., physically and/or electrically connected to the docking station 104. If the mobile robot 300 is a vacuum cleaning robot, the docking station 104 additionally or alternatively serves as an evacuation station including a motorized receptacle to empty debris from the debris bin of the vacuum cleaning robot.

In another example depicted in FIG. 1, a transmitting unit 106 located proximate a doorway 22B transmits an axially-directed confinement beam that spans at least a length of the doorway 22B. The transmitting unit 106 is positioned so that the emitted confinement beam separates the room 20C from the room 20B. In some cases, the sensing system 308 includes an omnidirectional detector that detects the emitted confinement beam. In response to detection of the confinement beam, the controller 306 navigates the mobile robot 300 to avoid crossing the confinement beam, thereby maintaining autonomous navigation of the mobile robot 300 in the room 20C or outside of the room 20C. The mobile robot 300, for examples, moves away from the confinement beam when the omnidirectional detector detects the confinement beam. Referring to FIG. 1, if the second mobile robot 301 includes such an omnidirectional detector, the transmitting unit 106 restricts the second mobile robot 301 such that the second mobile robot 301 autonomously navigates within the room 20C without moving across the confinement beam and hence the doorway 22B.

In some cases, one or more transmitting units emit signals into the environment that are detectable by localization sensors on the mobile robot 300. The signals are, for example, optical or acoustic signals that remain stationary within the home 10. For example, if the transmitting unit transmits a narrowly directed acoustic signal into the home 10 while the mobile robot 300 navigates through the home 10, the controller 306 localizes to the acoustic signal when an acoustic receiver on the mobile robot 300 receives it. The acoustic signal can be directed toward a wall surface such that the acoustic receiver detects a reflected acoustic signal, or the acoustic signal can be directed toward a floor surface so that the acoustic receivers receives a direct emission of the acoustic signal. The transmitting unit transmits one or more of these signals into the home 10, and the mobile robot 300 uses each of these signals as localizing features. In some cases, the transmitting unit emits a narrowly focused optical beam into the home 10 that the sensing system 308 detects and the controller 306 uses to localize the mobile robot 300 within the home 10.

Examples of Audio Media Devices

Figure 4:
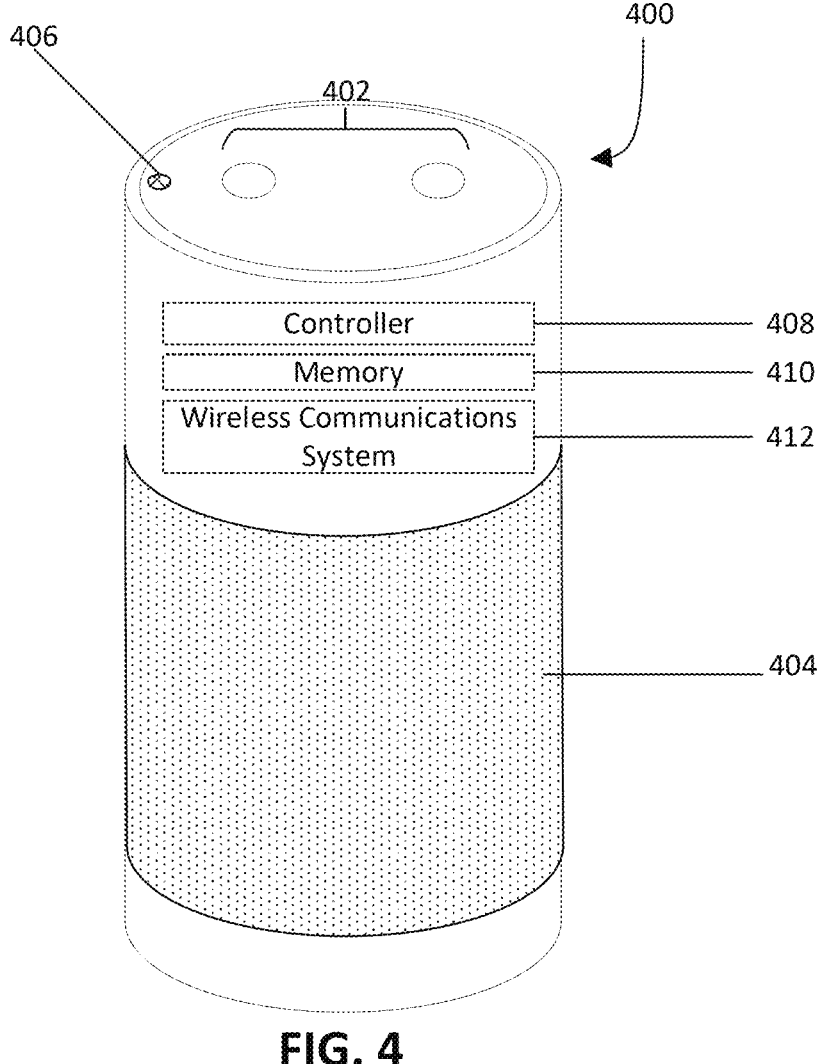
FIG. 4 is a schematic front view of an audio media device.

FIG. 4 shows an example of the audio media device 400 positionable on a surface within the home 10, e.g., on a table within the room 20B, to enable audio interactions with the user 100. These audio interactions include playback of audible signals emitted by audio media device 400 for the user 100 to hear the speech uttered by the user 100 to be received by the audio media device 400. To support these interactions, the audio media device 400 includes audio transducers, e.g., one or more microphones and one or more speakers, to convert acoustic signals into electrical signals or convert electrical signals into acoustic signals. The audio media device 400 includes a microphone unit 402 with at least one microphone to receive audible signals and at least one speaker unit 404 with at least one speaker to emit audible signals.

The audio media device 400, in some cases, includes non-audio control input mechanisms, such as one or more input buttons for increasing/decreasing volume or for turning on or off the audio media device 400. In some examples, a visual indicator 406 on the audio media device 400 indicates a state of the audio media device 400, such as when power for the audio media device 400 is on. The visual indicator 406, for example, indicates a volume or a power condition for the audio media device 400.

The primary form of user input for the audio media device 400 corresponds to received speech uttered by the user 100, and the primary form of user output corresponds to audible emissions to be heard by the user 100. The user 100 interacts with and communicates with the audio media device 400 through natural speech. In some implementations, the audio media device 400 is controllable using audible signals alone and therefore does not require the user 100 to manipulate input devices or displays. In such cases, the audio media device 400 does not include haptic input devices, such as control buttons, keypads, joysticks, keyboards, touchscreens, and other alternative haptic devices. Furthermore, in some implementations, the audio media device 400 provides notifications and information to the user 100 using audible signals alone. The audio media device, for example, does not include a display for text or graphical output to be read by the user 100. While the audio media device 400 includes the visual indicator 406 in some implementations, in other implementations, the audio media device 400 may provide the user 100 with non-haptic, non-visual user input and user output mechanisms.

In addition to the microphone unit 402, the audio media device 400 can include other sensors, such as an image capture sensor, a motion detection sensor, an optical sensor, a global position system (GPS) transceiver, device presence sensor (e.g., for geo-fencing) and other sensors that can detect conditions of an environment of the audio media device 400. In some cases, the audio media device 400 includes a sensor to detect an amount of light in an environment, and the audio media device 400 activates a lamp to illuminate the environment in low light conditions. In some cases, the audio media device 400 includes a camera to detect the distance and orientation of the user 100 from the audio media device 400 or to enable teleconferencing operations using the camera.

The audio media device 400 further includes a controller 408 to operate the audio media device 400. The controller 408 has access to a memory. In some implementations, the audio media device 400 includes a memory 410 to which the controller 408 has access. In some cases, the controller 408 alternatively or additionally accesses a remote memory using a wireless communications system 412, e.g., a remote memory associated with the remote computing system 200. In addition to enabling remote storage of data, the wireless communications system 412 enables the controller 408 to communicate with, for example, the remote computing system 200, as shown in FIG. 2. The wireless communications system 412 can be capable of performing near field communications with nearby devices, such as the mobile robots 400A, 400B, provided that the wireless communication systems for the mobile robots 400A, 400B are also capable of such communications. The wireless communication system 412 is capable of transmitting information collected by the microphone unit 402 and other sensors from the audio media device 400 to the remote computing system 200. The wireless communication system 412 also enables the controller 408 to receive signals from the remote computing system 200.

In some examples, the controller 408 has access to a distance estimation routine that estimates a distance between the microphone unit 402 of the audio media device 400 and an origin of audio received by the microphone unit 402. If the received audio is, for example, an utterance from a user 100, the controller 408 of the audio media device 400 executes or causes execution of the distance estimation routine to determine the distance between a user and the microphone unit 402. If the microphone unit 402 has multiple microphones, the distance estimation routine includes, for example, calculating a time-difference-of-arrival of acoustic signals at the microphones.

The microphone unit 402 can also capture audio other than utterances originating from the user 100. In some cases, as the user 100 walks around a vicinity of the audio media device 400, the audio media device 400 detects sounds of the steps of the user 100. Using these sounds, the distance estimation routine determines a distance of the user 100 from the audio media device 400, and in some examples, a velocity of the user 100.

The microphone unit 402 can detect acoustic signals emitted by the audio media device 400, in particular, by detecting reflections of the emitted acoustic signals within the home 10. In some examples, the controller 408 causes the speaker unit 404 of the audio media device 400 to generate acoustic signals, and the microphone unit 402 receives corresponding acoustic reflections after the acoustic signals have travelled through the environment of the audio media device 400. The controller 408 can access an acoustic mapping routine that, when executed, forms an acoustic map of the environment.

When the controller 408 executes the acoustic mapping routine, the speaker unit 404 can simultaneously and/or sequentially emit multiple acoustic signals having different directions, frequencies, intensities, and/or other acoustic characteristics. The acoustic characteristics of the emitted acoustic signals and the acoustic characteristics of the reflected acoustic signals can indicate characteristics of surfaces and objects in the environment that cause the reflections. Based on echo characteristics of the environment and different strengths of acoustic reflections within the environment, the acoustic mapping routine determines distances of surfaces and objects within the environment of the audio media device 400. In some implementations, the acoustic mapping routine uses echolocation echo-ranging, etc. to determine distance and spatial characteristics of the environment of the audio media device 400.

In some cases, the controller 408 causes the received audio to be filtered to reduce the effect of the noise on the estimated distance between an object in the environment. For example, filtering out reverberations of acoustic signals resulting in several acoustic signals having different arrival times at microphones of the microphone unit 402 reduces the likelihood that the distance is estimated based on the reverberation.

In some examples, the acoustic mapping routine includes forming a baseline acoustic map of the environment when the environment is devoid of moving entities, humans or otherwise, and while the audio media device 400 is stationary within the environment. In FIG. 1, the environment corresponds to the home 10. The constructed acoustic map of the home 10 includes location of surfaces and other objects that, for example, cause acoustic reflections received by the microphone unit 402. The acoustic mapping routine provides a location of the audio media device 400 within the baseline acoustic map relative to the surfaces and other objects within the home 10. The acoustic mapping routine further measures echo direction and origination pose when occupants, such as the user 100, are in the home 10. In this regard, the acoustic mapping routine is capable of estimating a location of the user 100 within the acoustic map of the home 10.

In some cases, the controller 408 extracts distinctive features or landmarks using the acoustic signals detected by the microphone unit 402. The controller 408, for example, uses techniques such as sound-based SLAM in which the controller 408 extracts acoustic reflection features from the signals detected by the microphone unit 402. For example, an acoustic reflection feature can correspond to a particular geometry of an object within the home 10 that causes a pattern of reflected acoustic signals to be detected by the microphone unit 402.

These features can enable localization of the audio media device 400 within the home 10. In some implementations, the baseline acoustic map corresponds to an acoustic map constructed when the audio media device 400 is in an initial location within the environment. The audio media device 400 can periodically emit sounds according to the acoustic mapping routine to construct a subsequent acoustic map. After the baseline acoustic map is constructed, if a subsequent acoustic map is constructed during operation of the audio media device 400, the subsequent acoustic map, in some instances, exhibits discrepancies relative to the baseline acoustic map. The discrepancies may indicate that the audio media device 400 has moved from its initial location within the home 10. When the audio media device 400 is moved from its initial location, locations of several features in the subsequent acoustic map may move relative to their locations in the baseline acoustic map in the same manner. The acoustic mapping routine accounts for the relative shifting of the features to determine the new location of the audio media device 400 in the subsequent acoustic map, thereby enabling the controller 408 to localize the audio media device 400 within the home 10.

In some cases, in addition or as an alternative to using detected distance and geometry of objects to extract features for localization, the controller 408 uses other characteristics of received acoustic signals to extract features for localization. After mapping the environment using the acoustic mapping routine, the controller 408, for example, causes the speaker unit 404 to emit an acoustic signal at a range of frequencies. An object within the home 10 can have a frequency response that forms a unique signature that can serve as a feature for localization of the audio media device 400 within the home 10. For example, certain surfaces absorbs acoustic signals at a wide range of frequencies and cause reflections at a narrow range of frequencies. Such a frequency response may be unique to a particular surface or object within the home 10. If the audio media device 400 is moved to a new location, the controller 408 can detect the particular surface using the unique frequency response and then determine the change in distance between the audio media device 400 and the particular surface. The controller 408 can thus use the frequency response as a feature for localization.

The controller 408 may also use other acoustic localization features. In some implementations, reverberations caused by an object in the environment can exhibit distinct characteristics that can be recognizable in the acoustic signals received by the microphone unit 402. The detection of the reverberations therefore can serve as features for localization as well. In some cases, the home 10 includes one or more audio emitting units that emit an acoustic signal at a unique frequency. The audio emitting units serve as fixed transmitting beacons that the controller 408 uses to triangulate its position within the home 10.

The controller 408 has access to a sound recognition routine so that the sound recognition routine can be executed to recognize different sounds in the audible signals. In some examples, the memory 410 includes the sound recognition routine to be executed by the controller 408. In some implementations, the controller 408 transmits signals corresponding to the audible signals to the remote computing system 200 to cause the remote computing system to execute the sound recognition routine. The sound recognition routine includes a speech recognition subroutine to allow speech to be recognized from words uttered by the user 100. In response to recognition of particular words, a corresponding signal, which includes, for example, a command signal, a notification signal, or other signal is generated. The signal causes, for example, the audio media device 400, the mobile robot 300, or the second mobile robot 301 to perform an operation.

In some examples, the sound recognition routine is executed to recognize common audible signals expected in the home environment or expected of home environment with mobile robots. In some implementations, the sound recognition routine identifies relatively low frequency noises from appliances within the home 10. The sound recognition routine, for example, identifies noises originating from the mobile robot 300, such as activation of an air mover if the mobile robot 300 is a cleaning robot. The sound recognition routine, in some cases, identifies sounds caused by the drive mechanism of the mobile robot 300, such as activation of a motor or movement of the drive wheels 302 across different types of floor surfaces. Alternatively or additionally, the sound recognition routine identifies sounds caused by opening and closing of doors and windows within the home.

In some instances, the acoustic signals emitted by the speaker unit 404 are non-audible, ultrasonic signals. The acoustic signals alternatively or additionally include audible tones. While the speaker unit 404 and the microphone unit 402 have been described to be used for acoustic mapping, the acoustic mapping routine alternatively causes auxiliary speakers and auxiliary microphones to emit and to receive, respectively, the acoustic signals. These acoustic signals for the auxiliary speakers and microphones have frequencies, for example, outside of a frequency response range of the speaker unit 404 and the microphone unit 402. In some cases, the auxiliary speakers and microphones emit and receive acoustic signals in an ultrasonic range or a non-audible range, while the speaker unit 404 and the microphone unit 402 emit and receive acoustic signals in an audible range. In this regard, the auxiliary speakers cause minimal acoustic interference for the microphone unit 402 when the acoustic speakers emit their acoustic signals. Similarly, the speaker unit 404 causes minimal acoustic interference with the auxiliary microphones when the speaker unit 404 emits its acoustic signals.

Examples of Processes for Mobile Robot and Audio Media Devices

The wireless communication systems for the mobile robot 300 and the audio media device 400 enable transmission of data between the mobile robot 300 and the audio media device 400, in some cases through the remote computing system 200, as shown in the communication network 201 of FIG. 2. The remote computing system 200 includes com-puting resources remote from the environment of the mobile robot 300 and the audio media device 400, e.g., remote from the home 10. In some cases, the remote computing system 200 includes one or more servers 204 that establishes wireless links with each of the mobile robot 300 and the audio media device 400. The one or more servers 204, in some cases, are connected to a network of one or more remotely located servers (a "cloud" computing network 205). The remote computing system 200 includes, for example, a portion of a network-accessible computing platform implemented as a computing infrastructure of processors, storage, software, data access, and so forth maintained and accessible through a communication network as described herein. The remote computing system does not require the user 100 to be knowledgeable of the physical location and configuration of the system, nor does the remote computing system require the user 100 be knowledgeable of the routines executed by the remote computing system 200 or services delivered by the remote computing system 200.

Figure 5:
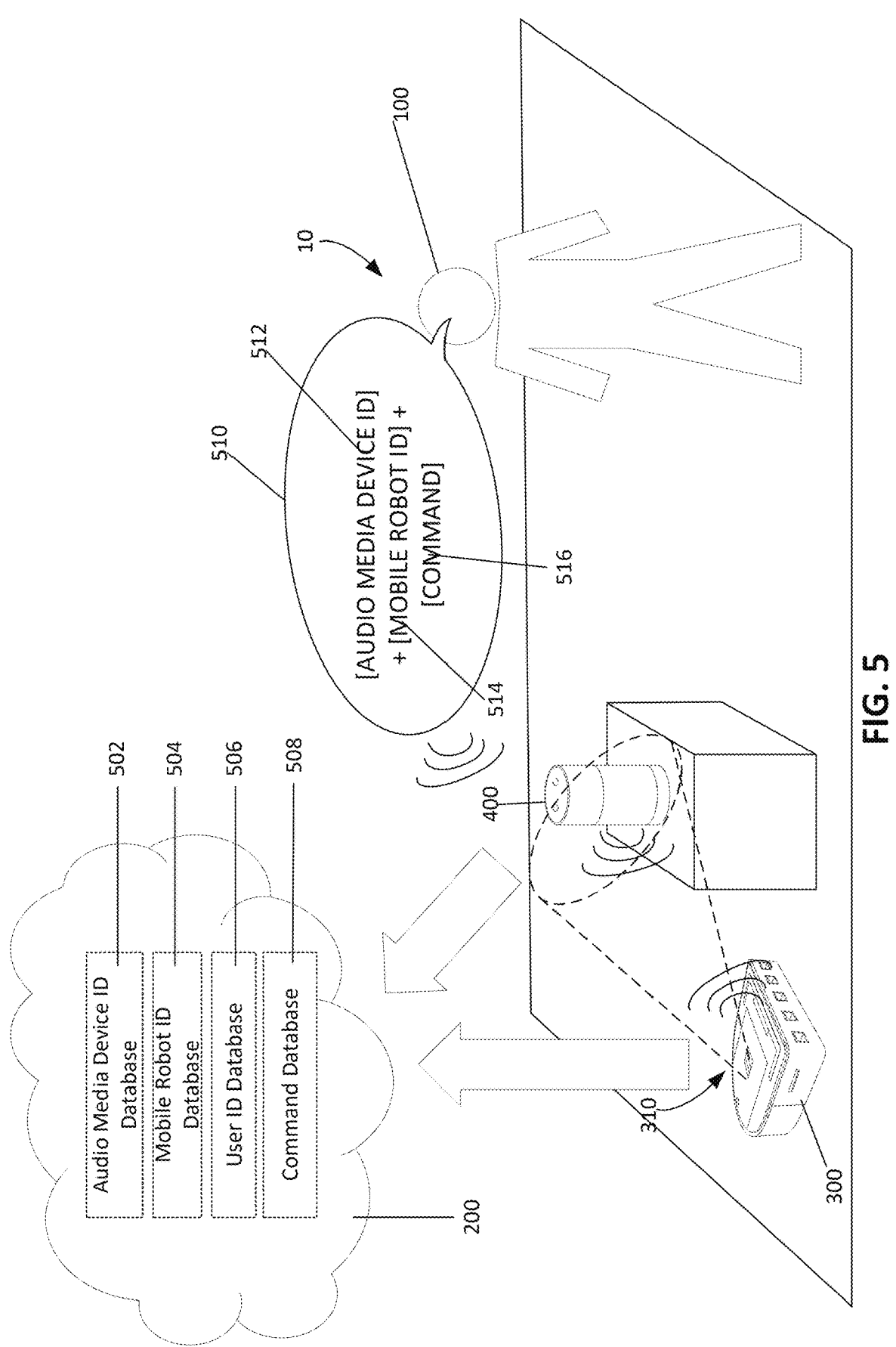
FIG. 5 is a diagram of a user providing an audible command to an audio media device.

The remote computing system 200 includes one or more databases to store audio media device identification data, mobile robot identification data, and associated user data. In the example of FIG. 5, an audio media device identification database 502 stores identification data for audio media devices wirelessly linked to the remote computing system 200. A mobile robot identification database 504 stores identification data for mobile robots wirelessly linked to the remote computing system 200. In the exemplary cases described with respect to FIGS. 1, 2, and 5, the audio media device identification database 502 includes audio media device identification data for the audio media device 400. The mobile robot identification database 504 includes robot identification data for the mobile robot 300 and any additional robots, such as, the second mobile robot 301 shown in the example home 10 in FIG. 1.

Figure 6A:
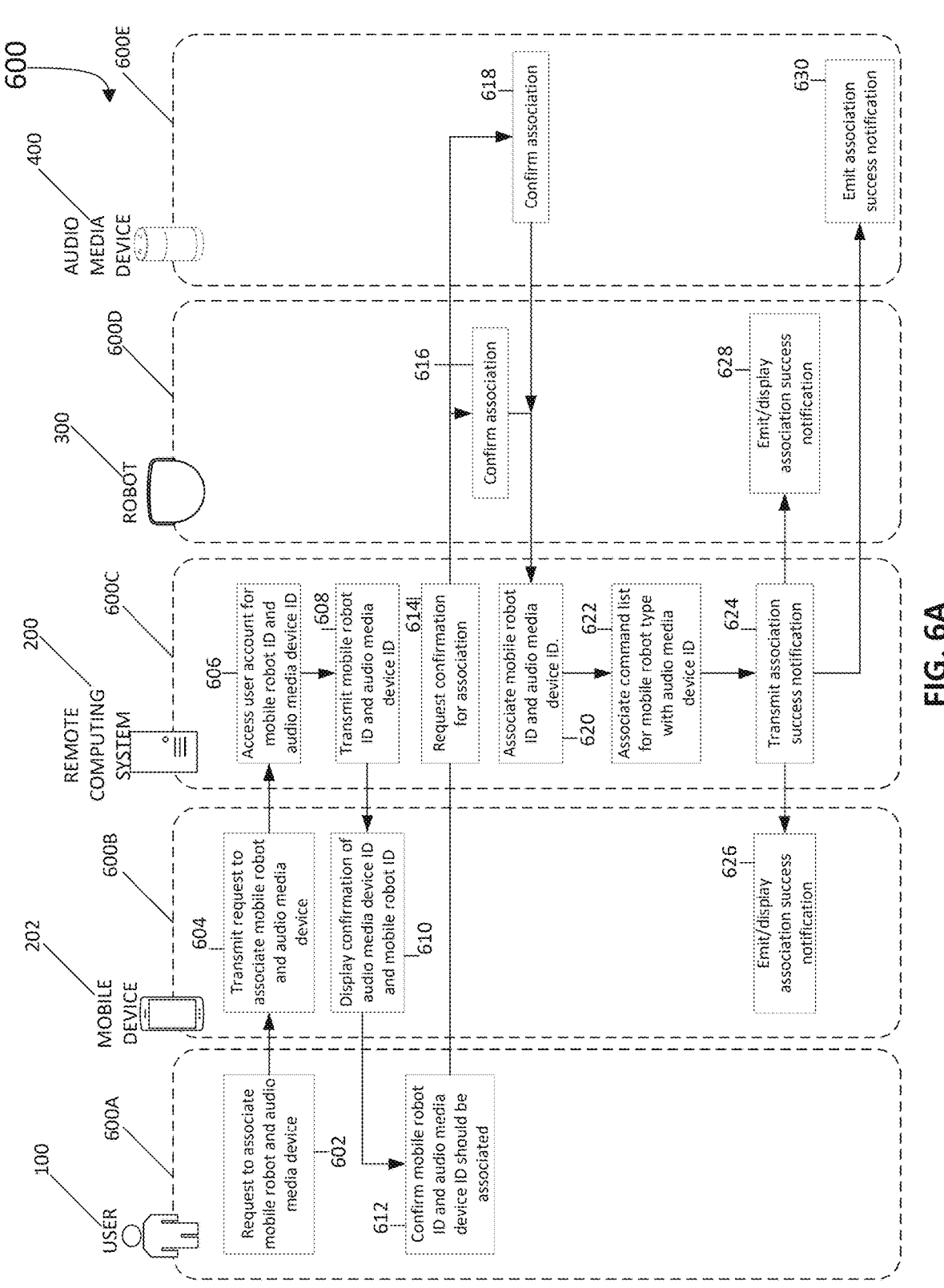
FIG. 6A is a flow chart depicting an association process.

Referring briefly to FIG. 6A described in greater detail herein, execution of an association process 600 associates identification data for the mobile robot 300 with the identification data for the audio media device 400. After the identification data are associated, the remote computing system 200 is capable of facilitating transmission of information, e.g., sensor data, commands, notifications, and the like, between the mobile robot 300 and the audio media device 400. In some examples, this improves the efficiency of computing processes because the remote computing system 200 assists in processing of routines and operations and storing information communicated by the audio media device 400 and/or the mobile robot 300.

The association of the identification data for the mobile robot 300 and the identification data for the audio media device 400 enables transmission of data that may enhance navigational operations of the mobile robot 300. For example, sensors of the audio media device 400 generate signals used to estimate the position of the mobile robot 300 or to localize the mobile robot 300 within the home 10. As described with respect to FIG. 3A, the dead reckoning and/or localization sensors for the mobile robot 300 can include sensors that generate signals from which features can be extracted to localize the mobile robot 300. The dead reckoning and/or localization sensors alternatively or additionally include sensors remote from the mobile robot 300, e.g., sensors on the audio media device 400 or linked devices 102A, 102B.

The mobile robot 300 can emit signals detectable by remote dead reckoning sensors such that changes in the relative position and/or orientation of the mobile robot 300 while the mobile robot 300 navigates about the environment are estimated using output from these sensors. In some implementations, acoustic signals received by the audio media device 400 can be used to determine the position and orientation of the mobile robot 300 relative to the position and orientation of the audio media device 400 while the mobile robot 300 navigates through the home 10. In some implementations, the audio media device 400 receives acoustic signals originating from the mobile robot 300. If the mobile robot 300 is a vacuum cleaning robot, the acoustic signals correspond to, for example, noise from activation of the air mover of the vacuum cleaning robot. In some cases, activation of the drive system to move the mobile robot 300 generates acoustic signals that the microphone 402 of the audio media device 400 receives. If the mobile robot 300 includes the audio emission system 312, the mobile robot 300 alternatively emits acoustic signals to be received by the audio media device 400. The acoustic signals can be either audible acoustic signals (e.g., in the human audible range) or non-audible acoustic signals (e.g., in the ultrasonic range).

In examples in which the audio media device 400 remains stationary within the home 10 while the mobile robot 300 moves relative to the audio media device 400, an intensity of the acoustic signals received by the audio media device 400 varies as the mobile robot 300 moves about the home 10. If the location of the audio media device 400 within the home 10 is known or determined using techniques described herein, e.g., using the acoustic mapping routine, the detection of the acoustic signals originating at the mobile robot 300 are usable to localize the mobile robot 300 within the home 10. When the audio media device 400 receives the acoustic signals, for example, the distance estimation routine is executed by the remote computing system 200, to estimate a distance between the mobile robot 300 and audio media device 400. In some cases, the remote computing system 200 also determines a direction of the mobile robot 300 relative to the audio media device 400 (e.g., employing one or more direction finding techniques). Because the location of the audio media device 400 within the home 10 was previously determined, the remote computing system 200 is able to localize the mobile robot 300 within the home 10 using the received acoustic signals. In some implementations, the robot map and the acoustic map are compared to reduce discrepancies between the maps. In particular, the robot map can be constructed using the sensors of the mobile robot 300, such as VSLAM, ODOA sensors, and dead reckoning sensors, while the mobile robot 300 navigates about the environment, and the acoustic map can be constructed by executing the acoustic mapping routine while the audio media device 400 operates its microphone unit and speaker unit. In one example of an analysis to reduce the discrepancies, the remote computing system 200 receives both the robot map and the acoustic map and compares extracted features from the robot map with extracted features from the acoustic map. If the robot map is a two-dimensional map of the floor surface of the home 10 and the acoustic map is a three-dimensional map of the home 10, the acoustic map can be analyzed to determine a two-dimensional map corresponding to the floor surface of the home 10. Three-dimensional geometric features on the acoustic map can further be processed to correspond to two-dimensional features as they would appear on the robot map, e.g., obstacles detected by the robot sensors on or above the floor surface. The extracted features from the robot map, which can include features extracted from images captured by the mobile robot's image capture system 310 or features extracted using obstacle detection sensors or other sensors of the sensing system 308, have geometric characteristics unique to the extracted features. Similarly, the acoustic map constructed by the audio media device 400 also includes extracted features with unique geometric characteristics. In some cases, by comparing these extracted features from the two maps, the remote computing system 200 determines whether the acoustic map and the robot map have any discrepancies with respect to the location or orientation of these extracted features.

In some implementations, the remote computing system 200 adjusts the acoustic map and/or the robot map in response to detecting the discrepancies using statistical or probabilistic modeling. When the acoustic map and the robot map are constructed, confidence ratings are assigned to features within the maps. The remote computing system 200 uses these confidence ratings to determine the relative predicted accuracies of different portions of each map. If the remote computing system 200 adjusts the maps, the remote computing system 200 can adjust portions of one map in accordance to similar portions in the other map. For example, referring to FIG. 1, the robot map constructed using the mobile robot 300 may have greater confidence ratings for features extracted from room 20A because the mobile robot 300 is located in the room 20A. On the other hand, the acoustic map constructed using the audio media device 400 may have greater confidence ratings for features extracted from room 20B because the audio media device 400 is located in the room 20B. If the remote computing system 200 detects discrepancies in their maps for both room 20A and room 20B, the remote computing system 200 determines based on the confidence ratings that the portion of the acoustic map corresponding to room 20A should be adjusted to correspond to the portion of the robot map corresponding to room 20A. Similarly, the remote computing system 200 determines based on the confidence ratings that the portion of the robot map corresponding to room 20B should be adjusted to correspond to the portion of the acoustic map corresponding to room 20B.

In some cases, the mobile robot 300 receives a signal from the remote computing system 200 that indicates a location of the audio media device 400 within the home 10. For example, the signal can correspond to the acoustic map, including the location of the audio media device 400 within that map. If the mobile robot 300 detects the audio media device 400, the mobile robot 300 localizes to the location of the audio media device 400 while the mobile robot 300 navigates about the home 10 relative to the audio media device 400. In some examples, as the mobile robot 300 navigates about the home 10, the image capture system 310 or other sensor of the mobile robot 300 detects the audio media device 400, thereby enabling an estimation of the location of the audio media device 400 within the robot map. The estimated location of the audio media device 400 is compared to the location indicated by the signal received by the remote computing system 200. The robot map is adjusted if any discrepancies are determined to improve accuracy of localization of the mobile robot 300 within the home 10.

Linked devices 102A, 102B (e.g., networked connected devices or devices connected to the communication network 201) also generate information that, in some implementations, the remote computing system 200, mobile robot 300 and/or AMD accesses to improve the accuracies of the robot map and/or the acoustic map. The linked devices 102A, 102B include a sensors that detect features in the home 10, such as an acoustic sensor, an image capture system, or other sensor generating signals from which features can be extracted. In some instances, the linked devices 102A, 102B transmit the information from the sensor signals to the remote computing system 200. The remote computing system 200 correlates the information relating to these features with features on the acoustic map and/or the robot map.

In some implementations, the linked devices 102A, 102B generate their own maps of portions of the home 10 that are compared to the robot map and the acoustic map. The linked devices 102A, 102B, for example, include cameras, optical sensors, ranging sensors, acoustic sensors, or other sensors that generate signals to be used to form a map of an environment of the linked devices 102A, 102B. In some examples, the linked devices 102A, 102B cooperate with one another to form maps. The linked devices 102A, 102B, in some cases, include a microphone unit and/or a speaker unit, and an acoustic mapping routine to that performed by the audio media device 400 is performed to generate the maps. The maps of the linked devices 102A, 102B additionally or alternatively are used to correct the discrepancies in the robot map and the acoustic map.

The linked devices 102A, 102B also may emit signals received by sensors on the mobile robot 300 or the audio media device 400. The mobile robot 300 and the audio media device 400 use signals generated by their sensors in response to the signals from the linked devices 102A, 102B to triangulate the position of the mobile robot 300 and the position of the audio media device 400. The emitted signals can be, for example, optical signals, acoustic signals, wireless signals, and other detectable signals whose intensities change as they propagate through the environment.

In addition to enabling interactions between various devices in the home 10, including the mobile robot 300 and the audio media device 400, the communication network 201 also facilitates interactions between the user 100 and the audio media device 400 to control or monitor the mobile robot 300. As described with respect to FIG. 1, interactions between the user 100 and the audio media device 400 include audible signals emitted by the audio media device 400 for the user 100 and audible signals provided by the user 100 for the audio media device 400. These interactions can affect operations of the mobile robot 300 or the second mobile robot 301 or can provide information for the user 100 regarding the operations of the mobile robot 300 or the second mobile robot 301.

The controller 408 of the audio media device 400 can perform the speech recognition routine or cause the speech recognition routine to be performed, e.g., by the remote computing system 200. In some examples, a sound recognition routine is stored on the memory 410 of the audio media device 400, enabling the controller 408 to perform the sound recognition routine on audible signals detected by its microphone. In some cases, the sound recognition routine is stored on the remote computing system 200, or on a database associated with the remote computing system 200. If the sound recognition routine is stored on the remote computing system 200, the controller 408 transmits to the remote computing system 200 a wireless signal indicative of audible signals captured by the microphone 402, and the remote computing system 200 executes the speech recognition routine to recognize words in the audible signals. The remote computing system 200 then generates a signal to cause the audio media device 400, the mobile robot 300, or the second mobile robot 301 to perform an operation.

In some examples, identification data for the user 100 is associated with the identification data for the audio media device 400 and/or the mobile robot 300. The remote computing system 200, for instance, includes a user identification database 506 that stores identification data for users that use the services of the remote computing system 200. The identification data for users include, for example, account data unique for each user. The user identification database 506, if present, includes the identification data for the user 100. In some implementations, the identification data for the user 100 includes a speech signature unique to the speech patterns of the user 100. For the user 100 to be able to utter speech signals to control the audio media device 400, the speech signature is authenticated to be used with the audio media device 400. The identification data for the user 100 includes the speech signature, and the speech signature is associated with the identification data for the audio media device 400. If the speech signature is associated with the identification data for the audio media device 400, the sound recognition routine is applied to the spoken words of the user 100 and performs the actions corresponding to the recognized words.

When the associations have been completed for the audio media device 400, the mobile robot 300, and/or the user 100, the user 100 can utter words to command the audio media device 400 and/or command the robot 300. The user 100 utters words corresponding to commands in a command database 508. If the user identification data includes the speech signature, only uttered speech having the speech signature can be used to command the audio media device 400 or to command the mobile robot using the audio media device 400. The command database 508 includes commands for controlling the audio media device 400 and commands for controlling the mobile robot 300. When the remote computing system 200 selects a command from the command database 508, the remote computing system 200 generates the command signal to transmit to the appropriate device, e.g., the audio media device 400, or one of the mobile robots 300 and 301. Upon receiving the command signal, the device performs one or more operations.

In an example in which the user 100 utters a command to control the mobile robot 300, an utterance 510 of the user 100 includes, for example, an audible identifier 512 corresponding to the identification data for the audio media device 400, an audible identifier 514 corresponding to the identification data for the mobile robot 300, and an audible command 516. In some examples, the remote computing system 200 executes the sound recognition routine to parse the audible identifier 512, the audible identifier 514, and the audible command 516. The remote computing system 200 checks that the identification data are associated, and then queries the command database 508 to search for the command corresponding to the audible command. The remote computing system 200 then generates the command signal to be transmitted to the appropriate device, e.g., the audio media device 400 or the mobile robot 300. If the command signal is used to control the mobile robot 300, the command signal causes the mobile robot 300 to perform one or more operations when the mobile robot 300 receives the command signal. An example of a command process 700 to command the mobile robot 300 using a user-provided utterance is described with respect to FIG. 7.

In some implementations, if the command signal is transmitted to the audio media device 400, the audio media device 400 emits an audible notification. The associations enable the mobile robot 300 and the audio media device 400 to transmit information pertaining to their operations to the remote computing system 200 such that the audible notification from the audio media device 400 can include a status update of either the audio media device 400 or the mobile robot 300. An example of a notification process 800 to command the audio media device 400 to emit an audible notification is described with respect to FIG. 8. Examples of information provided by such notifications are also described with respect to the notification process 800.

The associations also enable the remote computing system 200 to cause the audio media device 400 to emit audible signals relating to the mobile robot 300 without receiving a prompt from the user 100. For example, based on data transmitted to the remote computing system 200 by the mobile robot 300, and in some cases, information transmitted to the remote computing system 200 by the user 100. The remote computing system 200 then determines a recommended action that may enhance the operations of the mobile robot 300. An example of a recommendation process 900 for the audio media device 400 performing a recommended action is described with respect to FIG. 9. Example recommended actions are also described in relation to FIG. 9.

In some implementations, during operations of the mobile robot 300, the sensing system for the mobile robot 300 detects an error status associated with the mobile robot 300. The remote computing system 200 may receive indication of the error status and cause the audio media device to emit audible instructions for the user 100 to correct the basis of the error status. Alternatively, the user 100 speaks an utterance to cause the audio media device to emit audible instructions corresponding to an error status of the mobile robot 300. An example of an error correction process 1000 to cause the audio media device 400 to provide guidance to the user 100 to correct an error of the mobile robot 300 is described with respect to FIG. 10.

Operations for each of the processes 600, 700, 800, 900, and 1000 and other processes described herein can be executed in a distributed manner. For example, the remote computing system 200, the mobile robot 300, and the audio media device 400 may execute one or more of the operations in concert with one another. Operations described as executed by one of the remote computing system 200, the mobile robot 300, and the audio media device 400 are, in some implementations, executed at least in part by two or all of the remote computing system 200, the mobile robot 300, and the audio media device 400.

Exemplary Association Processes

Referring back to the communication network 201 of FIG. 2, to establish a channel of wireless communications between the mobile robot 300 and the audio media device 400, identification data for the mobile robot 300 and identification data for the audio media device 400 are associated. The association process 600 of FIG. 6A depicts an example of operations performed by the user 100 (user operations 600A), the mobile computing device 202 (mobile device operations 600B), the remote computing system 200 (remote computing system operations 600C), the mobile robot 300 (mobile robot operations 600D), and the audio media device 400 (audio media device operations 600E) to associate the identification data for the mobile robot 300 with the identification data for the audio media device 400.

In some examples, as part of the association process 600, the user 100 queries the remote computing system 200 to generate one or more user accounts associated with the mobile robot 300 and the audio media device 400. For example, in some implementations, if the user 100 generates a single account, the mobile robot identification data and the audio media device identification data are both associated with that user account. In some cases, the user 100 generates different accounts for each of the mobile robot identification data and the audio media device identification data.

In the example shown in FIG. 6A, the user 100 requests (602) association of the mobile robot 300 and the audio media device 400. The user 100 uses input devices on a user interface device, such as, for example, the mobile computing device 202 to request the association. The mobile computing device 202 then transmits (604) the request to associate the mobile robot 300 and the audio media device 400 to the remote computing system 200. The remote computing system 200 accesses (606) the user account for the mobile robot identification data and the audio media device identification data.

In some cases, the association process 600 includes a user confirmation process in which the user 100 confirms the identification data for the mobile robot and the audio media device. To perform this user confirmation process, the remote computing system 200 transmits (608) the mobile robot identification data and the audio media device identification to the mobile computing device 202. The mobile computing device 202 then displays (610) the audio media device identification data and the mobile robot identification data, and the user 100 operates the input devices (e.g., operates a touchscreen, a virtual button, a push button, etc.) on the mobile computing device 202 to confirm (612) that the identification data should be associated.

In some implementations, the association process 600 alternatively or additionally includes device confirmation from the mobile robot 300 and/or the audio media device 400. In the example of FIG. 6A, the remote computing system 200 requests (614) confirmation for association from the mobile robot 300 and the audio media device 400. The mobile robot 300 confirms (616) the association, and the audio media device 618 also confirms the association. Confirmation from the mobile robot 300 and/or the audio media device 400 indicates that the devices are active devices. In some cases, confirmation from the mobile robot 300 and/or the audio media device 400 causes the robot identification data to be stored in the memory 410 of the audio media device 400 or causes the audio media device identification data to be stored in the memory 318 of the mobile robot 300.

After the remote computing system 200 receives corresponding confirmation signals in cases in which either or both of the user confirmation process and the device confirmation process are performed, the remote computing system 200 associates (620) the mobile robot identification data and the audio media device identification data. Alternatively, if no confirmation processes are present, the remote computing system 200 associates (620) the mobile robot identification data and the audio media device identification data after the remote computing system 200 accesses (606) the user account. In some examples, the remote computing system 200 associates identification data from multiple types of mobile robots, such as mobile robots that perform wet floor mopping, home monitoring, or vacuuming. As described with respect to the vacuum cleaning robot of FIG. 3A, in some implementations, the type of the mobile robot 300 determines the types of available voice command inputs at the audio media device 400. In this regard, in some implementations, the remote computing system 200 associates (622) a command list for the type of the mobile robot 300 with the audio media device identification data. The remote computing system 200 is responsive to wireless signals corresponding to specific voice commands received by the audio media device 400 to control the specific type of the mobile robot 300.

In some implementations, after the association is complete, the remote computing system 200 transmits (624) an association success notification. One or more of the mobile computing device 202, the mobile robot 300, and the audio media device 400 receives the transmitted success notification and indicates that the association has successfully occurred. For example, the mobile computing device 202 emits or displays (626) an association success notification, the mobile robot 300 emits or displays (628) an association success notification, and/or the audio media device 400 emits an association success notification. Displayed association success notifications include, for example, a banner or notification on a display screen, a sequence of illuminated lights, or other appropriate visual signals. Audible association success notifications include, for example, an audible alert or sound, spoken words indicating that the association operation was successful, or other appropriate audible signals. In some cases, the association success notification includes a tactile notification, such as a vibration alert.

In some examples, the audio media device 400 is associated with multiple mobile robots, e.g., both of the mobile robots 300, 301. The identification data for the mobile robot 300 is distinct from the second mobile robot 301. The association process 600 associates the identification data for each mobile robot 300, 301 with the identification data for the audio media device 400.

Figure 6B:
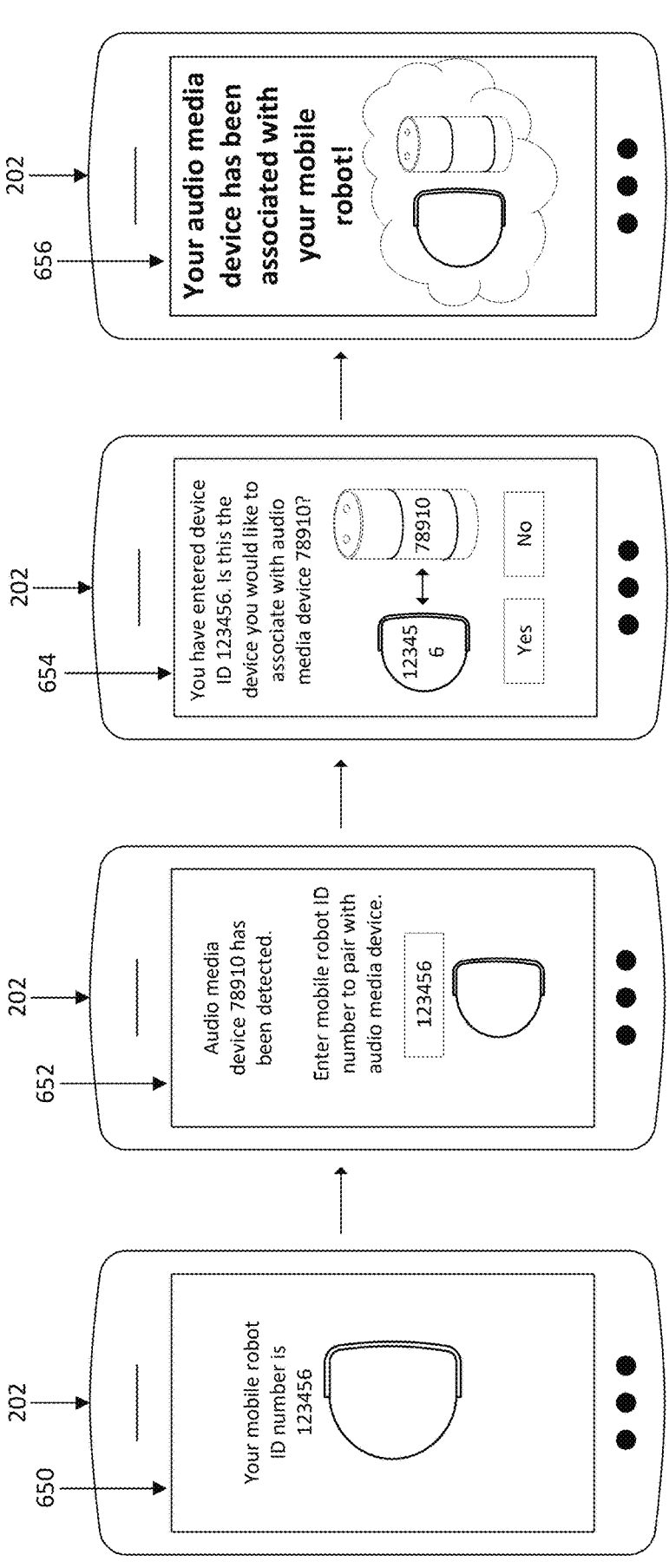
FIG. 6B depicts screenshots of an example of the association process of FIG. 6A.

FIG. 6B shows an example of using the mobile computing device 202, e.g., a smartphone, to request the association. In this example, the user 100 has a first user account for the mobile robot 300 and a second user account specific to the audio media device 400. As part of the user 100 requesting (602) the association, the user 100 obtains the mobile robot identification data. The user 100 uses the mobile computing device 202 to access the mobile robot user account, and the mobile computing device 202 displays mobile robot identification data associated with the user account of the mobile robot 300, as shown in screen 650. As part of requesting (602) the association, the user 100 also obtains the audio media device identification data. The user 100 uses the mobile computing device 202 to access the user account for the audio media device 400, and the mobile computing device 202 then displays the audio media device identification data associated with the user account for the audio media device 400, as shown in screen 652. To request the association, the user 100 inputs the mobile robot identification data, e.g., using an application on the mobile computing device 202, to associate with the corresponding audio media device identification data. If the association process 600 includes a user confirmation process, the mobile computing device 202 displays a confirmation request on the mobile computing device 202, as shown in screen 654. After the user 100 confirms the association, e.g., by invoking the "Yes" user interface button, the remote computing system 200 associates the identification data for the mobile robot 300 and the audio media device 400. The mobile computing device 202 optionally displays an association success notification, as shown in screen 656.

In some implementations, the mobile robot 300 and the audio media device 400 directly interact to establish the association of the mobile robot identification data and the audio media device identification data. For example, the user 100 requests (602) the association by uttering a voice command to the audio media device 400 to associate with the mobile robot 300. The audio media device 400 uses its wireless communication system 412 to search for a nearby mobile robot, for example on a local area network or using near field communication. Upon finding the mobile robot 300, the audio media device 400 transmits a signal to associate the identification data. In some cases, the mobile robot 300 uses it wireless communication system 316 to perform such an association process.

In some examples, the user 100 issues a command to one or both of the audio media device 400 and the mobile robot 300 to associate with each other. The command causes, for example, the remote computing system 200 to transmit a command signal causing one of the devices to emit an audible association request and the other of the devices to receive the audible association request. The remote computing system 200 associates the identification data of the mobile robot 300 with the identification data of the audio media device 400 upon receiving confirmation that the audible associated request was received by, e.g., the microphone unit 402 of the audio media device 400 or a microphone of the mobile robot 300.

In some implementations, the user 100 issues an association command to the mobile robot 300 to associate with the audio media device 400. In response to the command, the mobile robot 300 autonomously navigates about the home 10 to search for the audio media device 400, for example, using the image capture system 310 or a microphone 314 mounted on the mobile robot 300. As shown in the example of FIG. 5, as the mobile robot 300 navigates about the home 10, the image capture system 310 of the mobile robot 300 detects the audio media device 400. Upon locating the audio media device 400, the mobile robot 300 emits an audible association request using the audio emission system 312 to be received by the audio media device 400. The audible association request optionally includes the robot identification data. When the audio media device 400 receives the signal, the audio media device 400 transmits a wireless signal to the remote computing system 200 to cause the mobile robot identification data to be associated with the audio media device identification data. In some cases, the audio media device 400 responds to the audible association signal by emitting an audible response signal received by the microphone of the mobile robot 300.

Exemplary Command Processes

Figure 7:
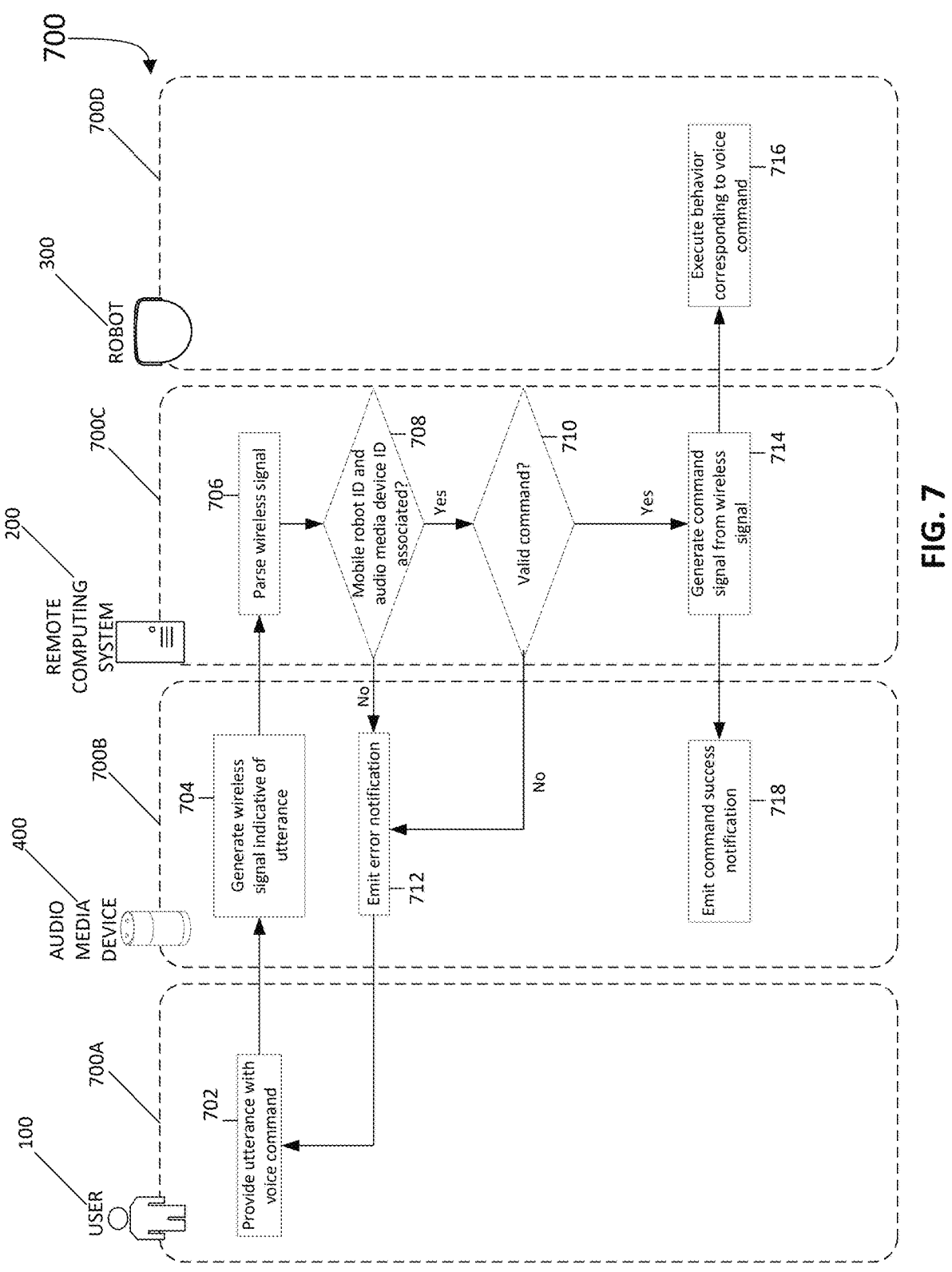
FIG. 7 is a flow chart depicting a process to transmit a command signal to a mobile robot.

As described herein and with respect to FIG. 5, the user 100 utters voice commands, e.g., through the utterance 510, that can be received by the audio media device 400 to cause the mobile robot 300 to execute a behavior in accordance to the voice commands. The command process 700 of FIG. 7 shows an example of an uttered command causing a mobile robot 300 to execute the behavior in accordance to uttered voice commands. The command process 700 of FIG. 7 depicts an example of operations performed by the user 100 (user operations 700A), the audio media device 400 (audio media device operations 700B) the remote computing system 200 (remote computing system operations 700C), and the mobile robot 300 (mobile robot operations 700D) to cause the mobile robot 300 to execute a behavior or operation according to the user's voice commands.

The user 100 provides an audible user command, e.g., a voice command, to the audio media device 400 for the remote computing system 200 to determine which mobile robot 300, 301 to command and to determine the specific behavior to be performed by the mobile robot 300, 301. In the example shown in FIG. 7, the user 100 provides (702) an utterance including a voice command to control the mobile robot 300. The audio media device 400 (704) generates a wireless signal indicative of the utterance and then transmits the wireless signal to the remote computing system 200. As shown in FIG. 5, in some cases, the utterance 510 also includes the audible identifier 512, and the audio media device 400 recognizes that the user's utterance also corresponds to a command to be executed by the audio media device 400. The memory 410 of audio media device 400 optionally includes a sound recognition routine that recognizes the audible identifier 512 such that the audio media device 400 only executes a command preceded by the audible identifier 512 corresponding to the audio media device 400. The command executed by the audio media device 400, for example, corresponds to transmitting the wireless signal to the remote computing system 200.

The remote computing system 200, upon receiving the wireless signal, parses (706) the wireless signal. The remote computing system 200, for example, executes a sound recognition routine to parse (706) the wireless signal and determine the content of the provided (702) utterance. The parsed (706) wireless signal is then analyzed, for example, to check for errors and to generate the command to transmit to the mobile robot 300.

In some examples, the remote computing system 200 determines the identification data corresponding to the audio media device 400 and the identification data corresponding to the mobile robot 300 based on the provided (702) utterance. The remote computing system 200 determines (708) based on the identification data whether the mobile robot identification data and the audio media device identification data are associated. If the remote computing system 200 determines that they are not associated, the remote computing system 200 transmits a signal to cause the audio media device 400 to emit (712) an error notification. In some cases, the identification data are not associated because the user's utterance includes an audible identifier indicative of another autonomous mobile robot, i.e., not the mobile robot 300, that has not been associated with the identification data of the audio media device 400. The user 100, in response to the error notification, can attempt to provide (702) another utterance or can attempt to associate the audio media device identification data and the mobile robot identification data, for example, using the association process 600 of FIG. 6.

The remote computing system 200 alternatively or additionally analyzes the parsed (706) wireless signal to determine (710) whether the provided (702) utterance includes a valid voice command for the mobile robot 300. As shown in FIG. 5, the portion of the parsed (706) wireless signal can correspond to the audible command 516 of the utterance provided by the user 100. Valid voice commands include, for example, any commands within the command database 508. In some cases, the valid voice commands include predefined commands in the command database 508 for the predefined type of the mobile robot 300. If the parsed (706) wireless signal does not include a valid voice command, the remote computing system 200 causes the audio media device 400 to emit (712) an error notification. The error notification notifies the user that the user 100 did not provide (702) an utterance with a valid voice command or that the voice command does not correspond to any of the voice command available for the specific type of the mobile robot 300.

If the parsed (706) wireless signal includes a valid voice command, the remote computing system 200 generates (714) a command signal corresponding to the valid voice command. The command database 508, for example, includes a lookup table matching each valid voice command to a corresponding command signal.

The remote computing system 200 then transmits the command signal to the appropriate destination, e.g., by selecting a destination for the generated (714) command signal. In the command process 700, the mobile robot 300 is controlled using the command signal, and in this regard, the remote computing system 200 transmits the command signal to the mobile robot 300 indicated by, for example, the audible identifier 514 corresponding to the mobile robot 300. If the audio media device 400 is associated with multiple mobile robots, the audible identifier 514 for each of the mobile robots is distinct from other audible identifiers. If the audible identifier 514 corresponds to the identification data for the mobile robot 300, the command signal is transmitted to the mobile robot 300. The mobile robot 300 executes (716) a behavior or operation upon receiving the command signal. In particular, the mobile robot 300 executes (716) the behavior or operations that corresponds to the voice command included in the utterance provided (702) by the user 100. In some examples, the remote computing system 200 also causes the audio media device 400 to emit (718) a command success notification to indicate to the user 100 that the user's utterance has successfully been used to command the mobile robot 300.

In some examples, the command signal causes both the mobile robot 300 and the audio media device 400 to receive a corresponding command. For example, the command signal causes the mobile robot 300 to execute behaviors or routines within the home 10. In some examples, the command signal causes the mobile robot 300 to autonomously navigate about the home 10 relative to the audio media device 400. If the mobile robot 300 is a cleaning robot, such as a vacuum cleaning robot, and the command is a cleaning command, the audio media device 400 optionally causes the mobile robot 300 to initiate a cleaning operation by, for example, activating an air mover while the mobile robot 300 autonomously navigates about the home 10. In addition, the user 100 is able to provide a voice command to cause the mobile robot 300 to pause the cleaning operation.

If the mobile robot 300 is connectable to a docking station, e.g., the docking station 104 of FIG. 1, the command signal can corresponds to a command signal that causes the mobile robot 300 to autonomously navigate to the docking station 104. The command signal, in some cases, causes the mobile robot 300 to navigate to the docking station 104 and, if the mobile robot 300 is a vacuum cleaning robot with a debris bin, causes the docking station 104 to evacuate debris from the debris bin of the mobile robot 300. For example, the mobile robot 300 operates the docking station 104 to initiate evacuation after proper docking and alignment. In some implementations, the remote computing system 200 is also wirelessly linked to the docking station 104 and directly transmits an evacuation command signal to the docking station 104 to cause the docking station to evacuate the debris bin once the mobile robot 301 or docking station 104 transmits a signal indicating a readiness state for one or both of the mobile robot 300 and the docking station 104.

In some implementations, the command signal corresponds to a voice command in which the user 100 wishes to cause the mobile robot 300 to navigate toward the audio media device 400. The mobile robot 300 accordingly autonomously navigates toward the audio media device 400, for example, based on a pre-determined location of the audio media device 400. The pre-determined location, for example, corresponds to a location determined using the acoustic mapping routine described with respect to FIG. 4, or corresponds to a location determined using images captured by the image capture system 310 of the mobile robot 300 or some other sensor-based detection (e.g., an IR transceiver) that enables the mobile robot 300 to localize the audio media device 400 on the robot map.

In some examples, if the mobile robot 300 includes the microphone 314, the remote computing system 200 provides command signals to both the audio media device 400 and the mobile robot 300 to cause the mobile robot 300 to navigate toward the audio media device 400. For example, the remote computing system 200 causes the audio media device 400 to emit an audible navigation signal to be received by the microphone 314 of the mobile robot 300. To navigate toward the audio media device 400, the mobile robot 300 navigates in a direction that increases the intensity of the received audible navigation signal. In some implementations, the mobile robot 300 detects a signal strength of a signal other than an audible signal, such as, for example, a wireless signal connecting the audio media 400 to the communication network 201. The mobile robot 300 detects the signal strength of the wireless signal and uses this signal strength for navigating within the home 10. To navigate toward the audio media device 400, the mobile robot 300 navigates in a direction that increases the intensity of the received wireless signal.

The user 100, in some cases, provides a voice command to adjust a user-defined schedule for control of the mobile robot operations. The mobile robot 300 may operate in accordance to this user-defined schedule. For example, if the mobile robot 300 is a cleaning robot, the mobile robot 300 initiates cleaning operations at start times indicated in the user-defined scheduled. The utterance provided (702) by the user 100 in the command process 700 therefore includes a voice command that changes or establishes the initiation times for the mobile robot operations. When the remote computing system 200 generates (714) the command signal, the remote computing system 200 adjusts the user-defined schedule according to the changes to the initiation times. In some cases, the user-defined schedule is stored on the memory 318 on the mobile robot 300, and the remote computing system 200 transmits the schedule changing command to the mobile robot 300. Alternatively or additionally, the user-defined schedule is stored remotely from the mobile robot 300, e.g., on the cloud computing network 205, and the remote computing system 200 modifies the user-defined schedule in the cloud computing network 205. In such cases, the user 100 provides (702) the utterance with a voice command at a present time with an intent to control the operations of the mobile robot 300 at a future time without the user 100 having to provide a command at the future time. The remote computing system 200 stores the modified user-defined scheduled and transmits a command at a future time in accordance to the modified user-defined schedule to cause the mobile robot 300 to execute (716) the behavior or operation corresponding to the voice command.

In some implementations, the user 100 provides a voice command to cause the mobile robot 300 to autonomously navigate to the present location of the user 100. To generate the command signal to cause the mobile robot 300 to navigate toward the present location of the user 100, the distance estimation routine, e.g., described with respect to FIG. 4, is implemented to estimate the distance and orientation between the user 100 and the audio media device 400 so that the remote computing system 200 can determine the pose of the user 100 on the robot map and/or audio media device map. For example, the remote computing system 200 or the audio media device 400 estimates the distance based on a signal indicative of an acoustic characteristic, e.g., a time delay between two microphones of the microphone unit 402 receiving the utterance provided (702) by the user 100. The remote computing system 200 or audio media device 400 determines the location of the user 100 within the robot map and then generates a command signal to cause the mobile robot 300 to navigate to the location within the robot map corresponding to the estimated location of the user 100. In some cases, the mobile robot 300 navigates to a position within a predetermined distance of the estimated location of the user 100, for example, within 0.1 to 2 meters from the user 100.

If the mobile robot 300 is a vacuum cleaning robot, the user 100 can provide a voice command to cause the mobile robot 300 to perform operations such as a spot cleaning operation for focused cleaning at a particularly dirty spot. A current location of the mobile robot 300 can correspond to the center of the localized area where the spot cleaning operation is to be performed. In some cases, the user 100 provides (702) an utterance with a voice command to have the mobile robot 300 clean at a present location of the user 100. Thus, in addition to causing the mobile robot 300 to move to a position proximate the location of the user 100, the command signal causes the mobile robot 300 to perform the spot cleaning operation upon reaching that position.

In some examples, the remote computing system 200 identifies a room within the home 10 where the user 100 is located, for example, based on the estimated distance and direction of the user 100 relative to the audio media device 400. If the user 100 is, for example located in the room 20B as depicted in FIG. 1 and user 100 issues a voice command to move to the location of the user 100, the remote computing system 200 causes the mobile robot 300 to move to the room 20B where the user 100 currently is located. When the mobile robot 300 autonomously navigates toward the room 20B, the mobile robot 300 determines that the mobile robot 300 is within the room 20B upon recognizing unique features associated with the room 20B. The unique features, for example, correspond to features extracted from signals of localization sensors during previous navigational operations through the home 10. These unique features are specific to characteristics or objects within the room 20B to enable the mobile robot 300 to distinguish the room 20B from other rooms within the home 10.

In some implementations, the rooms 20A, 20B, 20C, 20D each include objects or characteristics that enable unique features to be extracted from the signals of the localization sensors for each of the rooms 20A, 20B, 20C, 20D, and the user 100 provides identification data for each of the rooms. The identification data is stored in a database accessible by, for example, the remote computing system 200 and/or the mobile robot 300. To provide the identification data for the rooms, the user 100 provides a spoken or typed (e.g., entered into an editable field in an application for a smartphone) name for each of the rooms 20A, 20B, 20C, 20D, e.g., "Kitchen," "Bathroom," "Dining Room," "Living Room," "Bedroom," or other appropriate room labels. In some examples, the mobile computing device 202 displays a user interface map corresponding to the robot map of the home 10, and the user 100 selects each room and provides the name for each room by speaking or typing the name. In some examples, the mobile robot 300 navigates around the home 10 to each room. When the mobile robot 300 is in a room, the user 100 utters the name of the room, and the name is stored as the identification data for that room. The mobile robot 300 moves to each of the rooms so that the user 100 can utter a name for each of the rooms. In some examples, the user 100 provides a spoken or types name for objects in the home 10, e.g., "Front Door," "Back Door," "Dishwasher," "Washing Machine," "Bed," or other labels for objects within the home 10.

Identification data for each of the rooms enables the user 100 to control the mobile robot 300 to move to a user-specified room or toward a user-specified object. When the user 100 provides (702) the utterance with the voice command, the user 100 specifies an audible location identifier corresponding to a predefined location within the home 10. The audible location identifier, for example, corresponds to one of the names previously provided by the user 100 to cause the mobile robot 300 to autonomously navigate to the room corresponding to the specified name. The mobile robot 300, upon receiving the command signal from the remote computing system 200, executes (716) the operation to move toward the room having the specified name. As described herein, the mobile robot 300 determine that it is within the room having the specified name when the localization sensors of the mobile robot 300 detects the features unique to the room. In some examples, the audible location identifier corresponds to a name for an object and causes the autonomous mobile robot 300 to autonomously navigate toward the object upon receiving the command signal. The autonomous mobile robot 300, for examples, is controlled to stop when the mobile robot 300 determines that it is within a predetermined distance from the object.

In some implementations, the user 100 has associated multiple mobile robots of the same type to the audio media device 400. For example, referring to FIG. 1, the mobile robot 300 and mobile robot 301 can both be vacuum cleaning robots, and the user 100 associates both of these robots with the audio media device 400. The user 100 provides (702) an utterance, in some cases, with an audible identifier that could refer to both of the mobile robots 300, 301. The audible identifier could be, for example, a type of the mobile robots 300, 301. In some cases, the remote computing system 200 causes the audio media device 400 to emit an audible request that the user 100 specifies which of the mobile robots 300, 301 the user 100 intends to command.

In some examples, if the voice command refers to an operation to be performed at a specified location, the remote computing system 200 determines which of the mobile robots 300, 301 is closest to the specified location and directs the command signal to the closest mobile robot 300, 301. The remote computing system 200 determines that a distance of the second mobile robot 301 to the user-specified location is less than a distance of the other mobile robot 300 to the user-specified location. For instance, if the user 100 provides (702) an utterance commanding a vacuum cleaning robot to clean the room 20D, the remote computing system 200 determines that the second mobile robot 301 is closer to the room 20D and consequently transmits the command signal to the second mobile robot 301 to cause the second mobile robot 301 to clean the room 20D. If the user 100 provides a voice command specifying that a mobile robot should clean at a current location of the user 100 (e.g., the voice command is "Robot, Come clean here"), the remote computing system 200 can determine that a vacuum cleaning robot is to be commanded to clean at the current location of the user 100.

As described herein, localization using acoustic signals enables the location of the user 100 who is speaking to be determined relative to the location of the mobile robot 300, and the mobile robot 300 responds to user commands to such as "come here" by driving in the direction of the speaking user 100. This direction and location of the user 100 is determined by the direction-sensing microphones on the audio media device 400 and communicated to the mobile robot 300 or to the remote computing system 200. In some examples, if the mobile robot 300 detects the audio media device 400 and places its location on the robot map, the audio media device 400 and/or remote computing system 200 determines a distance to the speaking user 100. The microphone unit 402, for example, includes multiple microphones positioned on the audio media device 400, and the microphones detect multipath acoustic reflections caused by, e.g., the voice of the user 100 reflecting off of surfaces in the home 10, e.g., a wall or a surface of an object in the home 10. The audio media device 400 and/or the remote computing system 200 uses these the multipath signals to calculate the origin of the detected voice command, e.g., by triangulating the received multipath acoustic signals. In some implementations, the remote computing system 200 and/or the audio media device 400 compensate for noise and/or attenuation in calculating the speaking user's pose on the robot map.

Exemplary Notification Processes

Figure 8:
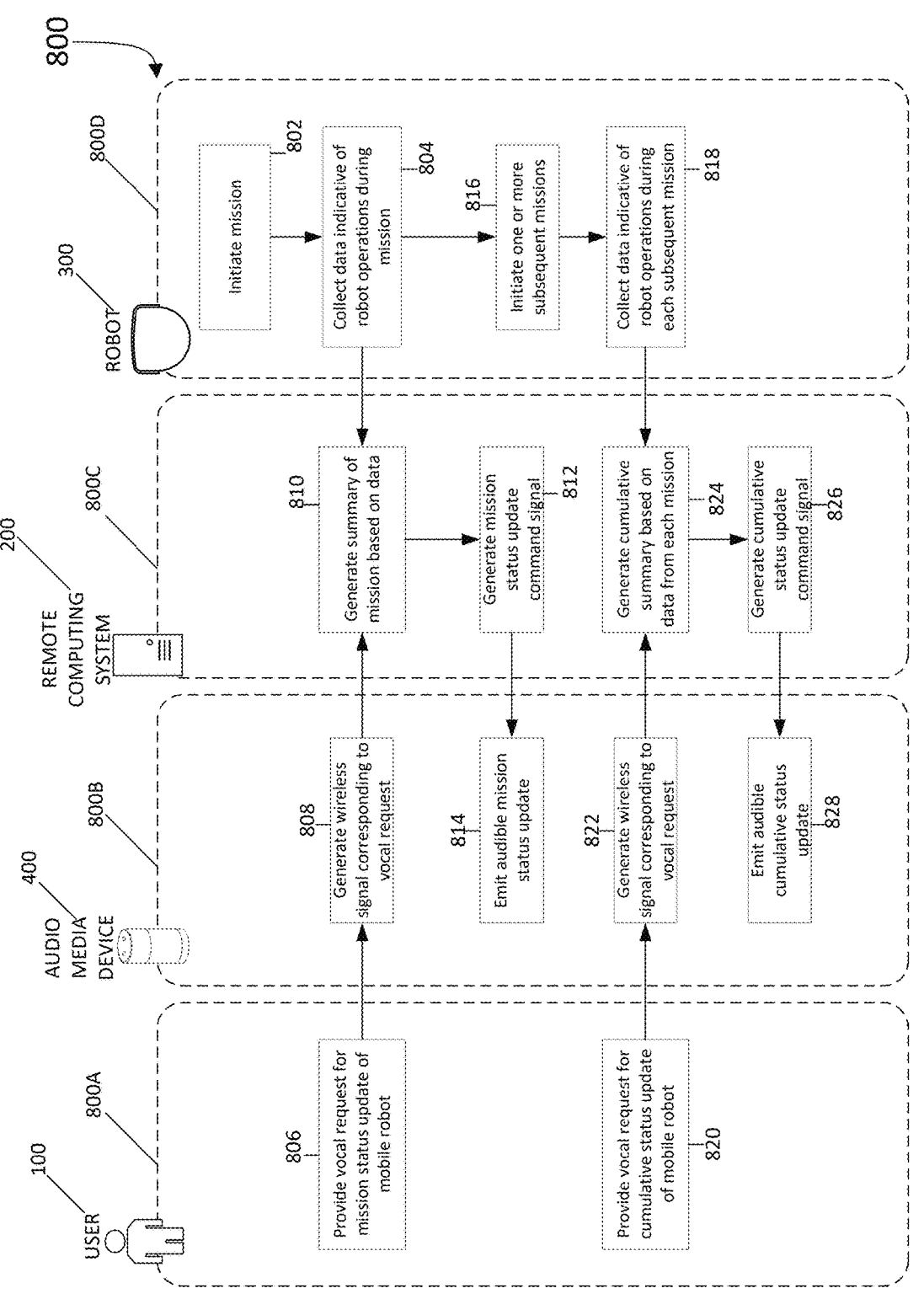
FIG. 8 is a flow chart depicting a process to emit an audible notification of a status of a mobile robot.

In addition to using a voice command to transmit a command to the mobile robot 300, the user 100 can provide a voice command that causes the audio media device 400 to provide an audible notification indicative of a status of the mobile robot 300. Examples of such audible notifications are described with respect to the notification process 800 of FIG. 8. The notification process 800 of FIG. 8 depicts an example of operations performed by the user 100 (user operations 800A), the audio media device 400 (audio media device operations 800B) the remote computing system 200 (remote computing system operations 800C), and the mobile robot 300 (mobile robot operations 800D) to cause the audio media device 400 to emit, for example, an audible mission status update or an audible cumulative status update.

The remote computing system 200 collects data from the mobile robot 300 as the mobile robot 300 performs operations within the home 10. When the mobile robot 300 initiates (802) a mission and collects (804) data indicative of robot operations during the mission, the remote computing system receives the collected (804) data. The data corresponds to data collected by sensors of the sensing system 308 of the mobile robot 300, including measured conditions of the home 10 (e.g., temperature, humidity, lighting) at positions on the map and information gathered from stationary network devices (e.g., motion sensors, temperature sensors, humidity sensors, networked lighting, etc.).

In some examples, the user 100 requests an update for a mission presently being performed by the mobile robot 300. When the user 100 provides (806) a vocal request to the audio media device 400 for a mission status update for the mobile robot 300, the audio media device 400 (808) transmits a wireless signal to the remote computing system 200 corresponding to the vocal request.

The remote computing system 200 polls the mobile robot 300 for data indicative of the operations of the mobile robot 300 during the mission, and generates (810) a summary of the mission based on the data from the mobile robot 300. The remote computing system 200 then generates (812) a mission status update command signal that causes the audio media device to emit (814) the mission status update. The mission status update corresponds to the generated (810) summary. The summary includes, for example, an amount of time that has elapsed since the mobile robot 300 initiated the mission, a total portion of traversed floor, a percentage of traversable flooring (e.g., not occupied by obstacles and accessible by the robot 300) remaining, an estimated amount of time remaining to complete a mission, or a present room of the mobile robot 300. If the mobile robot 300 is a vacuum cleaning robot, the summary includes, for example, an amount of debris ingested by the mobile robot 300 during the mission, the number of instances and map locations where spot cleaning has occurred during the mission, or the number of rooms that the mobile robot 300 has cleaned during the mission. In some cases, the user 100 indicates specific information to be included in the mission status update, and the summary generated (810) includes the requested information.

In some examples, the user 100 can request a cumulative status update indicative of multiple missions performed by the mobile robot 300. The user 100 provides (820) the vocal request for the cumulative status update of the mobile robot 300, and the audio media device 400 generates (822) the wireless signal corresponding to the vocal request. The remote computing system 200 receives the wireless signal and generates (824) a cumulative summary based on data from each of the missions initiated by the mobile robot 300. The remote computing system 200 generates (826) the cumulative status update command signal to cause the audio media device 400 to emit (828) the audible cumulative status update. The cumulative summary includes, for example, a total duration that the mobile robot 300 has been operating across multiple missions, a number of missions that the mobile robot 300 has performed, a total cumulative distance of traversed floor, or a distance that the mobile robot 300 has travelled. If the mobile robot 300 is a vacuum cleaning robot, the cumulative summary alternatively or additionally includes a total amount of debris that the mobile robot 300 has collected across multiple missions or a total number of times that the mobile robot 300 has performed spot cleaning operations. In some examples in which the mobile robot 300 is operable with a docking station that evacuates debris from the mobile robot 300, the cumulative summary includes an average number of evacuation operations per week, a number of evacuation operations performed during a certain period of time, a number of evacuation operations performed over an area covered by the mobile robot 300 during a certain period of time etc.

In some examples, the cumulative status update describes a cumulative status of missions specified within a user-specified period. The user 100, in the provided (820) vocal request, can specify the number of previous missions from which data is summarized in the cumulative summary, for example, the previous 2 to 10 missions, 10 to 20 missions, or all of the missions completed by the mobile robot 300. The user 100 can specify a date or a range of dates for missions from which data is summarized in the cumulative status update.

The status updates can include a variety of information requested by the user 100 in the vocal request. In some implementations, the status updates include a frequency of operations of the mobile robot 300. If the mobile robot 300 includes sensors that generate signals indicative of a serviceability of components of the mobile robot 300, the remote computing system 200 receives these signals and causes the emitted status updates to include an estimated remaining service life of a component of the mobile robot 300. The component is, for example, a cleaning brush, a cleaning pad, a roller, a battery, bin, wheels, a bin filter, or a bin lid. In some cases, if the mobile robot 300 interacts with other stationary devices such as the docking station 104 or the transmitting unit 106, the remote computing system 200 causes the status update to include information on these stationary devices. For example, the status update can indicate that the transmitting unit 106 requires a replacement battery.

In some examples, the audio media device 400 emits (814) the mission status update after the mission is complete. The remote computing system 200, in some cases, determines portions of the home 10 that the mobile robot 300 did not traverse during the mission and causes the audio media device 400 to emit (814) a mission status update indicating the non-traversed portions. The non-traversed portions in the mission status update, for example, refer to rooms or portions of rooms that the mobile robot 300 did not clean during the mission. In some cases, the mission status update indicates a reason that the mission was truncated, e.g., a device in the communication network 201 detected that the user 100 returned home, an obstacle blocked a particular door in the home 10, or a battery 2024 of the mobile robot 300 did not have sufficient charge for the mobile robot 300 to complete the mission.

In some examples, rather than emitting (814, 828) a status update in response to the user providing (806, 820) a vocal request for the status update, the audio media device 400 emits the status update when the user 100 enters the home 10. For example, when the user 100 returns to the home 10, the audio media device 400 automatically emits the status update of the mission completed by the mobile robot 300 while the user 100 was away from the home 10. The audio media device 400 emits the status update when the microphone unit 402 or other sensors of the audio media device 400 detect that the user 100 has returned to the home 10. In some cases, if the linked devices 102A, 102B include occupancy sensors, the remote computing system 200 causes the audio media device 400 to emit the status update when the occupancy sensors detect the return of the user 100 to the home 10. Alternatively or additionally, the audio media device 400 emits the status update in response to determining that a user device, e.g., the mobile computing device 202, has connected to a wireless communication network (e.g., WLAN) within the home 10, or detects a wireless signal, e.g., a Bluetooth or wireless signal, that the user device emits. For example, the audio media device 400 uses its device presence sensor for performing determining when the user device 202 has entered a virtual perimeter, e.g., a geo-fence, generated about the home 10.

In some examples, the user 100 provides (806) a vocal request for a notification of the present location of the mobile robot 300. To determine the present location of the mobile robot 300, the remote computing system 200 checks the robot map and the mobile robot's estimated position within the robot map. The remote computing system 200 then causes the audio media device 400 to emit an audible notification indicating a location of the mobile robot 300. In some implementations, the audio media device 400 emits a notification that indicates a location of the mobile robot 300 relative to the user 100 or the audio media device 400. The audible notification, for example, indicates that the mobile robot 300 is located in a cardinal direction relative to the audio media device 400. In some cases, the remote computing system 200 identifies a room where the mobile robot 300 is located using the constructed robot map or acoustic map and then causes the name of the room to be indicated in the audible notification. In some implementations, if the mobile robot's location is unknown, the voice command initiates a process to determine the mobile robot's location. The voice command, for example, causes the audio emission system 312 of the mobile robot 300 to emit an acoustic signal to be received by the audio media device 400. The audio media device 400 then determines the location of the mobile robot 300 based on the characteristics of the acoustic signal as received by the microphone unit 402 of the audio media device 400. In some cases, to notify the user 100 of the present location of the mobile robot 300, the voice command causes the mobile robot 300 to emit an acoustic signal or periodically emit acoustic signals, e.g., every 1 to 5 seconds, to help the user 100 find the location of the mobile robot 300 within the home 10.

In some examples, the audio media device 400 emits ongoing status updates of a mission performed by the mobile robot 300 without the user 100 providing the vocal request. For example, the ongoing status updates indicates when the mobile robot 300 is moving between rooms. The ongoing status update in this case indicates one or more rooms where the mobile robot 300 was previously located and where the mobile robot 300 is presently located. In some cases, the ongoing status updates indicate objects that the mobile robot 300 is passing. The mobile robot 300 detects the nearby objects using its sensing system 308. If the mobile robot 300 includes the image capture system 310, the image capture system 310 captures images corresponding to a nearby object, e.g., a couch, a refrigerator, an appliance, or other stationary object in the home 10. If the image capture system 310 captures images while the robot 300 performs the mission, the remote computing system 200 identifies nearby objects or obstacles within the captured images. The remote computing system 200, for example, accesses an object recognition database to identify the objects in the captured images. The remote computing system then causes the audio media device 400 to emit a status update that the mobile robot 300 is near a particular object.

In some examples, if the mobile robot 300 stalls during its mission while the user 100 is within the home 10, the mobile robot 300 transmits a signal to the remote computing system 200 indicating the mobile robot 300 is stalled. The mobile robot 300 detects that it has stalled using, for example, the stall sensor unit such as an optical stasis sensor, a motor stall sensor, a mouse sensor, a gyroscope, an accelerometer, stereo cameras, and/or another sensor for motion detection. The remote computing system 200, instead of waiting for the user 100 to request a status update, can cause the audio media device 400 to emit a status update indicating the mobile robot 300 is stalled. If the remote computing system 200 is able to determine a room where the mobile robot 300 is located, the remote computing system 200 further causes the status update emitted by the audio media device 400 to indicate the room where the mobile robot 300 is located and stalled. If the mobile robot 300 is stalled near an object detectable by the sensing system 308 of the mobile robot 300 and identifiable by the remote computing system 200, the status update indicates the specific object.

Exemplary Recommendation Processes

Figure 9:
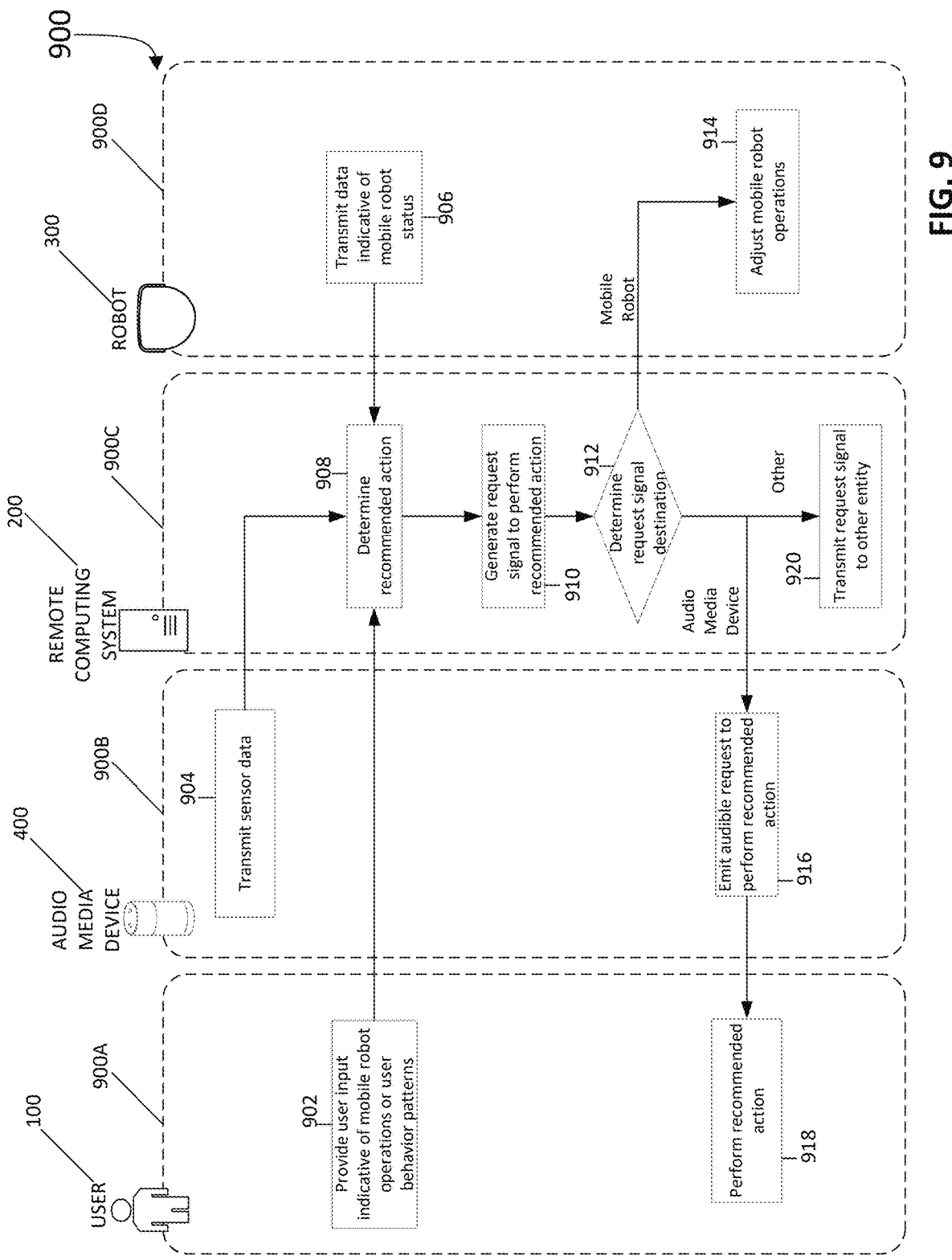
FIG. 9 is a flow chart depicting a process to perform a recommended action based on operations of a mobile robot.

In some implementations, the remote computing system 200 determines that performance of a recommended action would benefit operations of the mobile robot 300 and subsequently requests that the recommended action be performed. The remote computing system 200 can cause the audio media device 400 to emit an audible signal indicating that the recommended action has been or will be performed. Examples of recommended actions are described with respect to the recommendation process 900 of FIG. 9. The recommendation process 900 of FIG. 9 depicts an example of operations performed by the user 100 (user operations 900A), the audio media device 400 (audio media device operations 900B), the remote computing system 200 (remote computing system operations 900C), and the mobile robot 300 (mobile robot operations 900D) to cause the recommended action to be performed.

The remote computing system 200 can determine that an action would benefit the mobile robot's operations based on input data from the user 100, the audio media device 400, the mobile robot 300, or combinations thereof. The user 100, for example, provides (902) one or more user inputs indicative of operations of the mobile robot 300. The user inputs can also be indicative of user behavior. The user inputs, for instance, correspond to a user-defined schedule for operations of the mobile robot 300, user-initiation or user-cessation of operations of the mobile robot 300, etc. The audio media device 400 transmits (904) data collected by its sensors, and the mobile robot 300 transmits (906) data indicative of a status of the mobile robot 300.

Based on one or more of these inputs (e.g., received from the operations 902, 904, 906), the remote computing system 200 determines (908) a recommended action to be performed and generates (910) a request signal to perform the recommended action. The remote computing system 200 determines (912) the destination to transmit a request signal for the recommended action. The recommended action corresponds to, for example, a robot action, a user action, or an action performed by another computing system remote from the home 10.

If the recommended action is to be performed by the mobile robot 300, the remote computing system 200 transmits the request signal to the mobile robot 300, which in turn adjusts (914) mobile robot operations according to the request signal, i.e., according to the recommended action. The recommended action is, for example, an adjustment to a user-defined schedule for the mobile robot 300. If the mobile robot 300 is a vacuum cleaning robot, in some implementations, the remote computing system 200 determines that vacuum cleaning robot has not cleaned the home 10 or a particular room in the home 10 for a predefined duration of time, e.g., a week to one month or more. The remote computing system 200 generates (910) the request signal to perform the recommended action and then transmits the request signal to the mobile robot 300 to initiate a cleaning operation in the home 10, or in the particular room in the home 10.

In some examples, the remote computing system 200 receives indications from occupancy sensors, e.g., on the audio media device 400 or on linked devices 102A, 102B, that indicate when occupants of the home 10 are away. From the indications of the occupancy sensors, the remote computing system 200 determines, for instance, a pattern of when the occupants are at home or away from home. The remote computing system 200 causes the audio media device 400 to emit (916) an audible request to change a user-defined schedule for the mobile robot 300 such that the mobile robot 300 operates when the occupants are generally away from home. If the user 100 confirms the request, the remote computing system 200 adjusts the user-defined schedule accordingly.

If the recommended action is to be performed by the user 100, the remote computing system 200 transmits the request signal to the audio media device 400 to cause the audio media device 400 to emit (916) an audible request for the user 100 to perform (918) the recommended action. For example, the remote computing system 200 can determine that a door to a room is closed based on data collected by the audio media device 400. The data from the audio media device 400 can correspond to an acoustic map with a discrepancy to a baseline acoustic map constructed using the acoustic mapping routine. The discrepancy indicates that a door is open or closed. If the door corresponds to a door for the doorway 22A and the remote computing system 200 determines the door is closed based on acoustic mapping data, the remote computing system 200 causes the audio media device 400 to emit (916) an audible request for the user to open the door so that the mobile robot 300 is able to traverse the doorway 22A and enter the room 20B.

If the recommended action is to be performed by another entity besides the mobile robot 300 or the user 100, the remote computing system 200 transmits (920) the request signal to that entity, e.g., another remote computing system. In some implementations, the data indicative of the status of the mobile robot 300 indicates that the mobile robot 300 requires a replacement of a replaceable component soon, e.g., within 3 days to 7 days. The remote computing system 200 generates (910) a request signal to purchase the component and transmits the request signal to, e.g., an online marketplace. In some cases, the request signal causes the component to be ordered and delivered to the home 10 of the user 100 before the replaceable component needs to be replaced. The component corresponds to, for example, a consumable item such as a robot battery or floor scrubbing pad. If the mobile robot 300 is a cleaning robot, the component can be a cleaning brush, a cleaning pad, a roller, a debris bin, a bin lid, or other replaceable component.

In some implementations, after the remote computing system 200 determines (908) the recommended action, the remote computing system 200 causes the audio media device 400 to request confirmation from the user 100 that the recommended action should be performed. For example, if the remote computing system 200 recommends a purchase of a replacement component, the remote computing system 200 triggers the audio media device 400 to emit an audible request to a user 100 for conforming such a purchase-. The user 100 then allows the purchase to occur or denies the request to prevent the purchase from occurring by speaking naturally to the AMD in response to the request. If the recommended action is to be performed directly by the user 100 (e.g., the user should open a door), the remote computing system 200 may not request confirmation and instead directly emits (916) the audible notification to inform user 100 that the user 100 should perform (918) the recommended action.

In some examples, the request signal causes a user-defined schedule for the mobile robot 300 to change in accordance to events recorded in a user event calendar. The user 100 can provide (902) a user input indicative of upcoming events. The upcoming event can be a house gathering in which the user 100 has invited guests to come to the home 10, and it may be desirable to prohibit operation of the mobile robot 300 during the event scheduled on a network-accessible calendar. If the mobile robot 300 is scheduled to perform an operation during the upcoming event, the remote computing system 200 determines that the robot operation conflicts with the upcoming event. To avoid the conflict, the remote computing system 200 generates (910) a request signal to adjust the user-defined schedule for the mobile robot 300 such that the mobile robot 300 does not perform the operation during the upcoming event.

In some examples, the remote computing system 200 determines that the mobile robot 300 should perform an operation in advance of an event. For example, if the upcoming event is a house gathering, the remote computing system 200 generates (912) a request signal to adjust the user-defined schedule of the mobile robot 300 according to the time period that the house gathering is occurring. If the mobile robot 300 is a cleaning robot, the user-defined scheduled is adjusted such that the mobile robot 300 performs a cleaning operation within a predefined period before the upcoming event, for example, 1 hour to 24 hours before the house gathering. In this regard, the home 10 can be cleaned before the guests arrive for the house gathering.

In some examples, the remote computing system 200 determines that the user 100 has not defined a schedule for the mobile robot 300 but has initiated operations of the mobile robot 300. The user 100 has previously caused the mobile robot 300 to initiate operations without specifying a user-defined schedule. In some examples, the remote computing system 200 extracts patterns from the times that the user 100 has caused initiation of the mobile robot operations. Based on these patterns, the remote computing system 200 generates a request signal causing the audio media device 400 to emit an audible request to adjust a user-defined schedule. The user-defined schedule for the mobile robot operations corresponds to, for example, weekly operations on a specific day of the week or daily operations at a specific time.

In some cases, the mobile robot 300 already performs operations according to a user-defined schedule, but the remote computing system 200 determines that the user 100 has stopped several of these mobile robot operations or has caused the mobile robot 300 to perform operations in addition to those performed according to the user-defined schedule. The remote computing system 200 causes the audio media device 400 to emit an audible request to recommend an adjustment to the user-defined schedule so that the mobile robot 300 is not operated during the times that the user 100 has stopped operations of the mobile robot 300 and so that the mobile robot 300 is operated during the times in which the user 100 has caused the mobile robot 300 to initiate operations.

Exemplary Error Correction Processes

Figure 10:
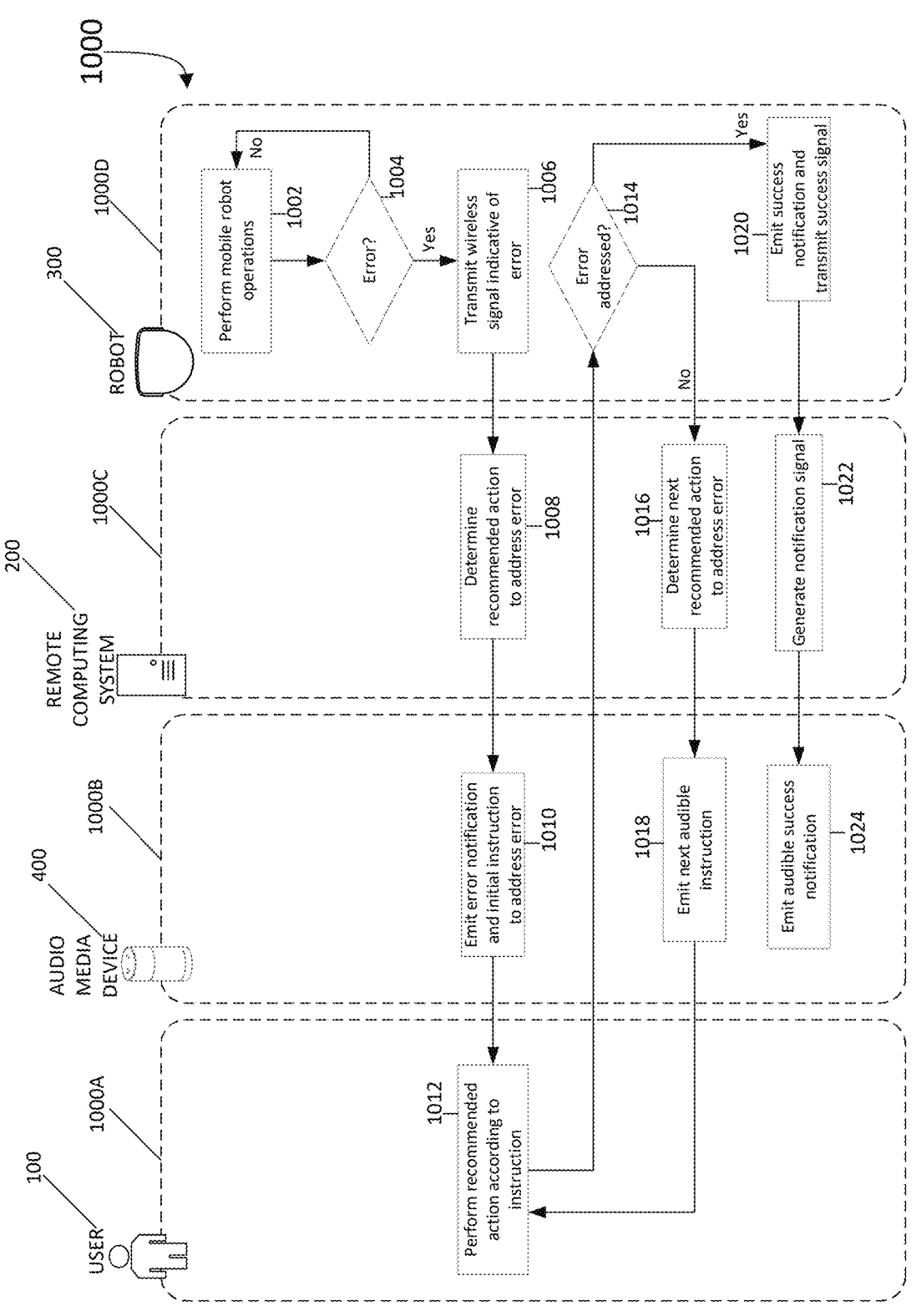
FIG. 10 is a flow chart depicting a process to emit audible instructions to correct an error condition for a mobile robot.
Figures 11A, 11B, 11C, 11D, 11E, 11F, 11G:
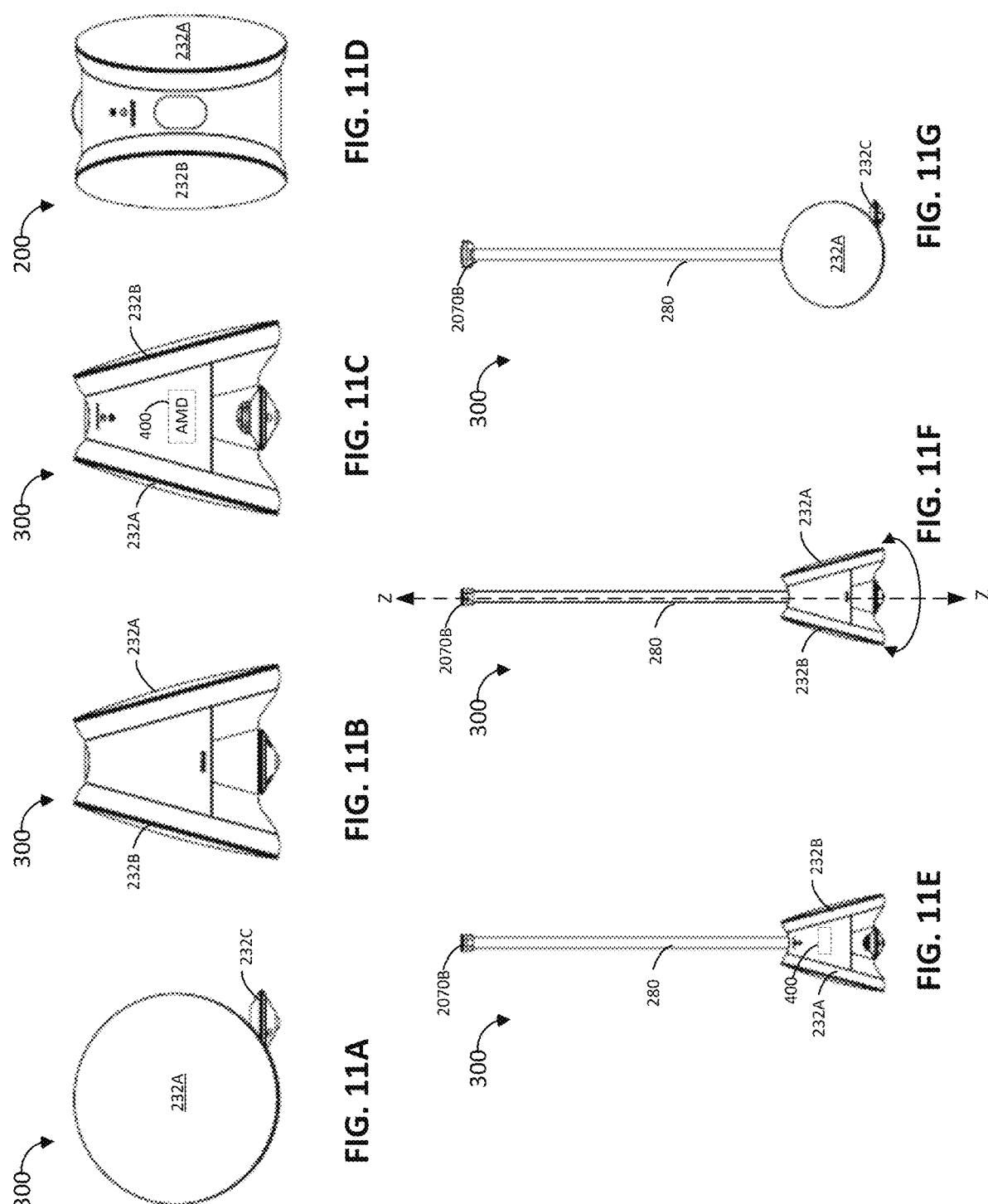
FIGS. 11A-11D are illustrations of a mobile robot in a camera-retracted position.
FIGS. 11E-11G are illustrations of the mobile robot of FIGS. 11A-11D in a camera-protracted position.

In some implementations, the sensing system 308 of the mobile robot 300 determines an error condition for the mobile robot 300 has occurred. The remote computing system 200 receives indication from the mobile robot 300 of the error condition, determines a recommended action to address the basis of the error condition, and causes the audio media device 400 to provide guidance to the user 100 for performing the recommended action. FIG. 10 depicts an example of the error correction process 1000. The error correction process 1000 of FIG. 10 depicts an example of operations performed by the user 100 (user operations 1000A), the audio media device 400 (audio media device operations 1000B), the remote computing system 200 (remote computing system operations 1000C), and the mobile robot 300 (mobile robot operations 1000D) to cause the audio media device 400 to provide the guidance to correct the error.

In some examples, the mobile robot error occurs while the mobile robot 300 performs (1002) an operation. While the mobile robot 300 performs the operation, the mobile robot 300 determines (1004) whether an error has occurred. For example, the mobile robot 300 determines that an error has occurred when a sensor from the sensing system 308 detects an error condition. The error condition can correspond to, for example, a stall condition for the drive wheels 302 of the mobile robot 300, a charge depletion condition for the battery of the mobile robot 300, or other condition that can inhibit or impede operations of the mobile robot 300.

If an error has occurred, the mobile robot 300 transmits (1006) a wireless signal indicative of the error. In some cases, the mobile robot 300 also emits an error notification signal. The remote computing system 200 determines (1008) a recommended action to address the error and then causes the audio media device to emit (1010) an error notification and an initial audible instruction to address the error. The initial audible instruction corresponds to the determined (1008) recommended action. The user 100 performs (1012) the recommend action according to the initial audible instruction.

The mobile robot 300 determines (1014) whether the error has been addressed, for example, by checking the sensors that indicated the error condition. If the error has not been addressed, the remote computing system 200 determines (1016) the next recommended action to address the error and causes the audio media device to emit (1018) the next audible instruction. The user 100 again performs (1012) the next recommended action, and the mobile robot 300 again determines (1014) whether the error has been addressed. The audio media device 400 continues to emit (1018) subsequent audible instructions, for example, until the mobile robot 300 (1014) determines that the error has been addressed.

If the mobile robot 300 determines (1014) that the error has been addressed, the mobile robot 300 emits (1020) a success notification. The mobile robot 300 optionally transmits a success signal to the remote computing system 200 to cause the remote computing system to generate (1022) a notification signal to cause the audio media device 400 to emit (1024) an audible success notification indicating to the user 100 that the error has been addressed. In some implementations, the success notification includes a visual signal, for example, caused by activation of the visual indicator 406.

In some examples, as the mobile robot 300 navigates through the home 10, hair can become entrained on the drive wheels 302, thereby inhibiting rotation of the drive wheels 302. The audio media device 400, during the error correction process 1000, emits audible instructions to describe to the user 100 a sequential set of actions to remove the hair from the drive wheels 302. If the mobile robot 300 is a cleaning robot, the error correction process 1000 can be executed to cause the audio media device 400 to provide audible guidance to the user 100 to address errors associated with cleaning devices on the mobile robot 300, such as a cleaning pad, cleaning rollers, or a debris bin. If the cleaning device is a cleaning pad, the audio media device 400 emits audible instructions to guide the user 100 through the steps of removing the cleaning pad and replacing the cleaning pad. If the cleaning device is a cleaning roller, the audio media device 400 emits audible instructions to guide the user through the steps of removing the cleaning roller, cleaning debris inhibiting operation of the cleaning roller, and replacing the cleaning roller on the mobile robot 300. If the cleaning device is the debris bin, the audio media device 400 emits audible instructions to guide the user 100 through the steps of removing the debris bin, emptying the debris from the debris bin, and replacing the debris bin on the mobile robot 300.

In some examples, while the user 100 performs (1012) actions to address the error or after the mobile robot 300 initially determines that an error has occurred, the remote computing system 200 determines that the error cannot be addressed by user actions or that assistance from a customer service representative may benefit the user 100 to more efficiently address error. In some cases, if the number of emitted audible instructions reaches this predefined number of instructions, the remote computing system 200 can cause the audio media device 400 to emit an audible indication that the user 100 may benefit from interacting with a customer service representative. The remote computing system 200 causes a wireless communication channel to be established between the audio media device 400 and a customer service representative, who can provide further instructions to address the error. In some examples, the remote computing system 200 causes the audio media device 400 to ask the user 100 if the user 100 would like to be connected to the customer service representative using the audio media device 400. The user 100 audibly accepts, and the audio media device 400 accesses the user's contact information from the remote computing system 200 and connects the user device 202 with customer service. For example, if the error requires that the mobile robot 300 be shipped to a repair shop for maintenance, the audio media device 400 establishes the wireless communication channel with the customer service representative to allow the user 100 to receive information regarding the repair process. In some examples, the audio media device 400 emits (1010) audible instructions until a predefined number of instructions have been provided.

Other Alternative Examples

While FIG. 3A has been described with respect to a vacuum cleaning robot, other mobile robots types benefit from the processes described herein. In some examples, the mobile robot is an outdoor robot that navigates around an outdoor environment. The mobile robot can be a robotic lawnmower with rotatable blades that cuts grass or other mowable areas of the outdoor environment. During the command process 700, the user 100 can provide a voice command to the audio media device 400 to cause the robotic lawnmower to perform a mowing operation. The user 100 can issue voice commands the audio media device 400 to specify settings for the robotic lawnmower, such as a height of a blade assembly or a height of grass to be cut. If the outdoor environment includes multiple lawns to be cut by the robotic lawnmower, the voice commands can indicate the specific lawn to be cut during a particular mowing operation. During the notification process 800, the audio media device 400 can provide status updates regrading mowing missions performed by the robotic lawnmower. During the recommendation process 900, the audio media device 400 can emit an audible request to purchase a replaceable component for the robotic lawnmower, such as a bumper, blades, or a blade assembly. The robotic lawnmower therefore can include sensors that detect serviceability of these replaceable components. During the error correction process 1000, the audio media device 400 can emit instructions to address the basis of error associated with, for example, blades or a blade assembly of the robotic lawnmower.

If the mobile robot 300 is a cleaning robot, the mobile robot can be a sweeping or mopping robot to which a cleaning pad can be mounted. In some cases, the cleaning robot sprays liquid onto the floor surface as the cleaning robot navigates about the home 10. A cleaning pad is mounted to the cleaning robot so that the cleaning pad absorbs the liquid as the cleaning robot moves across the floor surface. During the command process 700, the user 100 can provide voice commands to the audio media device 400 to control cleaning operations for the cleaning robot. In some cases, the voice commands are used to adjust an amount of liquid sprayed from the cleaning robot during the cleaning operations. During the notification process 800, the audio media device 400 can provide status updates regarding the condition of the cleaning pad, e.g., whether the cleaning pad mounted to the cleaning robot should be replaced.

During the recommendation process 900, the audio media device 400 can recommend a particular cleaning pad to be used based on a detected floor surface type. Different types of pads that can be mounted to the cleaning robot include, for example, a dry sweeping pad, a damp sweeping pad, or a wet mopping pad. The wet mopping pad, for example, absorbs a greater amount of liquid than the damp sweeping pad, and the dry sweeping pad is intended for use without liquid. Based on the floor type of a room, which can be detected using sensors on the mobile robot 300 or can be inputted by the user 100, the audio media device 400 can emit an audible request to change a cleaning pad to a recommended cleaning pad. For example, if the floor surface is a wood surface, the audio media device 400 may emit an audible request for the user 100 mount a damp sweeping pad to the cleaning robot. If the floor surface is a tile surface, the audio media device 400 may emit an audible request to mount a wet mopping pad to the cleaning robot. In some examples, the remote computing system 200 causes the audio media device 400 to emit an audible request to purchase additional cleaning pads. The remote computing system 200, for example, receives purchase dates for when the user 100 previously purchased disposable cleaning pads for the mobile robot 300 and determines from the purchase dates that the user 100 is likely to require additional cleaning pads based on the purchase dates.

In some examples, as depicted in FIGS. 3A-3B and 11A-11G, the mobile robot 300 is capable of patrolling the home 10 and monitoring conditions therein. As depicted in the examples of FIGS. 11A-11G, the mobile robot 300 includes driven locomotive members 232A, 232B in contact with a floor surface and supporting a robot chassis 2010. The driven locomotive members 232A, 232B are commandable by a controller, for example, a microprocessor 2021, to cause the mobile robot 300 to traverse the floor surface within the home 10. The microprocessor 2021, in some examples, navigate the mobile robot 300 to or through one or more mapped locations within the home 10.

The mobile robot 300 can include a camera 2070B. The camera 2070B is, in some cases, part of the sensing system (e.g., the sensing system 308), while in other implementations, the camera 2070B operates independently from the sensing system 308. In some examples, the image capture system 310 includes the camera 2070B. In some examples, the camera 2070B operates independently from the image capture system 310. In some examples, the mobile robot 300 includes a variable height member. The variable height member is, for example, a fully retractable mast 280 supporting the camera 2070B. In some cases, the camera 2070B is mounted on a top portion of the mast 280, e.g., at the top of the mast 280. In some implementations, the sensing system includes navigation and environmental sensors mounted on the chassis 2010 of the mobile robot 300. The sensing system is, for example, configured to detect location and status of network entities in communication with the wireless network circuit, the network entities being affixed within the home 10.

In certain cases, conditions imaged and/or detected by the mobile robot 300, e.g., by the camera 2070B, are presented in a virtual reality portal that allows a remote user 100 to view the home 10 from multiple vantage points. The user 100 can interact with the presented images to simulate movement through and within multiple rooms in the virtual reality portal without having to manually drive the mobile robot 300 through the home 10 to view an area of the home 10. In some examples, the virtual reality portal is an immersive, high definition, interactive 3D photographic reconstruction of the home 10. The images are combined (e.g. continuously and/or contiguously stitched) to form the interactive 3D photographic reconstruction preserving the continuity of locations imaged by the mobile robot 300 as the mobile robot 300 navigates about the home 10. In cases in which the camera 2070B is mounted on the mast 280, multiple vertical vantage points of the camera 2070B are combined as the mast 280 is moved vertically. The vertical vantage points can be adjusted as the mobile robot 300 traverses the home 10.

In some implementations, the mobile robot 300 rotates in place around a vertical axis Z while the camera 2070B captures images of the home 10 while the camera 2070B is rotate, e.g., through rotation of the chassis 2010 or the mast 280. In some implementations, one of the mapped locations has one or more automatically selected and/or user selected camera height positions. The locations are positioned at default time lapse or distance intervals and/or at user selected locations within the home 10. In some implementations, the camera 2070B gathers between two and four images. In some implementations, the camera 2070B gathers between 4 and 8 high resolution during a 360 degrees rotation at a location of interest. In some implementations, the mast 280 extends between a position flush with the top surface of the chassis 2010 and a height of 1.5 meters (e.g., 5 feet). The location-based images therefore provide interactive, explorable views of the home 10 as provided in a virtual representation through which a remote user 100 may navigate on a human readable display of a remote Internet accessible device without having to drive the robot 300 through the home 10.

In some implementations, a remote user 100 of the system views the home 10 from a first person vantage point while moving between contiguous locations and selectively examining locations of interest more thoroughly from multiple vantage points, either in the immersive, interactive 3D photographic reconstruction and/or in a real time video feed by requesting the mobile robot 300 travel to the location of interest. In some examples, the mobile robot 300 selects default locations Lx1, Lx2, Lx3 . . . . Lxn for imaging the living space in 360 degree views around the robot 300 and/or the remote user 100 of the system selects some or all of the locations at which the mobile robot gathers location-based images of the home 10 during traversal. The system, in some cases, automatically generates multiple remotely accessible 360 degree views from multiple patrols of the mobile robot 300 through the home 10 each day and a user 100 accesses these recorded, time-stamped patrols from a selection list on a human readable display of a human readable display of a remote Internet accessible device.

In some implementations, the mobile robot 300 is used for remotely monitoring non-visible conditions in the home 10 (e.g., temperature, toxin, humidity, and similar air quality measurements) and overlaying a visible information icon and/or interactive menu within the virtual reality portal at the displayed locations Lx1, Lx2, Lx3 . . . . Lxn where the conditions are measured. In some implementations, the mobile robot 300 includes one or more onboard environmental sensors configured to collect information from the home 10 during floorplan traversal, and the monitoring system presents the information to a remote user 100 who is monitoring conditions through the interactive 3D photographic reconstruction of the home 10. In some implementations, the system also includes one or more stationary sensors not mounted on the mobile robot and these stationary sensors are used to monitor the living space to collect data that is presented to a remote user who is monitoring conditions through the interactive 3D photographic reconstruction of the home 10. In some implementations, the mobile robot 300 detects the state of stationary sensors monitoring the home 10 and, at a remote user display, the system provides an informative and/or interactive menu adjacent the stationary sensor in the interactive 3D photographic reconstruction of the home 10.

Network entities, such as thermostats, air purifiers and humidifiers, are stationary and typically located at one or two locations throughout a living space and the stationary sensors therein measure relatively localized air currents at that particular singular, unchanging location. The mobile robot 300 provides the advantage of accessing locations distant from or in another compartment or room not immediately adjacent the network entities. By monitoring and measuring temperature, air quality and humidity throughout the living space, the mobile robot 300 provides information otherwise inaccessible by static network entities.

With reference to FIGS. 3A-3B and 11A-11G, the exemplary mobile robot 300 includes a chassis 2010, a controller 306, memory 318, a battery 2024, a battery charger 2026, a drive system 2030, a mapping/navigation system 2040, a wireless communication system 316, an IR emitter 2060, sensors 2070AN, 310, and 314, an indicator light 2074A, an audio transducer 2074B, and a structured light sensor 2070K for obstacle avoidance and detection. The controller 306 may include any suitably configured processor 2021 (e.g., microprocessor) or processors. The microprocessor 2021 is in communication with the controller 306, memory 318, the sensors 2070A-N, 310 and 314, and drive system 2030. In some implementations, the camera 2070B is an imaging device that gathers 2D images, panoramic view, video and/or 3D models.

The wireless communication system 316 includes a wireless communication transmitter or module 252 (e.g., a Wi-Fi module) and an associated antenna 254 to enable wireless communication between the robot 300 and a hub 110 (such as a Google OnHub wi-fi access point) and/or a private network 160 (i.e., via the WAP 164). Various different network configurations may be employed for the private network 160, of which the mobile robot 300 constitutes a node. In some examples, the robot 300 communicates wirelessly with the hub 110 through a router 162 via the WAP 164. In some examples, the mobile robot 200 communicates with a remote management server 204 via the router 162 and the WAP 164, bypassing the hub 110.

Returning to FIG. 3B, in some implementations, the robot 300 includes environmental sensors. The exemplary robot 300 includes the following environmental sensors: an IR radiation detector 2070A, a camera 2070B, an ambient temperature sensor 2070C, an ambient light sensor 2070D, an acoustic sensor 314 (e.g., microphone), a motion detector 2070F (e.g., a passive IR photodiode), an ultrasonic sensor 2070G, a pressure sensor 2070H, an air quality sensor 2070I, and a moisture sensor 2070J. These sensors are not exhaustive of the types of sensors that may be provided on the robot 300 and certain of the sensors may be omitted depending on the environmental parameters to be detected by the robot 300.

In some implementations, the mobile robot 200 includes sensors for Obstacle Detection and Obstacle Avoidance ("ODOA") during transit through the home 10. These sensors include mechanical bumper switch sensor 2032 triggered on contact with a stationary obstacle and non-contact sensors such as ultrasonic sensors 2070G, infrared emitter/detector proximity sensors 2065, and structured light sensors 2070K such as those made by PixArt.

In some implementations, as described in detail above, the mobile robot 300 includes a mapping/navigation system 2040 for autonomous navigation and mapping of the home 10. The mobile robot 300 includes sensors for autonomous navigation such as a camera 310 for Visual Simultaneous Localization and Mapping ("VSLAM"), a mouse sensor 2070M, an IMU 2070L with a 3 axis accelerometer and a 3 axis gyroscope, and/or wheel odometers 2070F to determine or register the position of the robot 300 relative to the space 10 (i.e., to localize the robot 300 in the space 10). The robot 300 can localize the locations of readings collected by its onboard sensors 2070A-J. Any suitable technique and components may be used to localize and register the robot 300, such as machine vision (e.g., using the camera 310 and Feature Recognition or Class Recognition software), light beacons, or radiofrequency received signal strength indicator (RSSI) technology.

In some implementations, the mobile robot 300 includes at least one localizing sensor that observes sensor readings from objects within the space, for determining a current pose of the mobile robot 300 with reference to the observed objects. The mobile robot 300 associates a pose with a room identifier specifically associated with the observed objects stationed in the room. In some implementations, the autonomous mobile robot 300 builds a progressively improving map at the same time as it covers within this map, and transmits map data (e.g., entire sets of map data, simplified representations of map data, or abstractions of map data) to the remote computing system 200. In order to reach the public Internet 205 with its data or representations and/or abstractions thereof, the microprocessor 2021, wireless transmitter 2052, wireless receiver 2054, and/or transceiver (including those with their own embedded microprocessors) would communicate using IP (Internet Protocol) and support conventional addressing and packetizing for the public Internet 200, or remote computing system 200.

Any portion of a map database or coverage database may be transmitted to and stored in a location other than the robot 300, e.g., a local hub 110 or gateway within the home 10, a hub, gateway, server 204 or similar on the remote computing system 200, or virtualized instances of the same available on the Internet. In certain cases, the mobile robot 300 transmits its map to the remote computing system 200 and the audio media device (AMD) 400 accesses this map from the remote computing system 200 to provide audible summaries of measurement data to a user 100. In certain examples, the AMD 400 queries a user 100 regarding modifying parameters of connected devices in the home 10 in response to measured conditions. The AMD 400 effects those changes in accordance with a user 100 verbally instructing the AMD 400 to proceed with the recommended action, such as closing an air vent or closing a window shade in a warmer room.

The remote computing system 200 maintains a database of up to date physical maps and other spatial information about the home 10 and the data collection by the mobile robot 300. The maps in the remote computing system 200 include locations of relevant objects, such as furniture, connected devices in the home, like connected lights or appliances, and layers of spatial information about the home, like temperature maps or lighting illumination maps. With this information, the remote computing system performs important spatial analytics operations. For example, if the user 100 wants reading lighting on the couch in the living room, the remote computing system 200 determines which lights to turn on and how brightly based on the physical map of the home 10. With knowledge of the location of the living room, the couch, and nearby lighting sources, along with an understanding how different lighting sources impact the illumination of the area around the couch, the remote computing system 200 adjusts the connected lighting. The mobile robot 300 builds the map and persistently maintains this map with each mission or regular patrol of the home 10. The map iteratively improves and/or changes with changes in the traversable floor space of the environment, e.g., floor space not occupied by obstacles, where the mobile robot 300 can transit. As the mobile robot 300 moves throughout the house 10, it builds a physical map of the space, identifying the structure of the space, like where the walls are. This is an important step as the physical map is the foundation for an understanding the space and layout of the home 10. On initial install, the mobile robot 300 has to explore and build a map from scratch. Over time, however, the mobile robot 300 learns the general map, or accesses it from the remote computing system, and uses the map to systematically navigate around the home 10 and recognize when something has changed, updating the map in the process.

While the mobile robot 300 is moving through the home 10, it detects objects of interest, such as common pieces of furniture or appliances that can be labeled and added to the map. An understanding of objects in the space provides a richer level of understanding to remote computing system 200 that is useful in performing higher level tasks, such as responding to a request to provide reading light by the couch. The user 100 also may have shown to the mobile robot 300 other specific items of interest, such as an AMD 400, kids' backpacks, special toys or a family dog. The locations of these items as they are encountered by the mobile robot 300 are updated on the map. Furthermore, given an understanding of the objects in the space, rooms 20 can be labeled as well. Refrigerators are in the kitchen. Beds are in bedrooms. This provides additional semantic context to the robot map and the AMD 400 accesses this information for providing aural notifications to a local user 100.

The mobile robot 300 also discovers connected devices in the home through standard protocols and localizes them on the map. This includes positions of connected lights and speakers, vents, door and window sensors, and other connected devices in the home 10. The mobile robot 300 roams the home 10 and uses RF signatures, visual recognition, received signal strength and other methods to recognize connected devices in the home 10 and automatically place them on the robot map of the home 10. For example, the mobile robot 300 explores the home 10 and recognizes a NEST thermostat on the wall in the living room, a connected SAMSUNG fridge in the kitchen, and HUE BLOOM lights in both the family room and the bedroom. The mobile robot 300 puts the recognized devices on the map and enables the user 100 and the AMD 400 to take advantage of this spatial knowledge of the connected devices. For example, a user is able to turn on the lights in the bedroom by speaking the words, "turn the light on in the bedroom." The interactions of the AMD 400 and mobile robot 300 described herein enable this simple speech control over devices detected by the mobile robot 300 that patrols the home 10.

In some implementations, the mobile robot 300 controls the various connected devices to learn how they affect the home 10. For example, the mobile robot 300 samples illumination levels all around the home 10 to develop a spatial illumination map for scenarios in which different lights are switched on and off at different times of day. This enables an understanding of how to achieve certain lighting profiles throughout the home 10 based on the control of individual lighting sources. Similarly, this can be done for speakers and sound or volume profiles, airflow through climate control vents, and temperature profiles as well. This all leads to the mobile robot 300 providing the remote computing system 200 with a rich, labeled map of the home 10. This integrated understanding of the layout of space with the locations of key objects and devices provides the foundation for valuable spatial analytics needed to enable the smart home 10 (e.g., a home populated with connected devices) to manage itself and deliver easy-to-use smart home capabilities to a user 100.

Figure 12:
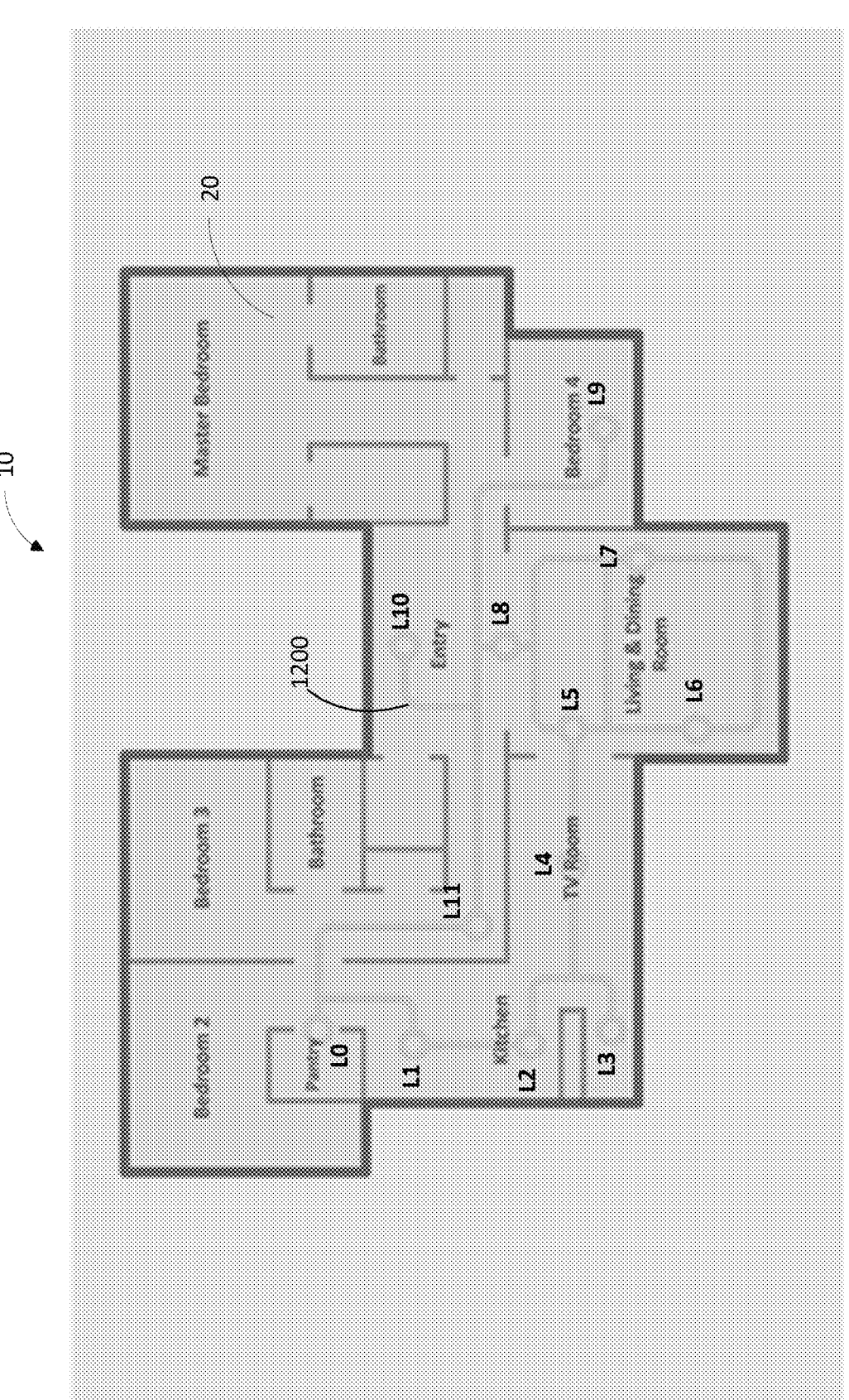
FIG. 12 is a schematic diagram representing an example of a mobile robot monitoring route.

Turning to FIG. 12 in an implementation, the mobile robot 300 begins an autonomous patrol and map generation of an enclosure space, e.g., the home 10 or rooms 20 within the home 10. While traversing through a floorplan of the enclosure space, the mobile robot 200 autonomously builds a map of the enclosure space including marking waypoints along the patrol route 1200. In some implementations, the mobile robot 300 rotates in place around a vertical Z-axis (shown in FIG. 11E) at various waypoint locations L1, L2, L3 . . . . Ln throughout the enclosure space. These locations L1, L2, L3 . . . . Ln are waypoints along the robot patrol route 1200 as the robot 300 traverses the enclosure space on a monitoring mission to collect image data, data collected from stationary networked devices along the patrol route 1200 and other environmentally sensed data detected by the sensors of the mobile robot 1200 for processing and presentation to an end user 100 at a remote user terminal 144 and/or by an AMD 400 providing auditory messaging to a user 100 in the enclosure space. As depicted in the schematic floorplan view of a home 10 in FIG. 12, the locations have two dimensional coordinates relative to a global coordinate system of the map. For example, in some implementations, the robot 300 begins a patrol at the location L0, where a robot dock is located. The location L0, e.g., corresponding to the location of the robot dock, is the global origin against which all other locations L1, L2, L3 . . . . Ln are referenced on the robot map. In some implementations, the robot 300 automatically selects the locations L1, L2, L3 . . . . Ln at which to stop transit and rotate based on a default time interval and/or traveled distance. For example, in one implementation, the robot 300 stops every four feet and rotates to gather images representing 360 degree robot views at each stop location L1, L2, L3 . . . . Ln and uploads the gathered images to an image database stored in memory on or off the robot 300. In other implementations, the remote user at a remote user terminal pre-selects one or more locations Lx1, Lx2, Lx3 . . . . Lxn at which the robot 300 stops. In some implementations, the robot 300 stops at a combination of robot default and pre-selected user locations L1, Lx1, L2, Lx2, L3 . . . . Ln.

In some implementations, the AMD 400 is remote from the mobile robot 300 and stationary within the enclosure space or home 10. During transit about the home 10, the mobile robot 300 detects the AMD 400 and stores the AMD location on the robot map, which is sharable with the AMD and other networked devices and robots directly or through the remote computing system 200 (e.g., the Cloud). In other implementations, the AMD 400 is included on the robot chassis 2010 and moves with the mobile robot 300. In some implementations, the AMD 400 is fully embedded within the chassis of the robot 300 and in other implementations, the AMD 400 is a portable attachable/detachable device interchangeable attached to various mobile robots 300, 301 in the house 10.

In examples in which the mobile robot 300 is equipped with the AMD 400, voice interaction becomes location-aware in the home 10. A "turn the lights off" voice command when the robot 300 is in the kitchen turns the connected kitchen lights off and when in the living room, turns the connected living room lights off. Similarly a user 100 can speak to the mobile robot 300 having an incorporated AMD 400 for setting temperature and adjusting audio volume on connected speakers. For example, a user 100 says "turn the volume down" and the AMD-equipped robot 300 turns the volume down on the speaker at the location of the user 100.

As mentioned above, in some implementations, the mobile robot 300 samples sensors readings around the home 10 and uses them to be more insightful in response/action. For example, if the mobile robot 300 takes a temperature reading in the kitchen and one in the living room, the user 100 can command the AMD-equipped mobile robot 300 to evenly adjust the temperature in both rooms by saying "set the living room temperature to the same setting as the dining room temperature". In some implementations, the mobile robot 300 takes illumination level readings throughout the home with different lights switched on and off and learns how each individual light impacts the lighting of the space. Then, if the user 100 asks for more light in the living room, the mobile robot 300, knowing its location in the home 10, can appropriately turn lights on to give more lighting to a given space in the home 10.

A user 100 also could query the AMD-equipped mobile robot 300 with inquiries like the following: "What is the Wi-Fi signal strength at the back door?" The mobile robot 300 could go to the back door, take a sensor reading and audibly and/or visually (e.g., on a smartphone app, SMS, text message, email or banner alert) inform the user 100 of the result. In another example, the user 10 could ask the AMD-equipped mobile robot 300 questions about environmental conditions monitored in the home 10, such as verbally asking, "did you detect humidity above 90% anywhere around the home today?" The AMD-equipped mobile robot 300 then responds by producing audible and/or visual response.

As described above with regard to the components of the AMD, sound localization enables an AMD-equipped mobile robot 300 to know the relative location of the user 100 who is speaking person with respect to the robot 300, and the mobile robot 300 can respond to commands to such as "come here" by driving in the direction of the speaking user 100 as detected by the direction-sensing microphones on the AMD 400. Because the mobile robot 300 detects the AMD 400 and places its location on the robot map and because the robot map is shared with the remote computing device and the AMD, the communication network 201 can determine a distance to the speaking user 100. For example, the AMD 400 can detect multipath voice reflections from the user 100 at one or more of its microphones positioned on the AMD 400. Knowing the distance and orientations of the microphones relative to a wall or walls off of which the voice of the user 100 bounces, the AMD 400 and/or the remote computing system 200 can use these the multipath signals to calculate the origin of the detected voice command based on triangulation and basic trigonometry. In some implementations, the remote computing system 200 and/or AMD 400 compensate for noise and/or attenuation in calculating the speaking user's pose on the robot map. For example, the user 100 could say to the mobile robot 300, "come position yourself here for the day," and the mobile robot 300 would move to the location of the user 100. Similarly, a user 100 could vocalize the words "follow me" to get the AMD-equipped mobile robot 300 to follow behind a walking user 100. The user could say "face me," and the AMD-equipped mobile robot 300 would reorient its forward portion to face the user 100.

If the user 100 gives a voice command, but the AMD device 400 had problems hearing, the AMD-equipped mobile robot 300 could reorient and/or move to a position closer to the user 100 or away from another source of noise to hear better and ask the user 100 to repeat the voice command.

In some examples, the user 100 provides an audible command to cause the mobile robot 300 to move toward an object. In response to the audible command, the mobile robot 300 autonomously navigates toward the object. In some cases, the mobile robot 300 moves the mast 280 to a height relative to the chassis 2010 such that the camera 310 or other sensors supported by the mast 280 is directed toward the object after the mobile robot 300 autonomously moves to a position proximate the object.

In some implementations, the user 100 could query the AMD-equipped mobile robot 300 for items that require a visual or other type of sensor inspection somewhere else in the home 10. For example, the user 100 asks, "Is the front door open?" (assuming the front door has no Internet or LAN connected open/close sensor). The AMD-equipped mobile robot 300 drives to the front door and visually inspects the door with its camera and/or proximity sensors or other ranging sensors to acquire the data needed to answer the question. The data is sent to the remote computing system 200 for processing, and the AMD-equipped mobile robot 300 returns to the user 100 and audibly pronounces the response to the question. In this way, a user 100 could ask the AMD-equipped mobile robot 300 to patrol for any number of status conditions requiring mobility and mapping. For example, the user could ask the AMD-equipped mobile robot 300 the following questions: "Is the den window open?" "Are the lights on in the kitchen?" "Is anyone in the living room?" In response, the AMD-equipped mobile robot 300 drives to the destination to collect data responsive to the inquiry.

Similarly, a user 100 could ask the AMD-equipped mobile robot 300 for a location of an object in the home 10. In one implementation, a user 100 speaks the words "where is my backpack?" and the AMD-equipped mobile robot 300 drives around the house 10 looking for the backpack. In one implementation, the AMD-equipped mobile robot 300 accesses pictures of identified objects imaged around the home 10 during recent mission or patrol and reports the location of an identified object to the user once the object is found and verified against an onboard collection of images or a collection of images stored in the remote computing system 400. In some implementations, a user 100 asks the AMD-equipped mobile robot 300 to find devices having RF signatures. For example, if a user 100 asks the AMD-equipped mobile robot 300, "Where is my phone?", the mobile robot 300 searches radio frequency signals around the home 10 looking for the Bluetooth ID of the phone associated with the user 100 in a database on or accessible to the remote computing system 200 and/or mobile robot 300. The AMD-equipped mobile robot 300 then audibly and/or visibly alerts the user 100 to the phone's location. Because the mobile robot 300 is equipped with an AMD 400, the mobile robot 300 is equipped to speak naturally to a user in plain language. For example, the AMD-equipped mobile robot 300 will tell the user "Your phone is here, in the living room, on the couch." This eliminates the need for a user 100 to log into an application or web page a terminal or user device 202. The user 100 need rely only on real time, natural speech interaction to command the mobile robot 300 and control connected devices throughout the home 10.

In some implementations, a user verbalizes commands and inquiries to the AMD-equipped mobile robot 300 such as the following: "Return to your charging dock", "Put your camera in privacy mode (e.g., lower the mast 280)", "Go to location.", "Increase/decrease your driving speed", "Raise your camera mast", "Turn around", and "Leave this room." The user 100 thus need not log into an app or use another online portal or remote control to command the robot. Simple spoken language commands the mobile robot 300 without any need for an added level of inefficiency or complexity.

In some implementations, the audio media device 400 is an alternative user interface for activate and de-activing the monitoring system (e.g., camera 310, 2070B), of the mobile robot 300. A user 100 can voice command the AMD equipped mobile robot 300 to patrol the home upon departure or shut down for the night upon arrival to the home 10.

In some implementations, the AMD 400 allows the user 100 to establish an audible password to activate or deactivate the monitoring system of the mobile robot 300.

In some implementations, the AMD 400 allows the user 100 to commanding the mobile robot 300 via the AMD 400 to take an image or video from the robot's camera 310, 2070B. This could be used for user identification, such as telling the robot 300 via the audio media device to recognize the user 100 standing in front of the camera 310, 2070B. As an added level of security/authorization, in some implementations, the mobile robot 300 must identify a user 100 as part of unlocking a level or levels of access to functions accessible via the audio media device 400.

In some implementations, the audio media device 400 prompts a user 100 for audible responses in response to detection or actions by the monitoring robot 300. For example, if the mobile robot 300 detects a person in the home while it is on a mission, it instructs the person to identify themselves and/or provide additional information via the audio media device 400.

In some implementations, a camera 310, 2070B of the mobile robot 300 is alternative user interface that supplements the audio media device 400. One example would be using the camera for gesture recognition, such that in response to the gesture, the mobile robot 300 relays commands to the audio media device 400 to either effect the operation of the audio media device 400 and/or the operation of other devices connected to the audio media device 400 and/or the remote computing system 200. For example, the user 100 tells the audio media device 400 to adjust the lights via voice command, and then the camera 310, 2070B on the mobile robot 300 detects the user 100 raising a hand and/or arm and commands the AMD 400 and/or remote computing system to raise or lower the level of the lights accordingly.

The autonomous mobile robots described herein can be controlled, at least in part, using one or more computer program products, e.g., one or more computer programs tangibly embodied in one or more information carriers, such as one or more non-transitory machine-readable media, for execution by, or to control the operation of, one or more data processing apparatus, e.g., a programmable processor, a computer, multiple computers, and/or programmable logic components.

Operations associated with controlling the autonomous mobile robots described herein can be performed by one or more programmable processors executing one or more computer programs to perform the functions described herein. A computer program can be written in any form of programming language, including compiled or interpreted languages, and it can be deployed in any form, including as a stand-alone program or as a module, component, subroutine, or other unit suitable for use in a computing environment. Control over all or part of the robots described herein can be implemented using special purpose logic circuitry, e.g., an FPGA (field programmable gate array) and/or an ASIC (application-specific integrated circuit).

The controllers described herein can include one or more processors. Processors suitable for the execution of a computer program include, by way of example, both general and special purpose microprocessors, and any one or more processors of any kind of digital computer. Generally, a processor will receive instructions and data from a read-only storage area or a random access storage area or both. Elements of a computer include one or more processors for executing instructions and one or more storage area devices for storing instructions and data. Generally, a computer will also include, or be operatively coupled to receive data from, or transfer data to, or both, one or more machine-readable storage media, such as mass PCBs for storing data, e.g., magnetic, magneto-optical disks, or optical disks. Machine-readable storage media suitable for embodying computer program instructions and data include all forms of non-volatile storage area, including by way of example, semiconductor storage area devices, e.g., EPROM, EEPROM, and flash storage area devices; magnetic disks, e.g., internal hard disks or removable disks; magneto-optical disks; and CD-ROM and DVD-ROM disks.

A number of implementations have been described. Nevertheless, it will be understood that various modifications may be made. Accordingly, other implementations are within the scope of the claims.

What is claimed is:

1. A method comprising:
   establishing wireless communication between an autonomous cleaning robot and a stationary audio media device, the autonomous cleaning robot movable about a space, and the stationary audio media device stationed on a surface in the space and comprising a microphone in a housing of the stationary audio media device and a speaker in the housing;
   receiving, at the microphone of the stationary audio media device, a voice command provided by a user;
   transmitting a representation of sound of the voice command from the stationary audio media device to a cloud computing system remote from the autonomous cleaning robot and the stationary audio media device;
   executing, at the cloud computing system, a sound recognition routine to parse the representation of the sound and identify a robot command corresponding to the voice command;
   transmitting, based on identifying the robot command, a command signal from the cloud computing system to the autonomous cleaning robot over a transmission path that bypasses the stationary audio media device,
   wherein the command signal is configured to cause the autonomous cleaning robot to initiate one or more operations indicated by the robot command upon receiving the command signal;
   receiving, at the cloud computing system, from the autonomous cleaning robot, data indicative of performance of the one or more operations; and
   based on the data indicative of the performance of the one or more operations, transmitting, from the cloud computing system to the stationary audio media device, a mission status update command signal configured to cause the speaker of the stationary audio media device to emit a mission status update.

2. The method of claim 1, wherein the one or more operations comprise:

moving the autonomous cleaning robot from a current location of the autonomous cleaning robot to a location proximate the user, or moving the autonomous cleaning robot from the current location of the autonomous cleaning robot to perform a spot cleaning operation at the location proximate the user.

3. The method of claim 1, comprising:

determining, by the cloud computing system, a portion of an environment that was not traversed by the autonomous cleaning robot during a cleaning mission, wherein the mission status update indicates the portion that was not traversed.

4. The method of claim 1, wherein the sound recognition routine executed by the cloud computing system is configured to recognize at least one of:

a low frequency noise from an appliance, or a noise originating from the autonomous cleaning robot.

5. The method of claim 4, wherein the sound recognition routine is configured to recognize the noise originating from the autonomous cleaning robot, and wherein the noise originating from the autonomous cleaning robot is caused by at least one of:

an air mover of the autonomous cleaning robot, a motor of the autonomous cleaning robot, or movement of drive wheels of the autonomous cleaning robot across a floor surface.

6. The method of claim 1, further comprising:

transmitting, from the cloud computing system to the stationary audio media device, a command configured to cause the stationary audio media device to provide an audible success notification in response to transmission of the command signal.

7. The method of claim 1, wherein the one or more operations comprises moving the autonomous cleaning robot to dock with a docking station and to cause the docking station to evacuate debris from a debris bin of the autonomous cleaning robot.

8. The method of claim 1, further comprising generating a map of the space, the map indicating positions of devices in wireless communication with the cloud computing system, the autonomous cleaning robot being in wireless communication with the cloud computing system.

9. The method of claim 8, wherein the devices comprise the stationary audio media device.

10. The method of claim 1, wherein the one or more operations comprises navigating the autonomous cleaning robot toward the stationary audio media device.

11. The method of claim 1, wherein:

the method further comprises:

identifying, through execution of the sound recognition routine, an audible identifier associated with the autonomous cleaning robot; and transmitting the command signal to the autonomous cleaning robot comprises:

transmitting the command signal based on identifying the audible identifier.

12. The method of claim 11, wherein identifying the audible identifier associated with the autonomous cleaning robot comprises accessing, by the cloud computing system, a user account associated with the autonomous cleaning robot or the stationary audio media device.

13. The method of claim 1, wherein the one or more operations comprises initiating or pausing a cleaning operation of the autonomous cleaning robot.

14. The method of claim 1, wherein the voice command is indicative of a user-defined schedule, and the one or more operations comprises:

storing, in memory of the autonomous cleaning robot, the user-defined schedule to perform a subsequent operation at a future time; and causing the autonomous cleaning robot to perform the subsequent operation at the future time.

15. The method of claim 1, wherein the stationary audio media device does not comprise a display.

16. The method of claim 1, comprising:

identifying, by the cloud computing system, a room identifier in a user utterance; and associating the room identifier with a room in the space based on the autonomous cleaning robot being located in the room when the user utterance is received.

17. The method of claim 1, wherein executing the sound recognition routine comprises determining whether the voice command includes a predefined command in a command database.

18. The method of claim 1, wherein executing the sound recognition routine comprises:

identifying, in the voice command, first identification data corresponding to the stationary audio media device and second identification data corresponding to the autonomous cleaning robot;

determining that the first identification data and the second identification data are not associated; and based on determining that the first identification data and the second identification data are not associated, causing the stationary audio media device to emit an error notification.

19. The method of claim 18, wherein determining that the first identification data and the second identification data are not associated comprises determining that the voice command includes an identifier of a robot different from the autonomous cleaning robot.

20. One or more non-transitory, computer readable media storing instructions that, when executed by one or more processors, cause the one or more processors to:

establish wireless communication between an autonomous cleaning robot and a stationary audio media device, the autonomous cleaning robot movable about a space, and the stationary audio media device stationed on a surface in the space and comprising a microphone in a housing of the stationary audio media device and a speaker in the housing;

receiving, at the microphone of the stationary audio media device, a voice command provided by a user;

transmitting a representation of sound of the voice command from the stationary audio media device to a cloud computing system remote from the autonomous cleaning robot and the stationary audio media device;

executing, at the cloud computing system, a sound recognition routine to parse the representation of the sound and identify a robot command corresponding to the voice command;

transmitting, based on identifying the robot command, a command signal from the cloud computing system to the autonomous cleaning robot over a transmission path that bypasses the stationary audio media device, wherein the command signal is configured to cause the autonomous cleaning robot to initiate one or more operations indicated by the robot command upon receiving the command signal;

receiving, at the cloud computing system, from the autonomous cleaning robot, data indicative of performance of the one or more operations; and based on the data indicative of the performance of the one or more operations, transmitting, from the cloud computing system to the stationary audio media device, a mission status update command signal configured to cause the speaker of the stationary audio media device to emit a mission status update.

21. The one or more non-transitory, computer readable media of claim 20, wherein the instructions, when executed by the one or more processors, cause the one or more processors to:

cause the stationary audio media device to provide an audible success notification in response to transmission of the command signal to the autonomous cleaning robot to cause the autonomous cleaning robot to initiate the one or more operations.

22. A method comprising:

receiving, at a microphone of a stationary audio media device, a first voice command, the stationary audio media device stationed on a surface in a space and comprising the microphone in a housing of the stationary audio media device and a speaker in the housing;

transmitting a representation of sound of the first voice command from the stationary audio media device to a cloud computing system;

executing, at the cloud computing system, a first sound recognition routine, comprising:

identifying, in the first voice command, first identification data corresponding to the stationary audio media device and second identification data corresponding to an autonomous cleaning robot, determining that the first identification data and the second identification data are not associated, and based on determining that the first identification data and the second identification data are not associated, causing the stationary audio media device to emit an error notification;

establishing wireless communication between the autonomous cleaning robot and the stationary audio media device, the autonomous cleaning robot movable about the space;

receiving, at the microphone of the stationary audio media device, a second voice command;

transmitting a representation of sound of the second voice command from the stationary audio media device to the cloud computing system, wherein the cloud computing system is remote from the autonomous cleaning robot and the stationary audio media device;

executing, at the cloud computing system, a second sound recognition routine to parse the representation of the sound of the second voice command and identify a robot command corresponding to the second voice command; and transmitting, based on identifying the robot command, a command signal from the cloud computing system to the autonomous cleaning robot over a transmission path that bypasses the stationary audio media device, wherein the command signal is configured to cause the autonomous cleaning robot to initiate one or more operations indicated by the robot command upon receiving the command signal.

23. The method of claim 22, wherein determining that the first identification data and the second identification data are not associated comprises determining that the first voice command includes an identifier of a robot different from the autonomous cleaning robot.

24. The method of claim 22, wherein the second sound recognition routine executed by the cloud computing system is configured to recognize at least one of:

a low frequency noise from an appliance, or a noise originating from the autonomous cleaning robot.

25. The method of claim 24, wherein the second sound recognition routine is configured to recognize the noise originating from the autonomous cleaning robot, and wherein the noise originating from the autonomous cleaning robot is caused by at least one of:

an air mover of the autonomous cleaning robot, a motor of the autonomous cleaning robot, or movement of drive wheels of the autonomous cleaning robot across a floor surface.

26. The method of claim 22, further comprising:

transmitting, from the cloud computing system to the stationary audio media device, a command configured to cause the stationary audio media device to provide an audible success notification in response to transmission of the command signal.

27. The method of claim 22, further comprising generating a map of the space, the map indicating positions of devices in wireless communication with the cloud computing system, the autonomous cleaning robot being in wireless communication with the cloud computing system, wherein the devices comprise the stationary audio media device.

28. The method of claim 22, wherein:

the method further comprises:

identifying, through execution of the second sound recognition routine, an audible identifier associated with the autonomous cleaning robot; and transmitting the command signal to the autonomous cleaning robot comprises:

transmitting the command signal based on identifying the audible identifier.

29. The method of claim 28, wherein identifying the audible identifier associated with the autonomous cleaning robot comprises accessing, by the cloud computing system, a user account associated with the autonomous cleaning robot or the stationary audio media device.

30. The method of claim 22, wherein the stationary audio media device does not comprise a display.

\* \* \* \* \*